US012034587B1

(12) United States Patent
Zafer et al.

(10) Patent No.: US 12,034,587 B1
(45) Date of Patent: Jul. 9, 2024

(54) IDENTIFYING AND REMEDIATING ANOMALIES IN A SELF-HEALING NETWORK

(71) Applicant: VMware LLC, Palo Alto, CA (US)

(72) Inventors: Murtaza Zafer, San Jose, CA (US); Brennan Marshall Young, San Francisco, CA (US); Yunxi Li, Fremont, CA (US); Akhilesh Gadde, Milpitas, CA (US); Anand Srinivas, San Francisco, CA (US); Stephen Craig Connors, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/126,990

(22) Filed: Mar. 27, 2023

(51) Int. Cl.
G06F 15/173 (2006.01)
H04L 41/0654 (2022.01)

(52) U.S. Cl.
CPC ................... H04L 41/0654 (2013.01)

(58) Field of Classification Search
CPC .................................................. H04L 41/0654
See application file for complete search history.

(56) References Cited

U.S. PATENT DOCUMENTS 5,652,751 A 7/1997 Sharony
5,909,553 A 6/1999 Campbell et al.
6,154,465 A 11/2000 Pickett (Continued)

FOREIGN PATENT DOCUMENTS

CN 1926809 A 3/2007
CN 102577270 A 7/2012

(Continued)

OTHER PUBLICATIONS

Non-Published Commonly Owned U.S. Appl. No. 18/211,568, filed Jun. 19, 2023, 37 pages, VMware, Inc.

(Continued)

*Primary Examiner* — Richard G Keehn
(74) *Attorney, Agent, or Firm* — Quarles & Brady LLP

(57) ABSTRACT

Some embodiments of the invention provide a method of remediating anomalies in an SD-WAN implemented by multiple forwarding elements (FEs) located at multiple sites connected by the SD-WAN. The method is performed iteratively. The method receives multiple performance metrics that over a duration of time express a performance of the SD-WAN for at least one particular application associated with flows that traverse the SD-WAN during the time duration. The method uses the received performance metrics to update generated weight values for a topology graph that includes (1) multiple nodes representing the multiple FEs and (2) multiple edges between the multiple nodes representing paths traversed between the FEs by the flows associated with the particular application, said generated weight values associated with said paths. The method uses a topology-based machine-trained process to analyze the topology graph with the generated weight values in order to identify an anomaly in the topology graph that is indicative of an anomaly the SD-WAN for the particular application's traffic flows. For an identified anomaly, the method implements a remedial action to modify the SD-WAN in order to remediate the identified anomaly.

20 Claims, 19 Drawing Sheets

(56) References Cited

U.S. PATENT DOCUMENTS

| | | | |
|---|---|---|---|
| 6,157,648 | A | 12/2000 | Voit et al. |
| 6,201,810 | B1 | 3/2001 | Masuda et al. |
| 6,363,378 | B1 | 3/2002 | Conklin et al. |
| 6,445,682 | B1 | 9/2002 | Weitz |
| 6,744,775 | B1 | 6/2004 | Beshai et al. |
| 6,976,087 | B1 | 12/2005 | Westfall et al. |
| 7,003,481 | B2 | 2/2006 | Banka et al. |
| 7,280,476 | B2 | 10/2007 | Anderson |
| 7,313,629 | B1 | 12/2007 | Nucci et al. |
| 7,320,017 | B1 | 1/2008 | Kurapati et al. |
| 7,373,660 | B1 | 5/2008 | Guichard et al. |
| 7,581,022 | B1 | 8/2009 | Griffin et al. |
| 7,680,925 | B2 | 3/2010 | Sathyanarayana et al. |
| 7,681,236 | B2 | 3/2010 | Tamura et al. |
| 7,751,409 | B1 | 7/2010 | Carolan |
| 7,962,458 | B2 | 6/2011 | Holenstein et al. |
| 8,094,575 | B1 | 1/2012 | Vadlakonda et al. |
| 8,094,659 | B1 | 1/2012 | Arad |
| 8,111,692 | B2 | 2/2012 | Ray |
| 8,141,156 | B1 | 3/2012 | Mao et al. |
| 8,224,971 | B1 | 7/2012 | Miller et al. |
| 8,228,928 | B2 | 7/2012 | Parandekar et al. |
| 8,243,589 | B1 | 8/2012 | Trost et al. |
| 8,259,566 | B2 | 9/2012 | Chen et al. |
| 8,274,891 | B2 | 9/2012 | Averi et al. |
| 8,301,749 | B1 | 10/2012 | Finklestein et al. |
| 8,385,227 | B1 | 2/2013 | Downey |
| 8,516,129 | B1 | 8/2013 | Skene |
| 8,566,452 | B1 | 10/2013 | Goodwin, III et al. |
| 8,588,066 | B2 | 11/2013 | Goel et al. |
| 8,630,291 | B2 | 1/2014 | Shaffer et al. |
| 8,661,295 | B1 | 2/2014 | Khanna et al. |
| 8,724,456 | B1 | 5/2014 | Hong et al. |
| 8,724,503 | B2 | 5/2014 | Johnsson et al. |
| 8,745,177 | B1 | 6/2014 | Kazerani et al. |
| 8,797,874 | B2 | 8/2014 | Yu et al. |
| 8,799,504 | B2 | 8/2014 | Capone et al. |
| 8,804,745 | B1 | 8/2014 | Sinn |
| 8,806,482 | B1 | 8/2014 | Nagargadde et al. |
| 8,855,071 | B1 | 10/2014 | Sankaran et al. |
| 8,856,339 | B2 | 10/2014 | Mestery et al. |
| 8,964,548 | B1 | 2/2015 | Keralapura et al. |
| 8,989,199 | B1 | 3/2015 | Sella et al. |
| 9,009,217 | B1 | 4/2015 | Nagargadde et al. |
| 9,015,299 | B1 | 4/2015 | Shah |
| 9,055,000 | B1 | 6/2015 | Ghosh et al. |
| 9,060,025 | B2 | 6/2015 | Xu |
| 9,071,607 | B2 | 6/2015 | Twitchell, Jr. |
| 9,075,771 | B1 | 7/2015 | Gawali et al. |
| 9,100,329 | B1 | 8/2015 | Jiang et al. |
| 9,135,037 | B1 | 9/2015 | Petrescu-Prahova et al. |
| 9,137,334 | B2 | 9/2015 | Zhou |
| 9,154,327 | B1 | 10/2015 | Marino et al. |
| 9,203,764 | B2 | 12/2015 | Shirazipour et al. |
| 9,225,591 | B2 | 12/2015 | Beheshti-Zavareh et al. |
| 9,306,949 | B1 | 4/2016 | Richard et al. |
| 9,323,561 | B2 | 4/2016 | Ayala et al. |
| 9,336,040 | B2 | 5/2016 | Dong et al. |
| 9,354,983 | B1 | 5/2016 | Yenamandra et al. |
| 9,356,943 | B1 | 5/2016 | Lopilato et al. |
| 9,379,981 | B1 | 6/2016 | Zhou et al. |
| 9,413,724 | B2 | 8/2016 | Xu |
| 9,419,878 | B2 | 8/2016 | Hsiao et al. |
| 9,432,245 | B1 | 8/2016 | Sorenson, III et al. |
| 9,438,566 | B2 | 9/2016 | Zhang et al. |
| 9,450,817 | B1 | 9/2016 | Bahadur et al. |
| 9,450,852 | B1 | 9/2016 | Chen et al. |
| 9,462,010 | B1 | 10/2016 | Stevenson |
| 9,467,478 | B1 | 10/2016 | Khan et al. |
| 9,485,163 | B1 | 11/2016 | Fries et al. |
| 9,521,067 | B2 | 12/2016 | Michael et al. |
| 9,525,564 | B2 | 12/2016 | Lee |
| 9,542,219 | B1 | 1/2017 | Bryant et al. |
| 9,559,951 | B1 | 1/2017 | Sajassi et al. |
| 9,563,423 | B1 | 2/2017 | Pittman |
| 9,602,389 | B1 | 3/2017 | Maveli et al. |
| 9,608,917 | B1 | 3/2017 | Anderson et al. |
| 9,608,962 | B1 | 3/2017 | Chang |
| 9,614,748 | B1 | 4/2017 | Battersby et al. |
| 9,621,460 | B2 | 4/2017 | Mehta et al. |
| 9,641,551 | B1 | 5/2017 | Kariyanahalli |
| 9,648,547 | B1 | 5/2017 | Hart et al. |
| 9,665,432 | B2 | 5/2017 | Kruse et al. |
| 9,686,127 | B2 | 6/2017 | Ramachandran et al. |
| 9,692,714 | B1 | 6/2017 | Nair et al. |
| 9,715,401 | B2 | 7/2017 | Devine et al. |
| 9,717,021 | B2 | 7/2017 | Hughes et al. |
| 9,722,815 | B2 | 8/2017 | Mukundan et al. |
| 9,747,249 | B2 | 8/2017 | Cherian et al. |
| 9,755,965 | B1 | 9/2017 | Yadav et al. |
| 9,787,559 | B1 | 10/2017 | Schroeder |
| 9,807,004 | B2 | 10/2017 | Koley et al. |
| 9,819,540 | B1 | 11/2017 | Bahadur et al. |
| 9,819,565 | B2 | 11/2017 | Djukic et al. |
| 9,825,822 | B1 | 11/2017 | Holland |
| 9,825,911 | B1 | 11/2017 | Brandwine |
| 9,825,992 | B2 | 11/2017 | Xu |
| 9,832,128 | B1 | 11/2017 | Ashner et al. |
| 9,832,205 | B2 | 11/2017 | Santhi et al. |
| 9,875,355 | B1 | 1/2018 | Williams |
| 9,906,401 | B1 | 2/2018 | Rao |
| 9,923,826 | B2 | 3/2018 | Murgia |
| 9,930,011 | B1 | 3/2018 | Clemons, Jr. et al. |
| 9,935,829 | B1 | 4/2018 | Miller et al. |
| 9,942,787 | B1 | 4/2018 | Tillotson |
| 9,996,370 | B1 | 6/2018 | Khafizov et al. |
| 10,038,601 | B1 | 7/2018 | Becker et al. |
| 10,057,183 | B2 | 8/2018 | Salle et al. |
| 10,057,294 | B2 | 8/2018 | Xu |
| 10,116,593 | B1 | 10/2018 | Sinn et al. |
| 10,135,789 | B2 | 11/2018 | Mayya et al. |
| 10,142,226 | B1 | 11/2018 | Wu et al. |
| 10,178,032 | B1 | 1/2019 | Freitas |
| 10,178,037 | B2 | 1/2019 | Appleby et al. |
| 10,187,289 | B1 | 1/2019 | Chen et al. |
| 10,200,264 | B2 | 2/2019 | Menon et al. |
| 10,229,017 | B1 | 3/2019 | Zou et al. |
| 10,237,123 | B2 | 3/2019 | Dubey et al. |
| 10,250,498 | B1 | 4/2019 | Bales et al. |
| 10,263,832 | B1 | 4/2019 | Ghosh |
| 10,320,664 | B2 | 6/2019 | Nainar et al. |
| 10,320,691 | B1 | 6/2019 | Matthews et al. |
| 10,326,830 | B1 | 6/2019 | Singh |
| 10,348,767 | B1 | 7/2019 | Lee et al. |
| 10,355,989 | B1 | 7/2019 | Panchal et al. |
| 10,425,382 | B2 | 9/2019 | Mayya et al. |
| 10,454,708 | B2 | 10/2019 | Mibu |
| 10,454,714 | B2 | 10/2019 | Mayya et al. |
| 10,461,993 | B2 | 10/2019 | Turabi et al. |
| 10,498,652 | B2 | 12/2019 | Mayya et al. |
| 10,511,546 | B2 | 12/2019 | Singarayan et al. |
| 10,523,539 | B2 | 12/2019 | Mayya et al. |
| 10,550,093 | B2 | 2/2020 | Ojima et al. |
| 10,554,538 | B2 | 2/2020 | Spohn et al. |
| 10,560,431 | B1 | 2/2020 | Chen et al. |
| 10,565,464 | B2 | 2/2020 | Han et al. |
| 10,567,519 | B1 | 2/2020 | Mukhopadhyaya et al. |
| 10,574,482 | B2 | 2/2020 | Oré et al. |
| 10,574,528 | B2 | 2/2020 | Mayya et al. |
| 10,594,516 | B2 | 3/2020 | Cidon et al. |
| 10,594,591 | B2 | 3/2020 | Houjyo et al. |
| 10,594,659 | B2 | 3/2020 | El-Moussa et al. |
| 10,608,844 | B2 | 3/2020 | Cidon et al. |
| 10,630,505 | B2 | 4/2020 | Rubenstein et al. |
| 10,637,889 | B2 | 4/2020 | Ermagan et al. |
| 10,666,460 | B2 | 5/2020 | Cidon et al. |
| 10,666,497 | B2 | 5/2020 | Tahhan et al. |
| 10,686,625 | B2 | 6/2020 | Cidon et al. |
| 10,693,739 | B1 | 6/2020 | Naseri et al. |
| 10,708,144 | B2 | 7/2020 | Mohan et al. |
| 10,715,427 | B2 | 7/2020 | Raj et al. |
| 10,749,711 | B2 | 8/2020 | Mukundan et al. |
| 10,778,466 | B2 | 9/2020 | Cidon et al. |
| 10,778,528 | B2 | 9/2020 | Mayya et al. |

(56) References Cited

U.S. PATENT DOCUMENTS

| | | |
|---|---|---|
| 10,778,557 B2 | 9/2020 | Ganichev et al. |
| 10,805,114 B2 | 10/2020 | Cidon et al. |
| 10,805,272 B2 | 10/2020 | Mayya et al. |
| 10,819,564 B2 | 10/2020 | Turabi et al. |
| 10,826,775 B1 | 11/2020 | Moreno et al. |
| 10,841,131 B2 | 11/2020 | Cidon et al. |
| 10,911,374 B1 | 2/2021 | Kumar et al. |
| 10,938,693 B2 | 3/2021 | Mayya et al. |
| 10,951,529 B2 | 3/2021 | Duan et al. |
| 10,958,479 B2 | 3/2021 | Cidon et al. |
| 10,959,098 B2 | 3/2021 | Cidon et al. |
| 10,992,558 B1 | 4/2021 | Silva et al. |
| 10,992,568 B2 | 4/2021 | Michael et al. |
| 10,999,100 B2 | 5/2021 | Cidon et al. |
| 10,999,137 B2 | 5/2021 | Cidon et al. |
| 10,999,165 B2 | 5/2021 | Cidon et al. |
| 10,999,197 B2 | 5/2021 | Hooda et al. |
| 11,005,684 B2 | 5/2021 | Cidon |
| 11,018,995 B2 | 5/2021 | Cidon et al. |
| 11,044,190 B2 | 6/2021 | Ramaswamy et al. |
| 11,050,588 B2 | 6/2021 | Mayya et al. |
| 11,050,644 B2 | 6/2021 | Hegde et al. |
| 11,071,005 B2 | 7/2021 | Shen et al. |
| 11,089,111 B2 | 8/2021 | Markuze et al. |
| 11,095,612 B1 | 8/2021 | Oswal et al. |
| 11,102,032 B2 | 8/2021 | Cidon et al. |
| 11,108,595 B2 | 8/2021 | Knutsen et al. |
| 11,108,851 B1 | 8/2021 | Kurmala et al. |
| 11,115,347 B2 | 9/2021 | Gupta et al. |
| 11,115,426 B1 | 9/2021 | Pazhyannur et al. |
| 11,115,480 B2 | 9/2021 | Markuze et al. |
| 11,121,962 B2 | 9/2021 | Michael et al. |
| 11,121,985 B2 | 9/2021 | Cidon et al. |
| 11,128,492 B2 | 9/2021 | Sethi et al. |
| 11,146,632 B2 | 10/2021 | Rubenstein |
| 11,153,230 B2 | 10/2021 | Cidon et al. |
| 11,171,885 B2 | 11/2021 | Cidon et al. |
| 11,212,140 B2 | 12/2021 | Mukundan et al. |
| 11,212,238 B2 | 12/2021 | Cidon et al. |
| 11,223,514 B2 | 1/2022 | Mayya et al. |
| 11,245,641 B2 | 2/2022 | Ramaswamy et al. |
| 11,252,079 B2 | 2/2022 | Michael et al. |
| 11,252,105 B2 | 2/2022 | Cidon et al. |
| 11,252,106 B2 | 2/2022 | Cidon et al. |
| 11,258,728 B2 | 2/2022 | Cidon et al. |
| 11,310,170 B2 | 4/2022 | Cidon et al. |
| 11,323,307 B2 | 5/2022 | Mayya et al. |
| 11,349,722 B2 | 5/2022 | Mayya et al. |
| 11,363,124 B2 | 6/2022 | Markuze et al. |
| 11,374,904 B2 | 6/2022 | Mayya et al. |
| 11,375,005 B1 | 6/2022 | Rolando et al. |
| 11,381,474 B1 | 7/2022 | Kumar et al. |
| 11,381,499 B1 | 7/2022 | Ramaswamy et al. |
| 11,388,086 B1 | 7/2022 | Ramaswamy et al. |
| 11,394,640 B2 | 7/2022 | Ramaswamy et al. |
| 11,418,997 B2 | 8/2022 | Devadoss et al. |
| 11,438,789 B2 | 9/2022 | Devadoss et al. |
| 11,444,865 B2 | 9/2022 | Ramaswamy et al. |
| 11,444,872 B2 | 9/2022 | Mayya et al. |
| 11,477,127 B2 | 10/2022 | Ramaswamy et al. |
| 11,489,720 B1 | 11/2022 | Kempanna et al. |
| 11,489,783 B2 | 11/2022 | Ramaswamy et al. |
| 11,509,571 B1 | 11/2022 | Ramaswamy et al. |
| 11,516,049 B2 | 11/2022 | Cidon et al. |
| 11,522,780 B1 | 12/2022 | Wallace et al. |
| 11,526,434 B1 | 12/2022 | Brooker et al. |
| 11,533,248 B2 | 12/2022 | Mayya et al. |
| 11,552,874 B1 | 1/2023 | Pragada et al. |
| 11,575,591 B2 | 2/2023 | Ramaswamy et al. |
| 11,575,600 B2 | 2/2023 | Markuze et al. |
| 11,582,144 B2 * | 2/2023 | Ramaswamy .......... H04L 43/16 |
| 11,582,298 B2 | 2/2023 | Hood et al. |
| 11,601,356 B2 | 3/2023 | Gandhi et al. |
| 11,606,225 B2 | 3/2023 | Cidon et al. |
| 11,606,286 B2 | 3/2023 | Michael et al. |
| 11,606,314 B2 | 3/2023 | Cidon et al. |
| 11,606,712 B2 | 3/2023 | Devadoss et al. |
| 11,611,507 B2 | 3/2023 | Ramaswamy et al. |
| 11,637,768 B2 | 4/2023 | Ramaswamy et al. |
| 11,677,720 B2 | 6/2023 | Mayya et al. |
| 11,689,959 B2 | 6/2023 | Devadoss et al. |
| 11,700,196 B2 | 7/2023 | Michael et al. |
| 11,706,126 B2 | 7/2023 | Silva et al. |
| 11,706,127 B2 | 7/2023 | Michael et al. |
| 11,709,710 B2 | 7/2023 | Markuze et al. |
| 11,716,286 B2 | 8/2023 | Ramaswamy et al. |
| 11,722,925 B2 | 8/2023 | Devadoss et al. |
| 11,729,065 B2 | 8/2023 | Ramaswamy et al. |
| 2002/0049687 A1 | 4/2002 | Helsper et al. |
| 2002/0075542 A1 | 6/2002 | Kumar et al. |
| 2002/0085488 A1 | 7/2002 | Kobayashi |
| 2002/0087716 A1 | 7/2002 | Mustafa |
| 2002/0152306 A1 | 10/2002 | Tuck |
| 2002/0186682 A1 | 12/2002 | Kawano et al. |
| 2002/0198840 A1 | 12/2002 | Banka et al. |
| 2003/0050061 A1 | 3/2003 | Wu et al. |
| 2003/0061269 A1 | 3/2003 | Hathaway et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0149604 A1 | 7/2005 | Navada |
| 2005/0154790 A1 | 7/2005 | Nagata et al. |
| 2005/0172161 A1 | 8/2005 | Cruz et al. |
| 2005/0195754 A1 | 9/2005 | Nosella |
| 2005/0210479 A1 | 9/2005 | Andjelic |
| 2005/0265255 A1 | 12/2005 | Kodialam et al. |
| 2006/0002291 A1 | 1/2006 | Alicherry et al. |
| 2006/0034335 A1 | 2/2006 | Karaoguz et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1 | 8/2006 | Vasseur |
| 2006/0193247 A1 | 8/2006 | Naseh et al. |
| 2006/0193252 A1 | 8/2006 | Naseh et al. |
| 2006/0195605 A1 | 8/2006 | Sundarrajan et al. |
| 2006/0245414 A1 | 11/2006 | Susai et al. |
| 2007/0050594 A1 | 3/2007 | Augsburg et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1 | 4/2007 | Filsfils et al. |
| 2007/0103548 A1 | 5/2007 | Carter |
| 2007/0115812 A1 | 5/2007 | Hughes |
| 2007/0121486 A1 | 5/2007 | Guichard et al. |
| 2007/0130325 A1 | 6/2007 | Lesser |
| 2007/0162619 A1 | 7/2007 | Aloni et al. |
| 2007/0162639 A1 | 7/2007 | Chu et al. |
| 2007/0177511 A1 | 8/2007 | Das et al. |
| 2007/0195797 A1 | 8/2007 | Patel et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0055241 A1 | 3/2008 | Goldenberg et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0168086 A1 | 7/2008 | Miller et al. |
| 2008/0175150 A1 | 7/2008 | Bolt et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |

(56) References Cited

U.S. PATENT DOCUMENTS

| | | |
|---|---|---|
| 2008/0263218 A1 | 10/2008 | Beerends et al. |
| 2009/0013210 A1 | 1/2009 | McIntosh et al. |
| 2009/0028092 A1 | 1/2009 | Rothschild |
| 2009/0125617 A1 | 5/2009 | Klessig et al. |
| 2009/0141642 A1 | 6/2009 | Sun |
| 2009/0154463 A1 | 6/2009 | Hines et al. |
| 2009/0182874 A1 | 7/2009 | Morford et al. |
| 2009/0247204 A1 | 10/2009 | Sennett et al. |
| 2009/0268605 A1 | 10/2009 | Campbell et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091782 A1 | 4/2010 | Hiscock |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0128600 A1 | 5/2010 | Srinivasmurthy et al. |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0001604 A1 | 1/2011 | Ludlow et al. |
| 2011/0007752 A1 | 1/2011 | Silva et al. |
| 2011/0032939 A1 | 2/2011 | Nozaki et al. |
| 2011/0035187 A1 | 2/2011 | DeJori et al. |
| 2011/0040814 A1 | 2/2011 | Higgins |
| 2011/0075674 A1 | 3/2011 | Li et al. |
| 2011/0078783 A1 | 3/2011 | Duan et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2011/0235509 A1 | 9/2011 | Szymanski |
| 2011/0255397 A1 | 10/2011 | Kadakia et al. |
| 2011/0302663 A1 | 12/2011 | Prodan et al. |
| 2012/0008630 A1 | 1/2012 | Ould-Brahim |
| 2012/0027013 A1 | 2/2012 | Napierala |
| 2012/0039309 A1 | 2/2012 | Evans et al. |
| 2012/0099601 A1 | 4/2012 | Haddad et al. |
| 2012/0136697 A1 | 5/2012 | Peles et al. |
| 2012/0140935 A1 | 6/2012 | Kruglick |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shatzkamer et al. |
| 2012/0240185 A1 | 9/2012 | Kapoor et al. |
| 2012/0250682 A1 | 10/2012 | Vincent et al. |
| 2012/0250686 A1 | 10/2012 | Vincent et al. |
| 2012/0266026 A1 | 10/2012 | Chikkalingaiah et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317270 A1 | 12/2012 | Vrbaski et al. |
| 2012/0317291 A1 | 12/2012 | Wolfe |
| 2013/0007505 A1 | 1/2013 | Spear |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0097304 A1 | 4/2013 | Asthana et al. |
| 2013/0103729 A1 | 4/2013 | Cooney et al. |
| 2013/0103834 A1 | 4/2013 | Dzerve et al. |
| 2013/0117530 A1 | 5/2013 | Kim et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173768 A1 | 7/2013 | Kundu et al. |
| 2013/0173788 A1 | 7/2013 | Song |
| 2013/0182712 A1 | 7/2013 | Aguayo et al. |
| 2013/0185446 A1 | 7/2013 | Zeng et al. |
| 2013/0185729 A1 | 7/2013 | Vasic et al. |
| 2013/0191688 A1 | 7/2013 | Agarwal et al. |
| 2013/0223226 A1 | 8/2013 | Narayanan et al. |
| 2013/0223454 A1 | 8/2013 | Dunbar et al. |
| 2013/0235870 A1 | 9/2013 | Tripathi et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0258847 A1 | 10/2013 | Zhang et al. |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0016464 A1 | 1/2014 | Shirazipour et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0071832 A1 | 3/2014 | Johnsson et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0122559 A1 | 5/2014 | Branson et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0157363 A1 | 6/2014 | Banerjee |
| 2014/0160935 A1 | 6/2014 | Zecharia et al. |
| 2014/0164560 A1 | 6/2014 | Ko et al. |
| 2014/0164617 A1 | 6/2014 | Jalan et al. |
| 2014/0164718 A1 | 6/2014 | Schaik et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0189074 A1 | 7/2014 | Parker |
| 2014/0208317 A1 | 7/2014 | Nakagawa |
| 2014/0219135 A1 | 8/2014 | Li et al. |
| 2014/0223507 A1 | 8/2014 | Xu |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0310282 A1 | 10/2014 | Sprague et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |

(56) References Cited

U.S. PATENT DOCUMENTS

| | | |
|---|---|---|
| 2014/0337674 A1 | 11/2014 | Ivancic et al. |
| 2014/0341109 A1 | 11/2014 | Cartmell et al. |
| 2014/0355441 A1 | 12/2014 | Jain |
| 2014/0365834 A1 | 12/2014 | Stone et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0100958 A1 | 4/2015 | Banavalikar et al. |
| 2015/0106809 A1 | 4/2015 | Reddy et al. |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0264055 A1 | 9/2015 | Budhani et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0326426 A1 | 11/2015 | Uo et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358232 A1 | 12/2015 | Chen et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381462 A1 | 12/2015 | Choi et al. |
| 2015/0381493 A1 | 12/2015 | Bansal et al. |
| 2016/0019317 A1 | 1/2016 | Pawar et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080268 A1 | 3/2016 | Anand et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134527 A1 | 5/2016 | Kwak et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0147607 A1 | 5/2016 | Dornemann et al. |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0205071 A1 | 7/2016 | Cooper et al. |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Vasseur et al. |
| 2016/0234099 A1 | 8/2016 | Jiao |
| 2016/0234161 A1 | 8/2016 | Banerjee et al. |
| 2016/0255169 A1 | 9/2016 | Kovvuri et al. |
| 2016/0255542 A1 | 9/2016 | Hughes et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0299775 A1 | 10/2016 | Madapurath et al. |
| 2016/0301471 A1 | 10/2016 | Kunz et al. |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0337202 A1 | 11/2016 | Ben-Itzhak et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0378527 A1 | 12/2016 | Zamir |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0024260 A1 | 1/2017 | Chandrasekaran et al. |
| 2017/0026273 A1 | 1/2017 | Yao et al. |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034052 A1 | 2/2017 | Chanda et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063783 A1 | 3/2017 | Yong et al. |
| 2017/0063794 A1 | 3/2017 | Jain et al. |
| 2017/0064005 A1 | 3/2017 | Lee |
| 2017/0075710 A1 | 3/2017 | Prasad et al. |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118067 A1 | 4/2017 | Vedula |
| 2017/0118173 A1 | 4/2017 | Arramreddy et al. |

(56) References Cited

U.S. PATENT DOCUMENTS

| | | |
|---|---|---|
| 2017/0123939 A1 | 5/2017 | Maheshwari et al. |
| 2017/0126475 A1 | 5/2017 | Mahkonen et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0155566 A1 | 6/2017 | Martinsen et al. |
| 2017/0155590 A1 | 6/2017 | Dillon et al. |
| 2017/0163473 A1 | 6/2017 | Sadana et al. |
| 2017/0171024 A1 | 6/2017 | Anerousis et al. |
| 2017/0171310 A1 | 6/2017 | Gardner |
| 2017/0180220 A1 | 6/2017 | Leckey et al. |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201568 A1 | 7/2017 | Hussam et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0236060 A1 | 8/2017 | Ignatyev |
| 2017/0237710 A1 | 8/2017 | Mayya et al. |
| 2017/0242784 A1 | 8/2017 | Heorhiadi et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279741 A1 | 9/2017 | Elias et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1 | 10/2017 | Ratnasingham |
| 2017/0295264 A1 | 10/2017 | Touitou et al. |
| 2017/0302501 A1 | 10/2017 | Shi et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317954 A1 | 11/2017 | Masurekar et al. |
| 2017/0317969 A1 | 11/2017 | Masurekar et al. |
| 2017/0317974 A1 | 11/2017 | Masurekar et al. |
| 2017/0324628 A1 | 11/2017 | Dhanabalan |
| 2017/0337086 A1 | 11/2017 | Zhu et al. |
| 2017/0339022 A1 | 11/2017 | Hegde et al. |
| 2017/0339054 A1 | 11/2017 | Yadav et al. |
| 2017/0339070 A1 | 11/2017 | Chang et al. |
| 2017/0346722 A1 | 11/2017 | Smith et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0091370 A1 | 3/2018 | Arai |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0123946 A1 | 5/2018 | Ramachandran et al. |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0176252 A1 | 6/2018 | Nimmagadda et al. |
| 2018/0181423 A1 | 6/2018 | Gunda et al. |
| 2018/0205746 A1 | 7/2018 | Boutnaru et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0248790 A1 | 8/2018 | Tan et al. |
| 2018/0260125 A1 | 9/2018 | Botes et al. |
| 2018/0261085 A1 | 9/2018 | Liu et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0359323 A1 | 12/2018 | Madden |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0021085 A1 | 1/2019 | Mochizuki et al. |
| 2019/0028378 A1 | 1/2019 | Houjyo et al. |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0081894 A1 | 3/2019 | Yousaf et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |

(56) References Cited

U.S. PATENT DOCUMENTS

| | | |
|---|---|---|
| 2019/0104413 A1 | 4/2019 | Cidon et al. |
| 2019/0109769 A1 | 4/2019 | Jain et al. |
| 2019/0132221 A1 | 5/2019 | Boutros et al. |
| 2019/0132234 A1 | 5/2019 | Dong et al. |
| 2019/0132322 A1 | 5/2019 | Song et al. |
| 2019/0140889 A1 | 5/2019 | Mayya et al. |
| 2019/0140890 A1 | 5/2019 | Mayya et al. |
| 2019/0149525 A1 | 5/2019 | Gunda et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0222499 A1 | 7/2019 | Chen et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0238497 A1 | 8/2019 | Tourrilhes et al. |
| 2019/0268421 A1 | 8/2019 | Markuze et al. |
| 2019/0268973 A1 | 8/2019 | Bull et al. |
| 2019/0278631 A1 | 9/2019 | Bernat et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0288875 A1 | 9/2019 | Shen et al. |
| 2019/0306197 A1 | 10/2019 | Degioanni |
| 2019/0306282 A1 | 10/2019 | Masputra et al. |
| 2019/0313278 A1 | 10/2019 | Liu |
| 2019/0313907 A1 | 10/2019 | Khachaturian et al. |
| 2019/0319847 A1 | 10/2019 | Nahar et al. |
| 2019/0319881 A1 | 10/2019 | Maskara et al. |
| 2019/0327109 A1 | 10/2019 | Guichard et al. |
| 2019/0334786 A1 | 10/2019 | Dutta et al. |
| 2019/0334813 A1 | 10/2019 | Raj et al. |
| 2019/0334820 A1 | 10/2019 | Zhao |
| 2019/0342201 A1 | 11/2019 | Singh |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2019/0394081 A1 | 12/2019 | Tahhan et al. |
| 2020/0014609 A1 | 1/2020 | Hockett et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0014663 A1 | 1/2020 | Chen et al. |
| 2020/0021514 A1 | 1/2020 | Michael et al. |
| 2020/0021515 A1* | 1/2020 | Michael ............ H04L 43/0864 |
| 2020/0036624 A1 | 1/2020 | Michael et al. |
| 2020/0044943 A1 | 2/2020 | Bor-Yaliniz et al. |
| 2020/0044969 A1 | 2/2020 | Hao et al. |
| 2020/0059420 A1 | 2/2020 | Abraham |
| 2020/0059457 A1 | 2/2020 | Raza et al. |
| 2020/0059459 A1 | 2/2020 | Abraham et al. |
| 2020/0067831 A1 | 2/2020 | Spraggins et al. |
| 2020/0092207 A1 | 3/2020 | Sipra et al. |
| 2020/0097327 A1 | 3/2020 | Beyer et al. |
| 2020/0099625 A1 | 3/2020 | Mgit et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0159661 A1 | 5/2020 | Keymolen et al. |
| 2020/0162407 A1 | 5/2020 | Tillotson |
| 2020/0169473 A1 | 5/2020 | Rimar et al. |
| 2020/0177503 A1 | 6/2020 | Hooda et al. |
| 2020/0177550 A1 | 6/2020 | Valluri et al. |
| 2020/0177629 A1 | 6/2020 | Hooda et al. |
| 2020/0186471 A1 | 6/2020 | Shen et al. |
| 2020/0195557 A1 | 6/2020 | Duan et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0241927 A1 | 7/2020 | Yang et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0267203 A1 | 8/2020 | Jindal et al. |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0301764 A1 | 9/2020 | Thoresen et al. |
| 2020/0314006 A1 | 10/2020 | Mackie et al. |
| 2020/0314614 A1 | 10/2020 | Moustafa et al. |
| 2020/0322230 A1 | 10/2020 | Natal et al. |
| 2020/0322287 A1 | 10/2020 | Connor et al. |
| 2020/0336336 A1 | 10/2020 | Sethi et al. |
| 2020/0344089 A1 | 10/2020 | Motwani et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |
| 2020/0366562 A1 | 11/2020 | Mayya et al. |
| 2020/0366611 A1* | 11/2020 | Kommula ............... H04L 45/22 |
| 2020/0382345 A1 | 12/2020 | Zhao et al. |
| 2020/0382387 A1 | 12/2020 | Pasupathy et al. |
| 2020/0403821 A1 | 12/2020 | Dev et al. |
| 2020/0412483 A1 | 12/2020 | Tan et al. |
| 2020/0412576 A1 | 12/2020 | Kondapavuluru et al. |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0021538 A1 | 1/2021 | Meck et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0037159 A1 | 2/2021 | Shimokawa |
| 2021/0049191 A1 | 2/2021 | Masson et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0073001 A1 | 3/2021 | Rogers et al. |
| 2021/0092062 A1 | 3/2021 | Dhanabalan et al. |
| 2021/0099360 A1 | 4/2021 | Parsons et al. |
| 2021/0105199 A1 | 4/2021 | H et al. |
| 2021/0111998 A1 | 4/2021 | Saavedra |
| 2021/0112034 A1 | 4/2021 | Sundararajan et al. |
| 2021/0126830 A1 | 4/2021 | R et al. |
| 2021/0126853 A1 | 4/2021 | Ramaswamy et al. |
| 2021/0126854 A1 | 4/2021 | Guo et al. |
| 2021/0126860 A1* | 4/2021 | Ramaswamy ...... H04L 12/4633 |
| 2021/0144091 A1 | 5/2021 | H et al. |
| 2021/0160169 A1 | 5/2021 | Shen et al. |
| 2021/0160813 A1 | 5/2021 | Gupta et al. |
| 2021/0176255 A1 | 6/2021 | Hill et al. |
| 2021/0184952 A1 | 6/2021 | Mayya et al. |
| 2021/0184966 A1* | 6/2021 | Ramaswamy ........... H04L 45/74 |
| 2021/0184983 A1* | 6/2021 | Ramaswamy ........... H04L 47/36 |
| 2021/0194814 A1 | 6/2021 | Roux et al. |

(56) References Cited

U.S. PATENT DOCUMENTS

| | | |
|---|---|---|
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0266262 A1 | 8/2021 | Subramanian et al. |
| 2021/0279069 A1 | 9/2021 | Salgaonkar et al. |
| 2021/0314289 A1 | 10/2021 | Chandrashekhar et al. |
| 2021/0314385 A1 | 10/2021 | Pande et al. |
| 2021/0328835 A1 | 10/2021 | Mayya et al. |
| 2021/0336880 A1 | 10/2021 | Gupta et al. |
| 2021/0377109 A1 | 12/2021 | Shrivastava et al. |
| 2021/0377156 A1 | 12/2021 | Michael et al. |
| 2021/0392060 A1 | 12/2021 | Silva et al. |
| 2021/0392070 A1 | 12/2021 | Tootaghaj et al. |
| 2021/0399920 A1 | 12/2021 | Sundararajan et al. |
| 2021/0399978 A9 | 12/2021 | Michael et al. |
| 2021/0400113 A1 | 12/2021 | Markuze et al. |
| 2021/0400512 A1 | 12/2021 | Agarwal et al. |
| 2021/0409277 A1 | 12/2021 | Jeuk et al. |
| 2022/0006726 A1 | 1/2022 | Michael et al. |
| 2022/0006751 A1 | 1/2022 | Ramaswamy et al. |
| 2022/0006756 A1* | 1/2022 | Ramaswamy .......... H04L 45/64 |
| 2022/0029902 A1 | 1/2022 | Shemer et al. |
| 2022/0035673 A1 | 2/2022 | Markuze et al. |
| 2022/0038370 A1 | 2/2022 | Vasseur et al. |
| 2022/0038557 A1 | 2/2022 | Markuze et al. |
| 2022/0045927 A1 | 2/2022 | Liu et al. |
| 2022/0052928 A1 | 2/2022 | Sundararajan et al. |
| 2022/0061059 A1 | 2/2022 | Dunsmore et al. |
| 2022/0086035 A1 | 3/2022 | Devaraj et al. |
| 2022/0094644 A1 | 3/2022 | Cidon et al. |
| 2022/0123961 A1 | 4/2022 | Mukundan et al. |
| 2022/0131740 A1 | 4/2022 | Mayya et al. |
| 2022/0131807 A1 | 4/2022 | Srinivas et al. |
| 2022/0131898 A1 | 4/2022 | Hooda et al. |
| 2022/0141184 A1 | 5/2022 | Oswal et al. |
| 2022/0158923 A1 | 5/2022 | Ramaswamy et al. |
| 2022/0158924 A1 | 5/2022 | Ramaswamy et al. |
| 2022/0158926 A1 | 5/2022 | Wennerström et al. |
| 2022/0166713 A1 | 5/2022 | Markuze et al. |
| 2022/0191719 A1 | 6/2022 | Roy |
| 2022/0198229 A1 | 6/2022 | López et al. |
| 2022/0210035 A1 | 6/2022 | Hendrickson et al. |
| 2022/0210041 A1 | 6/2022 | Gandhi et al. |
| 2022/0210042 A1 | 6/2022 | Gandhi et al. |
| 2022/0210122 A1 | 6/2022 | Levin et al. |
| 2022/0217015 A1 | 7/2022 | Vuggrala et al. |
| 2022/0231949 A1 | 7/2022 | Ramaswamy et al. |
| 2022/0231950 A1 | 7/2022 | Ramaswamy et al. |
| 2022/0232411 A1 | 7/2022 | Vijayakumar et al. |
| 2022/0239596 A1 | 7/2022 | Kumar et al. |
| 2022/0294701 A1 | 9/2022 | Mayya et al. |
| 2022/0335027 A1 | 10/2022 | Seshadri et al. |
| 2022/0337553 A1 | 10/2022 | Mayya et al. |
| 2022/0353152 A1 | 11/2022 | Ramaswamy |
| 2022/0353171 A1 | 11/2022 | Ramaswamy et al. |
| 2022/0353175 A1 | 11/2022 | Ramaswamy et al. |
| 2022/0353182 A1 | 11/2022 | Ramaswamy et al. |
| 2022/0353190 A1 | 11/2022 | Ramaswamy et al. |
| 2022/0360500 A1 | 11/2022 | Ramaswamy et al. |
| 2022/0407773 A1 | 12/2022 | Kempanna et al. |
| 2022/0407774 A1 | 12/2022 | Kempanna et al. |
| 2022/0407790 A1 | 12/2022 | Kempanna et al. |
| 2022/0407820 A1 | 12/2022 | Kempanna et al. |
| 2022/0407915 A1 | 12/2022 | Kempanna et al. |
| 2023/0006929 A1 | 1/2023 | Mayya et al. |
| 2023/0025586 A1 | 1/2023 | Rolando et al. |
| 2023/0026330 A1 | 1/2023 | Rolando et al. |
| 2023/0026865 A1 | 1/2023 | Rolando et al. |
| 2023/0028872 A1 | 1/2023 | Ramaswamy |
| 2023/0039869 A1 | 2/2023 | Ramaswamy et al. |
| 2023/0041916 A1 | 2/2023 | Zhang et al. |
| 2023/0054961 A1 | 2/2023 | Ramaswamy et al. |
| 2023/0105680 A1 | 4/2023 | Simlai et al. |
| 2023/0121871 A1 | 4/2023 | Mayya et al. |
| 2023/0156826 A1* | 5/2023 | Palermo ............... H04W 76/10 370/329 |
| 2023/0179445 A1 | 6/2023 | Cidon et al. |
| 2023/0179502 A1 | 6/2023 | Ramaswamy et al. |
| 2023/0179521 A1 | 6/2023 | Markuze et al. |
| 2023/0179543 A1 | 6/2023 | Cidon et al. |
| 2023/0216768 A1 | 7/2023 | Zohar et al. |
| 2023/0216801 A1 | 7/2023 | Markuze et al. |
| 2023/0216804 A1 | 7/2023 | Zohar et al. |
| 2023/0221874 A1 | 7/2023 | Markuze et al. |
| 2023/0224356 A1 | 7/2023 | Markuze et al. |
| 2023/0224759 A1 | 7/2023 | Ramaswamy |
| 2023/0231845 A1 | 7/2023 | Manoharan et al. |
| 2023/0239234 A1 | 7/2023 | Zohar et al. |
| 2023/0261974 A1* | 8/2023 | Ramaswamy ......... H04L 43/16 370/389 |
| 2024/0031264 A1* | 1/2024 | Nigam ................ H04L 43/0823 |

FOREIGN PATENT DOCUMENTS

| | | | | |
|---|---|---|---|---|
| CN | 102811165 A | 12/2012 | | |
| CN | 104956329 A | 9/2015 | | |
| CN | 106656847 A | 5/2017 | | |
| CN | 106998284 A | 8/2017 | | |
| CN | 110447209 A | 11/2019 | | |
| CN | 111198764 A | 5/2020 | | |
| CN | 116783874 A | * 9/2023 | ........... H04L 45/121 |
| CN | 117178535 A | * 12/2023 | ........... H04L 45/122 |
| EP | 1912381 A1 | 4/2008 | | |
| EP | 2538637 A2 | 12/2012 | | |
| EP | 2763362 A1 | 8/2014 | | |
| EP | 3041178 A1 | 7/2016 | | |
| EP | 3297211 A1 | 3/2018 | | |
| EP | 3509256 A1 | 7/2019 | | |
| EP | 3346650 B1 | 11/2019 | | |
| IN | 106230650 A | 12/2016 | | |
| JP | 2002368792 A | 12/2002 | | |
| JP | 2010233126 A | 10/2010 | | |
| JP | 2014200010 A | 10/2014 | | |
| JP | 2017059991 A | 3/2017 | | |
| JP | 2017524290 A | 8/2017 | | |
| KR | 20170058201 A | 5/2017 | | |
| RU | 2574350 C2 | 2/2016 | | |
| WO | 03073701 A1 | 9/2003 | | |
| WO | 2005071861 A1 | 8/2005 | | |
| WO | 2007016834 A1 | 2/2007 | | |
| WO | 2012167184 A2 | 12/2012 | | |
| WO | 2015092565 A1 | 6/2015 | | |
| WO | 2016061546 A1 | 4/2016 | | |
| WO | 2016123314 A1 | 8/2016 | | |
| WO | 2017083975 A1 | 5/2017 | | |
| WO | 2019070611 A1 | 4/2019 | | |
| WO | 2019094522 A1 | 5/2019 | | |
| WO | 2020012491 A1 | 1/2020 | | |
| WO | 2020018704 A1 | 1/2020 | | |
| WO | 2020091777 A1 | 5/2020 | | |
| WO | 2020101922 A1 | 5/2020 | | |
| WO | 2020112345 A1 | 6/2020 | | |
| WO | 2021040934 A1 | 3/2021 | | |
| WO | 2021118717 A1 | 6/2021 | | |
| WO | 2021150465 A1 | 7/2021 | | |
| WO | 2021211906 A1 | 10/2021 | | |
| WO | 2022005607 A1 | 1/2022 | | |
| WO | 2022082680 A1 | 4/2022 | | |
| WO | 2022154850 A1 | 7/2022 | | |
| WO | 2022159156 A1 | 7/2022 | | |
| WO | 2022231668 A1 | 11/2022 | | |
| WO | 2022235303 A1 | 11/2022 | | |

(56) References Cited

FOREIGN PATENT DOCUMENTS

| | | |
|---|---|---|
| WO | 2022265681 A1 | 12/2022 |
| WO | 2023009159 A1 | 2/2023 |

OTHER PUBLICATIONS

Non-Published Commonly Owned U.S. Appl. No. 18/222,864, filed Jul. 17, 2023, 350 pages, VMware, Inc.
Non-Published Commonly Owned U.S. Appl. No. 18/222,868, filed Jul. 17, 2023, 22 pages, VMware, Inc.
Non-Published Commonly Owned U.S. Appl. No. 18/224,466, filed Jul. 20, 2023, 56 pages, VMware, Inc.
Non-Published Commonly Owned U.S. Appl. No. 18/235,879, filed Aug. 20, 2023, 173 pages, VMware, Inc.
Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.
Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.
Author Unknown, "VeloCloud Administration Guide: VMware SD-WAN by VeloCloud 3.3," Month Unknown 2019, 366 pages, VMware, Inc., Palo Alto, CA, USA.
Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.
Barozet, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.
Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.
Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.
Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.
Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.
Fortz, Bernard, et al., "Internet Traffic Engineering by Optimizing OSPF Weights," Proceedings IEEE Infocom 2000, Conference on Computer Communications, Nineteenth Annual Joint Conference of the IEEE Computer and Communications Societies, Mar. 26-30, 2000, 11 pages, IEEE, Tel Aviv, Israel, Israel.
Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.
Funabiki, Nobuo, et al., "A Frame Aggregation Extension of Routing Algorithm for Wireless Mesh Networks," 2014 Second International Symposium on Computing and Networking, Dec. 10-12, 2014, 5 pages, IEEE, Shizuoka, Japan.
Guo, Xiangyi, et al., (U.S. Appl. No. 62/925,193), filed Oct. 23, 2019, 26 pages.
Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.
Jivorasetkul, Supalerk, et al., "End-to-End Header Compression over Software-Defined Networks: a Low Latency Network Architecture," 2012 Fourth International Conference on Intelligent Networking and Collaborative Systems, Sep. 19-21, 2012, 2 pages, IEEE, Bucharest, Romania.
Lasserre, Marc, et al., "Framework for Data Center (DC) Network Virtualization," RFC 7365, Oct. 2014, 26 pages, IETF.
Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.
Lin, Weidong, et al., "Using Path Label Routing in Wide Area Software-Defined Networks with Open Flow," 2016 International Conference on Networking and Network Applications, Jul. 2016, 6 pages, IEEE.
Long, Feng, "Research and Application of Cloud Storage Technology in University Information Service," Chinese Excellent Masters' Theses Full-text Database, Mar. 2013, 72 pages, China Academic Journals Electronic Publishing House, China.
Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.
Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.
Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.
Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.
Non-Published Commonly Owned U.S. Appl. No. 17/574,225, filed Jan. 12, 2022, 56 pages, VMware, Inc.
Non-Published Commonly Owned U.S. Appl. No. 17/574,236, filed Jan. 12, 2022, 54 pages, VMware, Inc.
Non-Published Commonly Owned U.S. Appl. No. 17/833,555, filed Jun. 6, 2022, 34 pages, VMware, Inc.
Non-Published Commonly Owned U.S. Appl. No. 17/833,566, filed Jun. 6, 2022, 35 pages, VMware, Inc.
Non-Published Commonly Owned U.S. Appl. No. 17/966,814, filed Oct. 15, 2022, 176 pages, VMware, Inc.
Non-Published Commonly Owned U.S. Appl. No. 17/966,820, filed Oct. 15, 2022, 26 pages, VMware, Inc.
Non-Published Commonly Owned U.S. Appl. No. 17/976,717, filed Oct. 28, 2022, 37 pages, VMware, Inc.
Non-Published Commonly Owned U.S. Appl. No. 18/088,554, filed Dec. 24, 2022, 34 pages, VMware, Inc.
Non-Published Commonly Owned U.S. Appl. No. 18/088,555, filed Dec. 24, 2022, 35 pages, VMware, Inc.
Non-Published Commonly Owned U.S. Appl. No. 18/088,556, filed Dec. 24, 2022, 27 pages, VMware, Inc.
Non-Published Commonly Owned U.S. Appl. No. 18/096,001, filed Jan. 11, 2023, 34 pages, VMware, Inc.
Non-Published Commonly Owned U.S. Appl. No. 18/100,369, filed Jan. 23, 2023, 55 pages, VMware, Inc.
Non-Published Commonly Owned U.S. Appl. No. 18/100,381, filed Jan. 23, 2023, 55 pages, VMware, Inc.
Non-Published Commonly Owned U.S. Appl. No. 18/100,397, filed Jan. 23, 2023, 55 pages, VMware, Inc.
Non-Published Commonly Owned Related U.S. Appl. No. 18/126,989 with similar specification, filed Mar. 27, 2023, 83 pages, VMware, Inc.
Non-Published Commonly Owned Related U.S. Appl. No. 18/126,991 with similar specification, filed Mar. 27, 2023, 84 pages, VMware, Inc.
Non-Published Commonly Owned Related U.S. Appl. No. 18/126,992 with similar specification, filed Mar. 27, 2023, 84 pages, VMware, Inc.
Non-Published Commonly Owned U.S. Appl. No. 18/137,584, filed Apr. 21, 2023, 57 pages, VMware, Inc.

(56) References Cited

OTHER PUBLICATIONS

Non-Published Commonly Owned U.S. Appl. No. 18/197,090, filed May 14, 2023, 36 pages, Nicira, Inc.

Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.

Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.

Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.

Taleb, Tarik, "D4.1 Mobile Network Cloud Component Design," Mobile Cloud Networking, Nov. 8, 2013, 210 pages, MobileCloud Networking Consortium, retrieved from http://www.mobile-cloud-networking.eu/site/index.php? process=download&id=127&code=89d30565cd2ce087d3f8e95f9ad683066510a61f.

Tootaghaj, Diman Zad, et al., "Homa: An Efficient Topology and Route Management Approach in SD-WAN Overlays," IEEE INFOCOM 2020_13 IEEE Conference on Computer Communications, Jul. 6-9, 2020, 10 pages, IEEE, Toronto, ON, Canada.

Valtulina, Luca, "Seamless Distributed Mobility Management (DMM) Solution in Cloud Based LTE Systems," Master Thesis, Nov. 2013, 168 pages, University of Twente, retrieved from http://essay.utwente.nl/64411/1/Luca_Valtulina_MSc_Report_final.pdf.

Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.

Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.

Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.

Zakurdaev, Gieorgi, et al., "Dynamic On-Demand Virtual Extensible LAN Tunnels via Software-Defined Wide Area Networks," 2022 IEEE 12th Annual Computing and Communication Workshop and Conference, Jan. 26-29, 2022, 6 pages, IEEE, Las Vegas, NV, USA.

Non-Published Commonly Owned U.S. Appl. No. 15/803,964, filed Nov. 6, 2017, 15 pages, The Mode Group.

\* cited by examiner getHubOrder
```
getHubOrder(
   enterpriseId:   integer,
   edgeId:         integer
)
```

Response
```
{
   edges: [ string ]
}
``` updateHubOrder
```
updateHubOrder(
   enterpriseId:   integer
   edgeId:         integer,
   edges:          [ string ]
)
```

Response
```
{
   error:   string
   rows:    integer
}
``` getBusinessPolicies
```
getBusinessPolicies(
   enterpriseId:   integer,
   edgeId:         integer
)
```

Response
```
{
   rules: [ QOS_business_rule ]
}
``` addBusinessPolicy
```
addBusinessPolicy(
   enterpriseId:   integer,
   edgeId:         integer,
   rule:           QOS_business_rule
)
```

Response
```
{
   error:   string,
   rows:    integer
}
``` removeBusinessPolicy
```
removeBusinessPolicy(
   enterpriseId:   integer,
   edgeId:         integer,
   ruleName:       string
)
```

Response
```
{
   error:   string,
   rows:    integer
}
```

*Figure 4*

IDENTIFYING AND REMEDIATING ANOMALIES IN A SELF-HEALING NETWORK

BACKGROUND

Today, a software-defined wide-area network (SD-WAN) allows enterprises to build flexible WAN (wide area network) networks using programmable network components. The decoupling of the control plane and data plane in a software-defined architecture enables sophisticated Artificial Intelligence and Operations (AIOps) platforms to continually monitor and program the network to respond to higher level security and application considerations. For example, AIOps systems can look at granular flow metadata coupled with global underlay and overlay topology data to reliably detect problems and apply remedial control actions in an analytics-controlled feedback loop.

As workforces become more distributed and applications migrate to multiple clouds, networks become critical components of enterprise productivity. As such, issues on LANs (local area networks), WANs, datacenter, and/or within applications themselves have direct impact on end-user application performance, such as a network router on a flow path suddenly experiencing high packet drops on its outgoing links and causing the end-to-end application to slow down.

BRIEF SUMMARY

Some embodiments of the invention provide a method of detecting and autonomously remediating anomalies in a self-healing SD-WAN (software-defined wide-area network) implemented by multiple forwarding elements (FEs), each of which is located at one of multiple sites connected by the SD-WAN. The method of some embodiments is performed by an anomaly detection and remediation system for the SD-WAN. In some embodiments, the anomaly detection and remediation system includes one or more anomaly detection and remediation processes executed by one or more machines in a cluster. The one or more machines, in some embodiments, include one or more host computers. Also, in some embodiments, the anomaly detection and remediation system is implemented as part of an ENI (Edge Network Intelligence) platform.

From the multiple FEs, the method of some embodiments receives multiple sets of flow data associated with application traffic that traverses the multiple FEs (e.g., edge routers, gateway routers, and hub routers). The method uses a first set of machine-trained processes to analyze the multiple sets of flow data in order to identify at least one anomaly associated with at least one particular FE. The method then uses a second set of machine-trained processes to identify at least one remedial action for remediating the identified anomaly. The method implements the identified remedial action by directing an SD-WAN controller deployed in the SD-WAN to implement the identified remedial action.

In some embodiments, the anomaly detection and remediation system includes multiple sub-systems that execute various processes to detect and remediate anomalies. These sub-systems, in some embodiments, include a data ingestion system, an analytics system, and a control action system. The data ingestion system, of some embodiments, receives the flow data from the FEs that implement the SD-WAN and parses the received flow data into a data structure used internally by the anomaly detection and remediation system. The analytics system receives the parsed flow data from the ingestion system, in some embodiments, aggregates the data, computes performance scores from the data, and uses one or more anomaly detection machine-trained processes to analyze the computed performance scores to identify any anomalies. The control action system of some embodiments receives identified anomalies, uses one or more machine-trained processes to identify remedial actions to obviate the identified anomalies, and sends API calls to the SD-WAN controller to direct the SD-WAN controller to implement the remedial actions in the SD-WAN.

The received flow data, in some embodiments, is associated with multiple applications. In some embodiments, each received set of flow data includes a five-tuple identifier for the associated flow, an application identifier associated with the flow, and a protocol associated with the flow. The flow data, in some embodiments, also includes a set of flow statistics associated with the flow, an overlay route type associated with the flow, a next-hop overlay node for the flow, and a destination hop overlay node associated with the flow. In some embodiments, the set of flow statistics includes an amount of TX bytes associated with the flow, an amount of RX bytes associated with the flow, TCP latency associated with the flow, and a number of TCP re-transmissions associated with the flow.

In some embodiments, the analytics system aggregates the flow data by performing a time aggregation operation on the flow data at a first granularity in order to generate a set of aggregated flow data. For each FE of the multiple FEs, the analytics system of some embodiments uses the set of aggregated flow data to generate a set of performance scores at a second granularity. In some embodiments, the first granularity is a per-minute granularity, and the second granularity is a per-application granularity such that for each FE, each performance score in the set of performance scores for the FE corresponds to a particular minute of time (i.e., in a duration of time over which the flow data was collected) and a particular application. In some embodiments, the performance scores are per-edge, per-application, and per-path.

The machine-trained processes used to analyze the performance scores, in some embodiments, are part of a set of anomaly detection processes that detect anomalies at a short timescale (e.g., 30 minutes), and at a longer timescale (e.g., two weeks). In some embodiments, the shorter timescale anomaly detection process identifies, for each particular FE of the multiple FEs, performance scores associated with each application of multiple applications for which the particular FE forwards traffic flows.

For each particular application, the shorter timescale anomaly detection process generates a distribution graph (e.g., a Gaussian distribution curve) that shows the identified performance scores associated with the particular application for the particular FE over a first duration of time. The shorter timescale anomaly detection process then analyzes the generated distribution graphs using a machine-trained process (e.g., a sliding window Gaussian outlier detection process) to identify one or more per-application incidents by identifying that a threshold number of performance scores associated with the particular application (1) are outliers with respect to the generated distribution graph for the particular application and (2) occurred within a second duration of time.

In some embodiments, each generated distribution graph represents a distribution of the set of performance scores for the particular application over the first duration of time (e.g., 30 minutes). To generate the distribution graph, in some embodiments, the shorter timescale anomaly detection process computes a sample mean of the performance scores for the first duration of time and a standard deviation of the performance scores for the first duration of time. In some embodiments, the computed sample mean and standard deviation are dynamic parameters that change over time based on the generated performance scores. As such, each distribution graph generated for a particular FE varies compared to each other distribution graph generated for the particular FE as the performance scores computed for different durations of time affect the dynamic parameters used to generate the distribution graphs.

In order to identify that a threshold number of performance scores associated with the particular application are outliers with respect to the generated distribution graph for the particular application, some embodiments use the dynamic parameters to determine whether a threshold number of performance scores in the set of performance scores for the particular application exceed a specified threshold of performance. In some embodiments, the first and second durations of time are different durations of time (e.g., different 30 minute time windows), while in other embodiments, the first and second durations of time are the same duration of time (e.g., the same 30 minute time window). In still other embodiments the second duration of time is a subset of the first duration of time (e.g., a 5 minute subset of time within the 30 minute window).

In some embodiments, the longer timescale anomaly detection process is performed iteratively. The longer timescale anomaly detection process of some embodiments receives multiple performance scores that over a duration of time (e.g., two weeks) express a performance of the SD-WAN for at least one particular application associated with flows that traverse the SD-WAN during the time duration. The longer timescale anomaly detection process uses the received performance scores, in some embodiments, to update generated weight values for a topology graph that includes (1) multiple nodes representing the multiple FEs and (2) multiple edges between the multiple nodes representing paths traversed between the edges by the flows associated with the particular application, with the generated weight values being associated with said paths.

The longer timescale anomaly detection process of some embodiments uses a topology-based machine-trained process to analyze the topology graph with the updated generated weight values in order to identify an anomaly in the topology graph that is indicative of an anomaly the SD-WAN for the particular application's traffic flows. For an identified anomaly, the longer timescale anomaly detection process implements a remedial action to modify the SD-WAN in order to remediate the identified anomaly (e.g., by sending an API call identifying the remedial actions to an SD-WAN controller), according to some embodiments.

In some embodiments, when using the topology-based machine-trained process to analyze the topology graph with the generated weight values in order to identify an anomaly, the longer timescale anomaly detection process also determines whether the identified anomaly is isolated to a particular FE (e.g., isolated to a particular edge FE or due to a particular transit FE), or affects the overall application. For instance, in some embodiments, the identified anomaly is a network impairment on a first transit FE that is a next-hop FE for application traffic associated with the particular application and forwarded by a first edge FE located at a first branch site. In some such embodiments, the identified remedial action includes updating a transit FE order configuration for the first edge FE to change the next-hop transit FE for application traffic associated with the particular application and forwarded by the first edge FE from the first transit FE to a second transit FE.

The first transit FE, in some embodiments, is also a next-hop transit FE for application traffic associated with the particular application and forwarded by a second edge FE located at a second branch site. In some such embodiments, the identified anomaly is also associated with the second edge FE when application traffic for the particular application and forwarded by the second edge FE is also affected by the first transit FE's anomalous behavior. The identified remedial action, in some embodiments, is to update transit FE orders for both the first edge FE and the second edge FE.

In some embodiments, the particular application is a first application and the first transit FE is also a next-hop transit FE for application traffic associated with a second application and forwarded by the first edge FE. In some such embodiments, the identified remedial action includes updating the transit FE order configuration for the first edge FE to change the next-hop transit FE from the first transit FE to the second transit FE for application traffic associated with both the first and second applications. When the network impairment only affects traffic associated with the first application, the transit FE order configuration for the particular edge FE is only updated for traffic associated with the first application and not the second application, according to some embodiments.

When an identified anomaly is determined to require remediation to improve performance of as set of one or more flows, in some embodiments, the control action system mentioned above is utilized for identifying and implementing one or more remedial actions that modify the SD-WAN. For a particular anomaly, the control action system, in some embodiments, identifies a set of two or more remedial actions for remediating the particular anomaly in the SD-WAN.

For each identified remedial action in the set, the control action system selectively implements the identified remedial action for a subset of the set of flows for a duration of time in order to collect a set of performance metrics associated with SD-WAN performance during the duration of time for which the identified remedial action is implemented. Based on the collected sets of performance metrics, the control action system of some embodiments uses a machine-trained process to select one of the identified remedial actions as an optimal remedial action to implement for all of the flows in the set, and uniformly implements the selected remedial action for all of the flows in the set.

The particular anomaly, in some embodiments, is an increased latency associated with a first transit FE that forwards application data traffic between one or more edge FEs located at one or more branch sites connected by the SD-WAN and one or more applications deployed to a first cloud datacenter connected by the SD-WAN. The set of two or more remedial actions, in some embodiments, include two or more alternate routes through the SD-WAN to the particular application. For example, the alternate routes of some embodiments include at least (1) a first alternate route between the one or more edge FEs and the one or more applications deployed to a second cloud datacenter connected to the SD-WAN via a second transit FE, and (2) a second alternate route between the one or more edge FEs and the one or more applications deployed to a third cloud datacenter connected to the SD-WAN via a third transit FE.

In some embodiments, the control action system selectively implements each identified remedial action (e.g., each identified alternate path) for a subset of the set of flows for the duration of time by directing (e.g., via an API call to the SD-WAN controller specifying the remedial action) the one or more edge FEs to use the second transit FE to forward a first subset of flows to the one or more applications deployed to the second cloud datacenter, and directing the one or more edge FEs to use the third transit FE to forwards a second subset of flows to the one or more applications deployed to the third cloud datacenter. The one or more edge FEs of some embodiments continue to use the first transit FE to forward a remaining third subset of flows to the one or more applications deployed to the first cloud datacenter.

As the performance metrics are collected for each selectively implemented remedial action, the control action system of some embodiments receives (e.g., from the analytics system described above) or computes itself a performance score for each remedial action. When a performance score generated for the first alternate route is higher than a performance score generated for the second alternate route (i.e., is more optimal), in some embodiments, the machine-trained process of the control action system selects the first alternate route to implement for the set of flows. Alternatively, when the performance score generated for the second alternate route is higher than the performance score generated for the first alternate route, the machine-trained process of the control action system selects the second alternate route to implement for the set of flows. The control action system of some embodiments then sends an API call to the SD-WAN controller to direct the SD-WAN control to update configurations for the one or more edge FEs to cause the edge FEs to use the selected remedial action (e.g., selected alternate path) for all flows in the set.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

FIG. 4 illustrates a list of the above-mentioned API calls and the responses to these API calls, in some embodiments.

DETAILED DESCRIPTION

Figure 1:
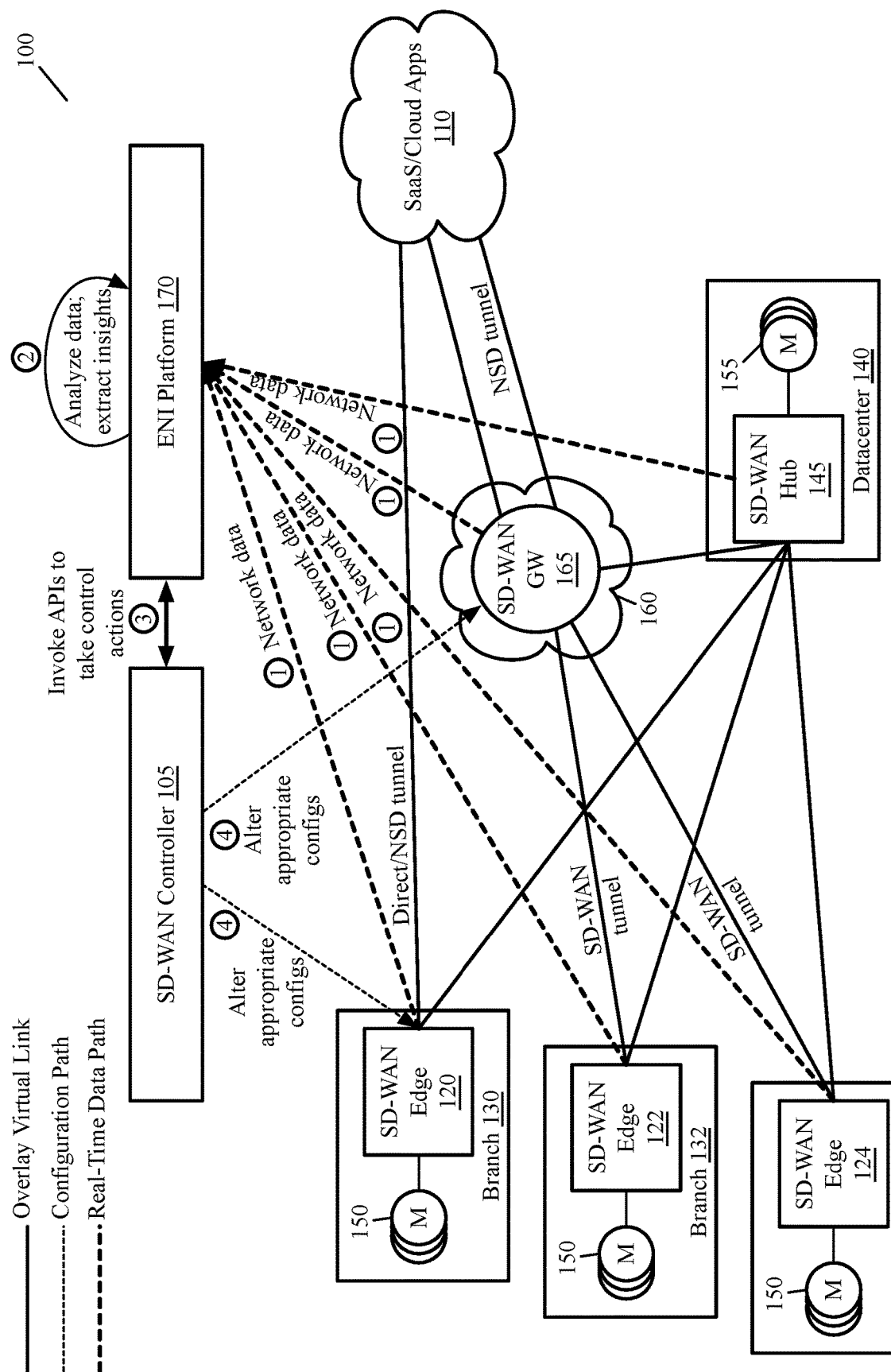
FIG. 1 conceptually illustrates a schematic diagram of a self-healing SD-WAN overlay network architecture of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method of detecting and autonomously remediating anomalies in a self-healing SD-WAN (software-defined wide-area network) implemented by multiple forwarding elements (FEs), each of which is located at one of multiple sites connected by the SD-WAN. The method of some embodiments is performed by an anomaly detection and remediation system for the SD-WAN. In some embodiments, the anomaly detection and remediation system includes one or more anomaly detection and remediation processes executed by one or more machines in a cluster. The one or more machines, in some embodiments, include one or more host computers.

Also, in some embodiments, the anomaly detection and remediation system is implemented as part of an ENI (Edge Network Intelligence) platform.

From the multiple FEs, the method of some embodiments receives multiple sets of flow data associated with application traffic that traverses the multiple FEs, such as edge forwarding elements deployed at sites (e.g., branch sites), and transit FEs, including gateway forwarding elements deployed in cloud datacenters, and hub forwarding elements deployed in public or private datacenters. In some embodiments, these FEs are routers, e.g., are edge routers, cloud gateway routers, and hub routers.

The method uses a first set of machine-trained processes to analyze the multiple sets of flow data in order to identify at least one anomaly associated with at least one particular FE. The method then uses a second set of machine-trained processes to identify at least one remedial action for remediating the identified anomaly. The method implements the identified remedial action by directing an SD-WAN controller deployed in the SD-WAN to implement the identified remedial action.

In some embodiments, the anomaly detection and remediation system includes multiple sub-systems that execute various processes to detect and remediate anomalies. These sub-systems, in some embodiments, include a data ingestion system, an analytics system, and a control action system. The data ingestion system, of some embodiments, receives the flow data from the FEs that implement the SD-WAN and parses the received flow data into a data structure used internally by the anomaly detection and remediation system. The analytics system receives the parsed flow data from the ingestion system, in some embodiments, aggregates the data, computes performance scores from the data, and uses one or more anomaly detection machine-trained processes to analyze the computed performance scores to identify any anomalies. The control action system of some embodiments receives identified anomalies, uses one or more machine-trained processes to identify remedial actions to obviate the identified anomalies, and sends API calls to the SD-WAN controller to direct the SD-WAN controller to implement the remedial actions in the SD-WAN.

The received flow data, in some embodiments, is associated with multiple applications. In some embodiments, each received set of flow data includes a five-tuple identifier for the associated flow, an application identifier associated with the flow, and a protocol associated with the flow. The flow data, in some embodiments, also includes a set of flow statistics associated with the flow, an overlay route type associated with the flow, a next-hop overlay node for the flow, and a destination hop overlay node associated with the flow. In some embodiments, the set of flow statistics includes an amount of TX bytes associated with the flow, an amount of RX bytes associated with the flow, TCP latency associated with the flow, and a number of TCP re-transmissions associated with the flow.

In some embodiments, the analytics system aggregates the flow data by performing a time aggregation operation on the flow data at a first granularity in order to generate a set of aggregated flow data. For each FE of the multiple FEs, the analytics system of some embodiments uses the set of aggregated flow data to generate a set of performance scores at a second granularity. In some embodiments, the first granularity is a per-minute granularity, and the second granularity is a per-application granularity such that for each FE, each performance score in the set of performance scores for the FE corresponds to a particular minute of time (i.e., in a duration of time over which the flow data was collected) and a particular application. In some embodiments, the performance scores are per-edge, per-application, and per-path.

The machine-trained processes used to analyze the performance scores, in some embodiments, are part of a set of anomaly detection processes that detect anomalies at a short timescale (e.g., 30 minutes), and at a longer timescale (e.g., two weeks). In some embodiments, the shorter timescale anomaly detection process identifies, for each particular FE of the multiple FEs, performance scores associated with each application of multiple applications for which the particular FE forwards traffic flows.

For each particular application, the shorter timescale anomaly detection process generates a distribution graph (e.g., a Gaussian distribution curve) that shows the identified performance scores associated with the particular application for the particular FE over a first duration of time. The shorter timescale anomaly detection process then analyzes the generated distribution graphs using a machine-trained process (e.g., a sliding window Gaussian outlier detection process) to identify one or more per-application incidents by identifying that a threshold number of performance scores associated with the particular application (1) are outliers with respect to the generated distribution graph for the particular application and (2) occurred within a second duration of time.

In some embodiments, each generated distribution graph represents a distribution of the set of performance scores for the particular application over the first duration of time (e.g., 30 minutes). To generate the distribution graph, in some embodiments, the shorter timescale anomaly detection process computes a sample mean of the performance scores for the first duration of time and a standard deviation of the performance scores for the first duration of time. In some embodiments, the computed sample mean and standard deviation are dynamic parameters that change over time based on the generated performance scores. As such, each distribution graph generated for a particular FE varies compared to each other distribution graph generated for the particular FE as the performance scores computed for different durations of time affect the dynamic parameters used to generate the distribution graphs.

In order to identify that a threshold number of performance scores associated with the particular application are outliers with respect to the generated distribution graph for the particular application, some embodiments use the dynamic parameters to determine whether a threshold number of performance scores in the set of performance scores for the particular application exceed a specified threshold of performance. In some embodiments, the first and second durations of time are different durations of time (e.g., different 30 minute time windows), while in other embodiments, the first and second durations of time are the same duration of time (e.g., the same 30 minute time window). In still other embodiments the second duration of time is a subset of the first duration of time (e.g., a 5 minute subset of time within the 30 minute window).

In some embodiments, the longer timescale anomaly detection process is performed iteratively. The longer timescale anomaly detection process of some embodiments receives multiple performance scores that over a duration of time (e.g., two weeks) express a performance of the SD-WAN for at least one particular application associated with flows that traverse the SD-WAN during the time duration. The longer timescale anomaly detection process uses the received performance scores, in some embodiments, to update generated weight values for a topology graph that includes (1) multiple nodes representing the multiple FEs and (2) multiple edges between the multiple nodes representing paths traversed between the edges by the flows associated with the particular application, with the generated weight values being associated with said paths.

The longer timescale anomaly detection process of some embodiments uses a topology-based machine-trained process to analyze the topology graph with the updated generated weight values in order to identify an anomaly in the topology graph that is indicative of an anomaly the SD-WAN for the particular application's traffic flows. For an identified anomaly, the longer timescale anomaly detection process implements a remedial action to modify the SD-WAN in order to remediate the identified anomaly (e.g., by sending an API call identifying the remedial actions to an SD-WAN controller), according to some embodiments.

In some embodiments, when using the topology-based machine-trained process to analyze the topology graph with the generated weight values in order to identify an anomaly, the longer timescale anomaly detection process also determines whether the identified anomaly is isolated to a particular FE (e.g., isolated to a particular edge FE or due to a particular transit FE), or affects the overall application. For instance, in some embodiments, the identified anomaly is a network impairment on a first transit FE that is a next-hop FE for application traffic associated with the particular application and forwarded by a first edge FE located at a first branch site. In some such embodiments, the identified remedial action includes updating a transit FE order configuration for the first edge FE to change the next-hop transit FE for application traffic associated with the particular application and forwarded by the first edge FE from the first transit FE to a second transit FE.

The first transit FE, in some embodiments, is also a next-hop transit FE for application traffic associated with the particular application and forwarded by a second edge FE located at a second branch site. In some such embodiments, the identified anomaly is also associated with the second edge FE when application traffic for the particular application and forwarded by the second edge FE is also affected by the first transit FE's anomalous behavior. The identified remedial action, in some embodiments, is to update transit FE orders for both the first edge FE and the second edge FE.

In some embodiments, the particular application is a first application and the first transit FE is also a next-hop transit FE for application traffic associated with a second application and forwarded by the first edge FE. In some such embodiments, the identified remedial action includes updating the transit FE order configuration for the first edge FE to change the next-hop transit FE from the first transit FE to the second transit FE for application traffic associated with both the first and second applications. When the network impairment only affects traffic associated with the first application, the transit FE order configuration for the particular edge FE is only updated for traffic associated with the first application and not the second application, according to some embodiments.

When an identified anomaly is determined to require remediation to improve performance of as set of one or more flows, in some embodiments, the control action system mentioned above is utilized for identifying and implementing one or more remedial actions that modify the SD-WAN. For a particular anomaly, the control action system, in some embodiments, identifies a set of two or more remedial actions for remediating the particular anomaly in the SD-WAN.

For each identified remedial action in the set, the control action system selectively implements the identified remedial action for a subset of the set of flows for a duration of time in order to collect a set of performance metrics associated with SD-WAN performance during the duration of time for which the identified remedial action is implemented. Based on the collected sets of performance metrics, the control action system of some embodiments uses a machine-trained process to select one of the identified remedial actions as an optimal remedial action to implement for all of the flows in the set, and uniformly implements the selected remedial action for all of the flows in the set.

The particular anomaly, in some embodiments, is an increased latency associated with a first transit FE that forwards application data traffic between one or more edge FEs located at one or more branch sites connected by the SD-WAN and one or more applications deployed to a first cloud datacenter connected by the SD-WAN. The set of two or more remedial actions, in some embodiments, include two or more alternate routes through the SD-WAN to the particular application. For example, the alternate routes of some embodiments include at least (1) a first alternate route between the one or more edge FEs and the one or more applications deployed to a second cloud datacenter connected to the SD-WAN via a second transit FE, and (2) a second alternate route between the one or more edge FEs and the one or more applications deployed to a third cloud datacenter connected to the SD-WAN via a third transit FE.

In some embodiments, the control action system selectively implements each identified remedial action (e.g., each identified alternate path) for a subset of the set of flows for the duration of time by directing (e.g., via an API call to the SD-WAN controller specifying the remedial action) the one or more edge FEs to use the second transit FE to forward a first subset of flows to the one or more applications deployed to the second cloud datacenter, and directing the one or more edge FEs to use the third transit FE to forwards a second subset of flows to the one or more applications deployed to the third cloud datacenter. The one or more edge FEs of some embodiments continue to use the first transit FE to forward a remaining third subset of flows to the one or more applications deployed to the first cloud datacenter.

As the performance metrics are collected for each selectively implemented remedial action, the control action system of some embodiments receives (e.g., from the analytics system described above) or computes itself a performance score for each remedial action. When a performance score generated for the first alternate route is higher than a performance score generated for the second alternate route (i.e., is more optimal), in some embodiments, the machine-trained process of the control action system selects the first alternate route to implement for the set of flows. Alternatively, when the performance score generated for the second alternate route is higher than the performance score generated for the first alternate route, the machine-trained process of the control action system selects the second alternate route to implement for the set of flows. The control action system of some embodiments then sends an API call to the SD-WAN controller to direct the SD-WAN control to update configurations for the one or more edge FEs to cause the edge FEs to use the selected remedial action (e.g., selected alternate path) for all flows in the set.

SD-WAN forms the middle layer of the network connection between clients and devices on one end of the network (e.g., at branch, campus, and/or work-from-anywhere locations) and applications on the other end (e.g., cloud applications, datacenter applications). In some embodiments, SASE (secure access service edge) provides cloud-enabled security and network services over the SD-WAN. SASE, in some embodiments, encompasses multiple SDN (software-defined network) and security services such as an SD-WAN, Cloud Web Security, Zero Trust Network Access, etc.

FIG. 1 conceptually illustrates a schematic diagram of a self-healing SD-WAN overlay network architecture 100 of some embodiments. The self-healing SD-WAN augments an SD-WAN network with intelligence by using real-time network data and artificial intelligence/machine learning (AI/ML) algorithms (e.g., machine-trained processes) to monitor, detect, and proactively take control actions to auto-remediate end-user application and security issues (e.g., by programmatically reconfiguring SD-WAN network elements), according to some embodiments.

Multiple branch sites 130, 132, and 134 and devices 150 (e.g., user devices) located at the multiple branch sites 130-134 are connected to the SD-WAN 100 by the SD-WAN edge forwarding elements (FEs) 120, 122, and 124 (e.g., edge routers), and the datacenter 140 that hosts datacenter resources 155 is connected to the SD-WAN by the SD-WAN hub 145 (e.g., a hub router). A gateway FE 165 (e.g., gateway router) is deployed to a cloud 160 in the SD-WAN 100 to connect the SD-WAN edge FEs 120-124 to each other, to the SD-WAN hub FE 145, and to software as a service (SaaS) applications and cloud applications 110. The gateway FE 165, in some embodiments, also connects the SD-WAN 100 to external networks (not shown).

Additionally, the SD-WAN 100 includes an SD-WAN controller 105 for managing the elements of the SD-WAN 100, and an ENI platform 170 for collecting and analyzing flow data to detect and remediate issues (e.g., anomalous behavior associated with FEs, routes, applications, etc.). In some embodiments, the FEs (e.g., edge, hub, and gateway FEs) of the SD-WAN 100 are in a full mesh topology in which each forwarding element is connected to every other forwarding element. In other embodiments, the SD-WAN elements are in partial mesh topologies. Also, in some embodiments, the hub FE 145 serves as a hub in a hub-spoke architecture in which the edge FEs 120-124 serve as spokes.

The ENI platform 170 is a cluster of machines, in some embodiments, that implement a set of processes, including multiple machine-trained processes, for detecting and remediating applications issues in the SD-WAN 100. The ENI platform 170 ingests real-time flow data from network nodes (e.g., the SD-WAN edge FEs 120-124, the SD-WAN gateway FE 165, and the SD-WAN hub FE 145), analyzes and extracts insights from the flow data using AI/ML algorithms, and takes control actions by invoking certain APIs on the SD-WAN controller 105. The control actions alter the appropriate configurations of network nodes to remediate issues detected using machine-trained processes (e.g., machine learning algorithms).

The machine-trained processes are field-trained using unsupervised learning, in some embodiments, while in other embodiments, the machine-trained processes are trained prior to in-field use (e.g., supervised learning in a controlled environment). In still other embodiments, the machine-trained processes are trained both prior to in-field use as well as during in-field use (i.e., a combination of supervised and unsupervised learning).

The SD-WAN controller 105, in some embodiments, is a cluster of network managers and controllers that serves as a central point for managing (e.g., defining and modifying) configuration data that is provided to the edge FEs 120-124 and/or hubs and gateways (e.g., the SD-WAN gateway FE 165 and SD-WAN hub FE 145) to configure some or all of the operations. In some embodiments, this SD-WAN controller 105 is in one or more public cloud datacenters, while in other embodiments it is in one or more private datacenters. In some embodiments, the SD-WAN controller 105 has a set of manager servers that defines and modifies the configuration data, and a set of controller servers that distributes the configuration data to the edge FEs, hubs and/or gateways. In some embodiments, the SD-WAN controller 105 directs edge FEs and hub FEs to use certain gateways (i.e., assigns a gateway to the edges and hubs).

As described above, the SD-WAN 100 includes of two types of forwarding nodes (also called forwarding elements in the discussion below): (1) one or more edge forwarding nodes (also called edge forwarding elements or edges), and (2) one or more transit forwarding nodes (also called transit forwarding elements). An edge node (such as edge 120, 122, 124) resides at the overlay network boundary, in some embodiments, and connects the local-area-network (LAN) of a branch site (e.g., the LAN at a branch site 130, 132, or 134) with the overlay WAN network (e.g., the SD-WAN).

A transit node serves as the intermediary node on the overlay network for routing application flows to their respective destination servers, according to some embodiments. It provides several network-management functions as well as improves application performance by utilizing highly optimized network routes to reach the application servers. Examples of transit nodes include cloud gateways (e.g., cloud gateway 165) and hubs (e.g., hub 145). A hub forwarding element provides access to resources of datacenter (e.g., resources 155 of the datacenter 140) and also serves as a transit node for passing flows from one edge FE of one branch site to another edge FE of another branch site, according to some embodiments. For example, the SD-WAN hub 145 is connected to each of the SD-WAN edge FEs 120-124.

In some embodiments, flows that traverse the edge FEs and transit FEs are associated with various applications. Examples of applications, in some embodiments, include VOIP (voice over IP) applications, database applications, web applications, and applications for running virtual machines (VMs). Each application, in some embodiments, executes on a device operating at a site connected to the SD-WAN. For example, applications of some embodiments execute on devices operating at datacenters (e.g., public datacenters or private datacenters), in clouds (e.g., public clouds or private clouds), and at branch sites (e.g., on user devices operating at the branch sites). In some embodiments, different instances of the same application (e.g., a VOIP application) execute on separate user devices at separate branch sites and communicate via paths between the branch sites (e.g., direct paths between edge routers at each branch site, paths between the edge routers that traverse transit routers, etc.).

The datacenter 140 is one of multiple cloud datacenters connected by the SD-WAN, in some embodiments. In some such embodiments, each cloud datacenter can be provided by the same or different providers, while each of the branch sites 130-134 belongs to the same entity, according to some embodiments. The branch sites 130-134, in some embodiments, are multi-machine sites of the entity. Examples of multi-machine sites of some embodiments include multi-user compute sites (e.g., branch offices or other physical locations having multi-user computers and other user-operated devices and serving as source computers and devices for requests to other machines at other sites), datacenters (e.g., locations housing servers), etc. These multi-machine sites are often at different physical locations (e.g., different buildings, different cities, different states, etc.). In some embodiments, the cloud datacenters are public cloud datacenters, while in other embodiments the cloud datacenters are private cloud datacenters. In still other embodiments, the cloud datacenters may be a combination of public and private cloud datacenters. Examples of public clouds are public clouds provided by Amazon Web Services (AWS), Google Cloud Platform (GCP), Microsoft Azure, etc., while examples of entities include a company (e.g., corporation, partnership, etc.), an organization (e.g., a school, a non-profit, a government entity, etc.), etc.

The datacenter 140 includes a hub 145, as mentioned above, for connecting the datacenter 140 to the SD-WAN 100 (e.g., to the SD-WAN gateway 165 and/or the edge FEs 120-124), and for connecting branch sites 130-134 to the resources 155 of the datacenter 140. The datacenter resources 155, in some embodiments, are application resources. In some embodiments, additional SD-WAN gateways may be present and can include multi-tenant, stateless service gateways deployed in strategic points of presence (PoPs) across the globe. Some such gateways serve as gateways to various clouds and datacenters, such as the SaaS/Cloud applications 110. Also, in some embodiments, other additional SD-WAN forwarding elements may be present, including additional edge devices located at other branch sites of the entity, as well as additional SD-WAN hub FEs. Hub FEs, in some embodiments, use or have one or more service engines to perform services (e.g., middlebox services) on data messages that it forwards from one branch site to another branch site.

In some embodiments, between any two SD-WAN nodes (e.g., an SD-WAN edge 120-124 and an SD-WAN gateway 165), a network path is established between every available network interface pair. WAN optimization technology is used, in some embodiments, is used to send packets over the available paths in response to time-varying underlying network conditions. An example of such a WAN optimization technology used in some embodiments is a proprietary technology called Dynamic Multi-path Optimization (DMPO). When DMPO is used, in some embodiments, active paths with the best instantaneous network quality are used to send the application packets. In some embodiments, the outcome of DMPO optimization is a reliable overlay link between any two SD-WAN nodes even though the underlay network links may experience time-varying fluctuations.

At the flow level, in some embodiments, an application flow can take several different paths on the overlay network. Examples of such paths in some embodiments include (1) a Direct/NSD path (i.e., a non-SD-WAN path), (2) an Edge-Gateway/Hub-Application path, and (3) an Edge-Gateway/Hub-Edge-Application path. For the direct/NSD path, the application flow does not traverse the overlay network and is either put directly on the public internet or is routed through a non-SD-WAN (NSD) tunnel to the application destination, in some embodiments. For the Edge-Gateway/Hub-App path, in some embodiments, the application flow traverses the path established between the Edge node and the Gateway/Hub node and is then eventually routed to the application destination. Finally, for the Edge-Gateway/Hub-Edge-App path, the application flow is routed from one Edge node to another Edge node via the Gateway/Hub and then to the application destination, according to some embodiments.

On the overlay SD-WAN network, in some embodiments, there are several control knobs that affect the end-to-end application performance. In some embodiments, these control knobs can be categorized into two buckets: (1) link-level parameters and (2) path-level parameters. Link level parameters refer to several parameters inside the DMPO protocol on a single overlay link that control the packet transmission reliability on a single overlay link, according to some embodiments. Examples of such parameters, in some embodiments, include rate limit, traffic classification/QoS prioritization and interface switching configuration. Path level parameters refer to which paths are selected for routing application flows, in some embodiments. These include selecting direct versus overlay paths, in some embodiments, and, within overlay paths, selecting which transit node to choose as the intermediary node. In some embodiments, these parameters trade off application performance with network stability and uniform network load distribution.

While the self-healing SD-WAN technology encompasses control actions across all aspects of the network, some embodiments specifically focus on the aspect of dynamically selecting an overlay transit node (e.g., a hub node or a gateway node) as the control parameter to dynamically re-route application traffic in response to real-time end-to-end application performance conditions. The SD-WAN edge FEs 120-124, in some embodiments, are configured to stream flow metadata to a data ingestion system within an Edge Network Intelligence (ENI) Platform (not shown) of the SD-WAN 100.

The flow metadata messages streamed by the SD-WAN edge FEs, in some embodiments, include contextual information for each flow, such as the source and destination IP (Internet Protocol) addresses, source and destination ports, network protocol, and flow statistics. Examples of flow statistics, in some embodiments, include the average packet latency, drop and jitter, the number of bytes transmitted and received over the last minute, and the next hop and destination hop overlay nodes. In some embodiments, these flow metadata messages provide granular per-flow and device-level information and, in some embodiments, are streamed to an ENI analytics machine or machine cluster (not shown) through a message broker (e.g., Apache Kafka message broker) after cleaning and data normalization.

In some embodiments, the analytics process of the ENI platform is responsible for taking raw edge flow data and identifying application performance incidents in a streaming fashion. To facilitate parallel processing of edge data, in some embodiments, it is run on an analytics cluster (e.g., an Apache Spark cluster) in a three-stage process of aggregation, scoring, and anomaly detection.

Figure 2:
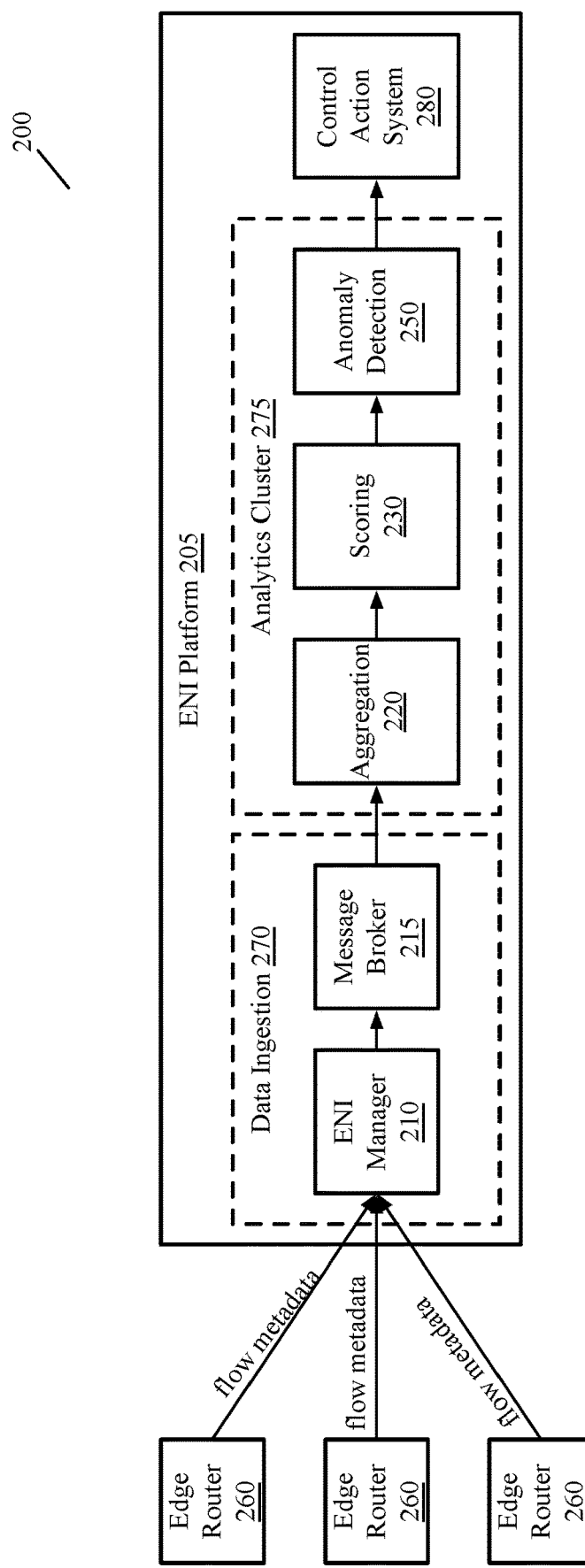
FIG. 2, for instance, conceptually illustrates a block diagram that includes an analytics machine cluster of some embodiments.

FIG. 2, for instance, conceptually illustrates a block diagram 200 that includes an analytics cluster of some embodiments. As shown, the diagram includes SD-WAN edge routers 260 and an ENI platform 205. The ENI platform includes a data ingestion system 270, an analytics cluster 275, and a control action system 280. The data ingestion system 270 includes an ENI manager 210 and a message broker 215, while the analytics cluster 275 includes an aggregation pipeline 220, a scoring pipeline 230, and an anomaly detection pipeline 250.

As mentioned above, the SD-WAN edge routers 260 are configured to stream flow metadata to the data ingestion system 270 of the ENI platform 205. The ENI manager 210 (also referred to as an ENI backend) receives flow data from the edge routers 260, parses the flow data, and converts it into ENI internal data structures, according to some embodiments. In some embodiments, the ENI manager 210 is an ENI manager that executes a Java process. The flow data, in some embodiments, are protobuf messages. In some embodiments, each message includes a 5-tuple for the flow, an application identifier, protocol, flow statistics (e.g., TX bytes, RX bytes, TCP latency, and TCP retransmissions), and overlay route information (e.g., overlay route type, next hop overlay node, and destination hop overlay node), as also mentioned above. The edge routers 260 of some embodiments stream the flow data to the ENI manager 210 at a 1 minute stream frequency.

As the ENI manager 210 receives, parses, and converts flow data, the ENI manager 210 passes the converted flow data (i.e., in the ENI internal data structures) to the message broker 215. The message broker 215, in some embodiments, is a message broker between the ENI manager 210 and analytics cluster 275. As such, as the message broker 215 receives the converted flow data from the ENI manager 210, the message broker 215 passes the converted flow data to the aggregation pipeline 220 of the analytics cluster 275.

The aggregation pipeline 220 of the analytics cluster 275 reads raw data from the message broker 215 and performs a time aggregation operation to aggregate metrics (e.g., collected operational values) extracted from the raw data at a particular granularity. The granularity, in some embodiments, is a per-minute granularity such that a set of aggregated metrics are generated for each minute of a duration of time for which the raw data was collected.

In some embodiments, the messages streamed into the analytics cluster 275 have variable delays, and as such, the aggregation pipeline 220 is designed to accommodate late-arriving data by storing aggregates for a small duration past the end of the aggregation window, in some embodiments, and transmitting them downstream only after this duration has elapsed. For example, when calculating the aggregation for a window between times 12:03 and 12:04, some embodiments wait until 12:05 to receive data timestamped between 12:03 and 12:04 and add this additional data to the aggregate. Only at 12:05 will this aggregate be transmitted to the scoring pipeline 230 of the analytics cluster. In some embodiments (e.g., when using an Apache Spark cluster), this is done by maintaining a state for each edge router, application, and overlay next-hop node.

After aggregating raw data to the minute level, the aggregation pipeline 220 provides the data to the scoring pipeline 230 of the analytics cluster 275. The scoring pipeline 230 of some embodiments transforms this data into measurements of end-user application performance at a second granularity. In some embodiments, the scoring pipeline 230 performs this transformation by combining multiple raw metrics into a single score per key (e.g., a tuple for every edge router, application, and flow combination) that represents a holistic assessment of the average application performance of an edge router for each minute.

The performance scores, in some embodiments, are an application performance QoE scores on a (1) per-edge, (2) per-application, (3) per-overlay-route, and (4) per-minute level, according to some embodiments. For example, for a TCP flow, packet latency and retransmit percentage are used, in some embodiments, against pre-determined thresholds to compute a score. The self-healing system of some embodiments, however, allows flexibility to customize the scoring function on an application level and enterprise level. The scoring pipeline 230 of the analytics cluster 275 streams these scores to the anomaly detection pipeline 240.

The anomaly detection pipeline 240 of the analytics cluster 275 receives an overall performance score at the minute level for every edge, application, next-hop and destination overlay node. These scores are passed through machine learning models, in some embodiments, to detect large deviations in performance from the normal baseline. In some embodiments, the outcome of this step is an application performance incident that is generated and sent to the analytics control action system 280.

In some embodiments, as will be further described below, the anomaly detection pipeline 240 is broken into a fast acting change detection pipeline (e.g., a shorter timescale anomaly detector) and a global application performance analysis and machine learning recommendation pipeline (e.g., a longer timescale anomaly detector). The fast acting change detection pipeline of some embodiments runs time-series machine learning models on a (1) per-edge, (2) per-application, and (3) per-overlay-nexthop-node level to analyze and detect sudden degradation in performance, according to some embodiments.

In some embodiments, the global application performance analysis and machine learning recommendation pipeline runs machine learning models on a longer time-window data and computes application performance insights at the global topology level. In some embodiments, the global application performance analysis and machine learning recommendation pipeline identifies problematic edge, application, overlay-nexthop-node combinations and extracts valuable insights on application performance across the entire customer deployment.

After incidents have been detected by the analytics cluster, the control action system 280 takes a corrective action by 1) identifying if a remedial action on an impacted Edge is necessary, 2) determining which remedial action to take, and 3) autonomously applying the chosen remedial action (i.e., applying the chosen action without input from a user). This then creates a closed loop system that self-heals end-to-end application issues. Determining which remedial action to take, in some embodiments, includes using a machine-trained reinforcement learning process, as will be further described by embodiments below.

In some embodiments, the control action system 280 combines data from the (mainly domain agnostic) machine learning-based pipelines and (domain specific) topology and configuration information from an SD-WAN controller (not shown) to generate appropriate control actions which are then applied to the SD-WAN system through the SD-WAN controller. A control action (also referred to as a remedial action) involves programmatically altering the controllable parameters in the SD-WAN system, in some embodiments. The control action system 280 of some embodiments applies the control actions through API calls to the SD-WAN controller (not shown). For example, for VMware SD-WAN solutions, these changes are handled by a cloud-based management system called the VeloCloud Orchestrator (VCO). The VCO stores and periodically synchronizes edge configurations to all the network edges. This configuration can be modified by users via a GUI or an API which then dynamically alters the flow of network traffic.

Figure 3:
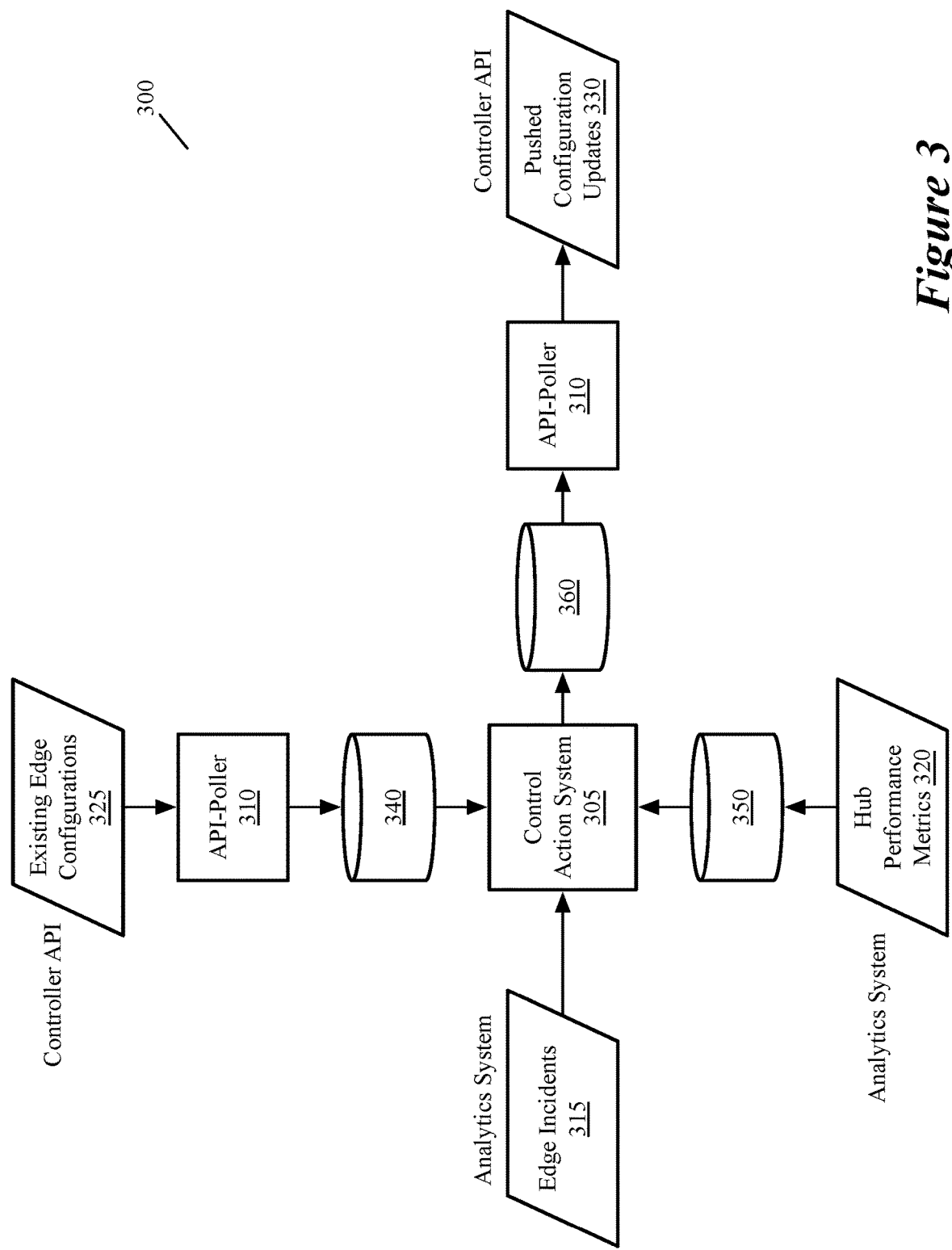
FIG. 3 conceptually illustrates a block diagram of interactions of some embodiments between a control action system of an ENI platform deployed in an SD-WAN and an SD-WAN controller for the SD-WAN.

FIG. 3 conceptually illustrates a block diagram 300 of interactions of some embodiments between a control action system of an ENI platform deployed in an SD-WAN and an SD-WAN controller for the SD-WAN. After the analytics cluster (not shown) identifies edge incidents 315 (e.g., anomalies and deviations in performance associated with one or more edge-application pairs), the edge incidents 315 are provided to the control action system 305. Additionally, for cases in which the SD-WAN architecture includes a hub-spoke topology and where an identified control action is to dynamically change the order of hubs for the edge (i.e., configure the edge to use a different hub for forwarding at least a subset of application traffic), the control action system 305 queries a datastore 350 for existing hub performance metrics 320, which are populated earlier by the analytics engine. An example of a datastore 320 used in some embodiments is an Apache Cassandra table.

When a remedial action is identified for remediating at least one of the edge incidents 315 for at least one edge-application pair, in some embodiments, the control action system 305 also retrieves existing configuration data 325 for the affected edge from the SD-WAN controller. The control action system 305, of some embodiments, is run on the analytics cluster described by FIG. 2 above. In some embodiments, the analytics cluster is an open-source analytics cluster such as an Apache Spark cluster.

The control action system 305 communicates with the SD-WAN controller using an API polling process that facilitates communication between the ENI platform that includes the control action system 305 and other third-party APIs, according to some embodiments. The API-poller 310, of some embodiments, queries the SD-WAN controller API for the existing edge configuration data 325 and writes the data to a datastore 340. The datastore 340, in some embodiments, is an open-source distributed wide-column datastore (e.g., Cassandra).

The open-source analytics cluster on which the control action system 305 runs, in some embodiments, queries the datastore 340 to make recommendations (i.e., for remediating identified network incidents). With the existing edge configuration 325 and knowledge of the hub performance metrics 320 for the affected edge-application pair, the control action system 305 of some embodiments creates a recommendation for a new hub order and writes this recommendation to a distributed search and analytics datastore 360 (e.g., an Elasticsearch type). In some embodiments, the API-poller 310 queries the recommendations from the datastore 360 and sends the queried recommendations as API calls to the SD-WAN controller to make the actual configuration changes. In some embodiments, the control action system 305 uses a controller API (e.g., the VCO API) to apply its recommended edge configuration changes. For example, the API-poller 310 sends the pushed configuration updates 330 to the SD-WAN controller in the block diagram 300.

Examples of the API calls invoked by the API-poller 310, in some embodiments, include getHubOrder to retrieve the hub order for one or more edges, updateHubOrder to change the configured hub order, getBusinessPolicies to retrieve business policies associated with a particular enterprise and/or edge FE(s), addBusinessPolicy to add a new business policy rule for an enterprise and/or particular edge FE(s), and removeBusinessPolicy to delete a business policy for an enterprise and/or particular edge FE(s). For each of these API calls, in some embodiments, the API-poller 310 specifies one or more edge identifiers associated with one or more edge FEs for which a configuration (e.g., hub order, business policy, etc.) is being retrieved or changed, and an enterprise identifier associated with the particular enterprise to which the one or more edge FEs belong.

In some embodiments, the getBusinessPolicies API call can instead be getBusinessPolicy with a "name" argument to search for the "Internet backhaul" rule directly. Additionally, in some embodiments, all of these API calls require an additional argument for segment logicalID or segment name. In some embodiments, the API calls can be separated into override/profile-level rules or combined into a single list. FIG. 4 illustrates a list of the above-mentioned API calls and the responses to these API calls, in some embodiments.

In some embodiments, the control action system looks to identify poor-performing edges and applications in a hub-spoke model and to add business policies updating the hub order at the edge-override level. At the input side, some embodiments include ENI incidents containing the ENI companyId affected, the logicalId of the affected edge, and a list of affected applications by ENI appStackId. Depending on the number of applications affected, some embodiments apply this new business policy to the affected applications, while in other embodiments, a single business policy is created to switch the hub order for all TCP traffic.

Because ENI "companyId", edge "logicalId", and ENI "appStackId" are not recognized by APIv1, the first step in the control action of some embodiments is to resolve these values to identifiers usable by APIv1, such as the enterprise's ID, edge's ID, and a configuration modules' "appId" (i.e., inside the field "match"). The "appId" is resolvable through the ENI file "vco_to_voyance_app_ids.json" and requires no calls to APIv1. For "enterpriseId", the call /network/getNetworkEnterprises is made, in some embodiments, to get a list of all enterprise "logicalId" and corresponding "id", which are stored as an internal map, in some embodiments. In some embodiments, a database (e.g., MongoDB) is then used to obtain the "logicalId" from the "companyId" and look up the appropriate "id" from the "logicalId". For edges, /enterprise/getEnterpriseEdges is used to obtain a list of edges, in some embodiments, on a given "enterpriseId", which is then used to construct a map of edge "logicalId" to edge "id".

Using the enterprise and edge identifiers, some embodiments use the API to get the affected edge's configuration modules and apply changes. In some embodiments, this begins with a call to/edge/getEdgeConfigurationStack. Inside the resulting JSON, both the profile-level configurations and the edge (override)-level configurations are used, in some embodiments. The profile-level configuration, in some embodiments, is assumed to contain a business policy named "Internet backhaul" which contains the current hub order for the edge. This business policy is used as a template, in some embodiments, to construct a new business policy at the override level. At both the profile- and override-level, in some embodiments, the QoS module is extracted. In some embodiments, the profile-level "Internet backhaul" business policy is taken, the desired hub order changes, and, if applicable, appId, are applied, and this business policy is combined with the existing policies in the override-level, and the configuration change is made.

There are three cases for the configuration change, according to some embodiments. If the edge has no edge overrides and has not had any in the past, no QoS module at the override level will exist, in some embodiments, and as such, some embodiments create one with/configuration/ insertConfigurationModule. If there have been previous edge overrides (or edge override currently exist), a QoS module will exist, which can be updated with /configuration/ updateConfigurationModule, according to some embodiments. However, if there are no current edge overrides, in some embodiments, the global segment for the QoS will not exist (i.e., the "segments" field will be an empty JSON array). In the case where the global segment does not exist or a configuration module must be inserted, some embodiments first determine the logicalId of the global segment at the edge override-level. In some embodiments, doing so requires a call to/enterprise/getEnterpriseNetworkSegments. For simplicity of the internal Scala logic, this call is made, in some embodiments, even when it is not strictly necessary because of an existing global segment.

The API calls, in some embodiments, include/network/ getNetworkEnterprises, /enterprise/getEnterpriseEdges, /edge/getEdgeConfigurationStack, /enterprise/getEnterpriseNetworkSegments, /configuration/updateConfigurationModule, and /configuration/insertConfigurationModule. In some embodiments, ENI incidents include a companyId, which is an identifier for the customer whose network is affected in the incident. Currently, ENI determines a network controller enterprise's logicalId from a companyId, in some embodiments. The enterprise's identifier must subsequently be determined, in some embodiments to provide as an argument to other API calls. To do so, some embodiments use /network/getNetworkEnterprises to fetch a list of all enterprises on a network controller, and use this list to construct a map of logicalId→id. When using APIv2, which works with logicalId directly, some embodiments do not need an analogous functionality for a v2 implementation of the control action system.

In some embodiments, ENI incidents include an edge's logicalId, but do not contain the edge's id. As such, some embodiments use /enterprise/getEnterpriseEdges to fetch a list of all edges on a given enterprise, and use this list to construct a map of logicalId→id. As with /network/getNetworkEnterprises, an analogous functionality for a v2 implementation of the control action system is not needed, in some embodiments.

To apply the hub order switch control action, in some embodiments, an update needs to be applied to an edge's QoS configuration module at the edge-override level. To simplify the construction of the hub order switch business policy, it is assumed, in some embodiments, that the edge has an existing rule at the profile level that includes the current hub order. Additionally, some embodiments use the override-level QoS for the edge, as in order to add a new business policy without removing old ones, the full JSON of the current QoS module is required.

In some embodiments, new business policies are applied to the global segment in self-healing. When no current edge-specific overrides exist, in some embodiments, the global segment may be empty, and so the override-level QoS module will include an empty "segments" field. In some such embodiments, a new global segment is inserted (i.e., rather than simply updating the existing one). Since no global segment exists on this module, in some embodiments, this API call is made to determine the ID of the global segment that is being inserted.

The API call /configuration/updateConfigurationModule, in some embodiments, applies the new business policy. The business policy is constructed from a template policy at the profile-level named "Internet backhaul", in some embodiments, which is retrieved from /edge/getEdgeConfigurationStack. In some embodiments, the newly constructed policy is combined with existing policies (if any) and given as the data to /configuration/updateConfigurationModule.

In some embodiments, the API call /configuration/insertConfigurationModule also applies the new business policy. When an edge has no edge-level QoS module (e.g., when the edge has no edge-level overrides and has not had any such overrides in the past), in some embodiments, /configuration/updateConfigurationModule cannot be called as there is no module to update. Hence, some embodiments insert one instead. Beyond this detail, the logic for constructing a new business policy, in some embodiments, are largely similar between the insert and update calls.

In some embodiments, there are two modes in which self-healing operates. The first model, in some embodiments, includes recommendations with manual remediation, while and, the second model includes automated remediations, which are configurable at the level of an edge, application, and enterprise. When automatic remediation is disabled, in some embodiments, the recommendations by the control action system 305 are not immediately applied by the API-poller 310 to make configuration updates. Instead, they are shown to an end-user on a user interface (UI) provided by the ENI platform, in some embodiments, to allow the end-user to opt to apply, or disregard, these recommendations afterwards. To allow this, the ENI UI of some embodiments calls an ENI-internal API to apply the recommendation, which updates the recommendation's status in the distributed search and analytics datastore 360 and is subsequently read by the API-poller and applied.

The self-healing SD-WAN system of some embodiments also detects application performance anomalies on two different timescales. The first timescale is a shorter timescale at the minutes level, while the second timescale is a longer timescale at the days level, according to some embodiments. The first timescale, in some embodiments, addresses application issues that are happening currently (e.g., acute issues) and need to be addressed soon. Examples of such issues, in some embodiments, include sudden excessive packet drops at a router on an end-to-end path, a sudden network failure inside a datacenter, or a sudden issue with an application server. In some embodiments, the second timescale addresses application issues that are systemic and require a longer-term network optimization. Examples of these issues include an inefficient network setup that causes flows to be routed through inefficient routes, or a change in network utilization that has rendered initial configurations inefficient, in some embodiments.

As mentioned above, each SD-WAN edge FE streams per-application flow data to the ENI platform where the analytics cluster aggregates the flow data at a minute-level granularity, in some embodiments. For an edge e and application a, let $\{m_{e,a}^i(t)\}$ denote the collection of flow-metrics such as packet-latency, packet drop, jitter, bytes sent/received, etc. Let $\{s_{e,a}(t)\}$ denote the application performance scores computed from the above flow metrics for each edge and application. For example, $s_{e,app_i}(t)$ represents the performance score for a first application (e.g., Office 365 application) at edge e for flows routed through a respective configured gateway FE.

At the shorter timescale, which is on the order of minutes, the goal of the self-healing system, in some embodiments, is to detect an application performance issue that suddenly affects certain edges and flows on the network. To this end, a time-series outlier detection methodology is utilized, in some embodiments, as will be explained in greater detail below.

For instance, let $\Omega$ denote the outlier detection model applied to $s_{e,a}(t)$ to detect if there is an anomaly or a sudden change in application performance score for a specific edge and application that warrants the self-healing system to take remediation action. While $\Omega$ can be any general timeseries anomaly detection model, a specific example used, in some embodiments, is a sliding window Gaussian outlier detection model. Let W denote a sliding window of data (e.g., 30 minutes) and assume that within this window, $s_{e,a}(t)$ follows a Gaussian distribution. Let $\tilde{\mu}_{e,a}$ and $\tilde{\sigma}_{e,a}$ denote the sample mean and standard deviation in W. The instantaneous score value at time t is considered a deviation event $\delta(t)$ if $|s_{e,a}(t)-\tilde{\mu}_{e,a}|/\tilde{\sigma}_{e,a} > \gamma$, for a specified threshold $\gamma$, according to some embodiments. To minimize false positives due to a single point variation, some embodiments look for consecutive points of deviation and then combine them to declare an application incident. Specifically, some embodiments generate an application performance incident if there are at least $\eta$ (e.g., $\eta=3$) number of consecutive deviation events.

Figure 5:
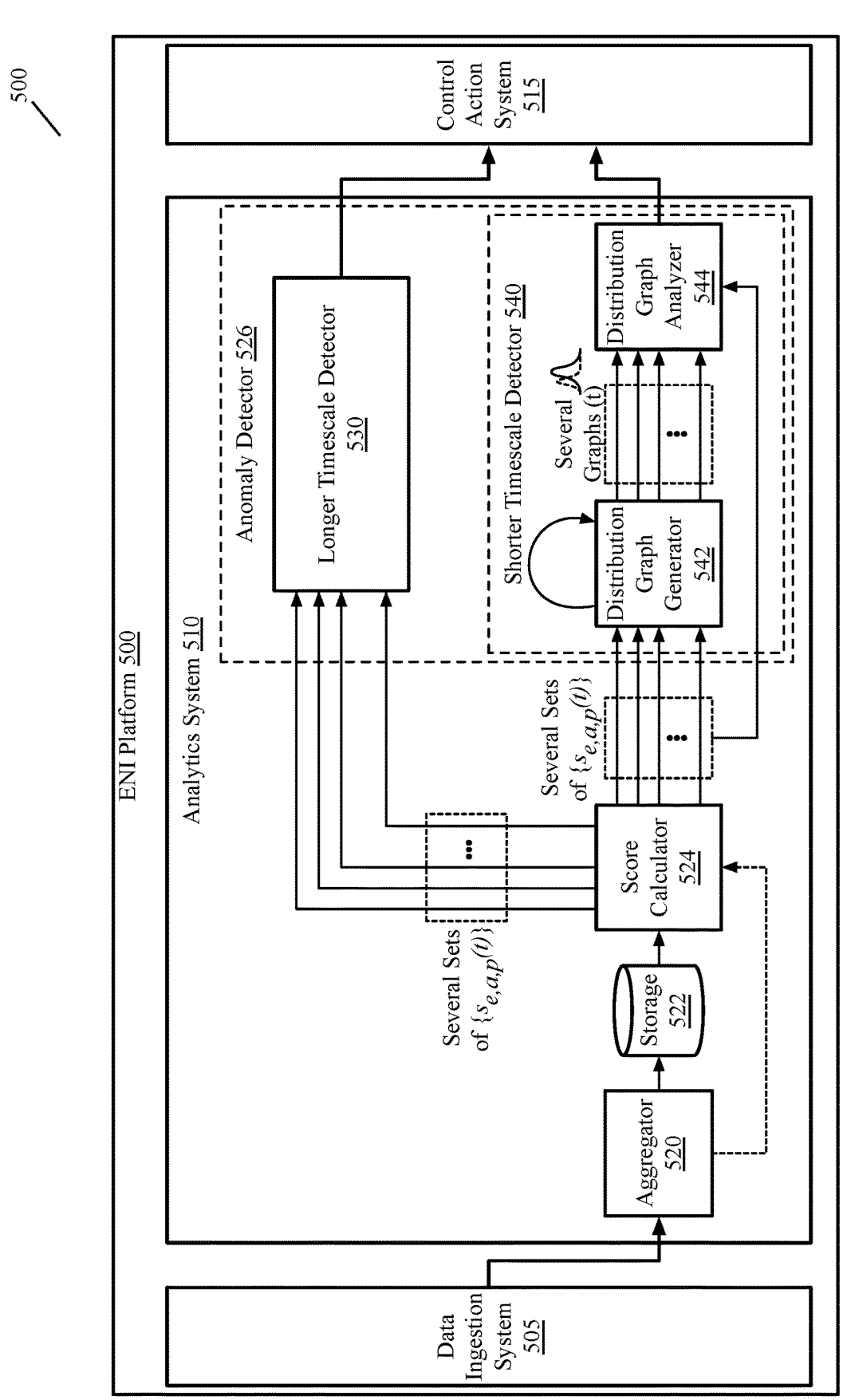
FIG. 5 conceptually illustrates a more detailed block diagram of an ENI platform of some embodiments that includes separate anomaly detectors for the shorter and longer timescales described above and an in-depth view of the shorter timescale anomaly detector.

FIG. 5 conceptually illustrates a more detailed block diagram of an ENI platform of some embodiments that includes separate anomaly detectors for the shorter and longer timescales described above and an in-depth view of the shorter timescale anomaly detector. As shown, the ENI platform 500 includes a data ingestion system 505, an analytics system 510, and a control action system 515. The analytics system 510 (e.g., analytics cluster) includes an aggregator 520, storage 522, score calculator 524, and anomaly detector 526. In this example, the anomaly detector 526 includes a longer timescale detector 530 and a shorter timescale detector 540, which includes a graph generator 542 and a graph analyzer 544. The aggregator 520, storage 522, score calculator 524, and anomaly detector 526, in some embodiments, are processes run by one or more machines of the analytics system 510.

As the data ingestion system 505 receives flow data $\{m_{e,a}{}^i(t)\}$ from network nodes (e.g., edge nodes and transit nodes), the data ingestion system 505 provides this flow data to the aggregator 520 of the analytics system 510 as also described above. The flow data, in some embodiments, includes packet-latency, packet drop, jitter, and bytes sent/received. The aggregator 520 aggregates the received flow data on a per-minute level, and places the aggregated data in the storage 522. In other embodiments, the aggregator 520 provides the aggregated data directly to the score calculator 524.

The score calculator 524 retrieves the aggregated data from the storage 522, or receives the aggregated data directly from the aggregator 520, in some embodiments, for use in calculating performance scores $\{s_{e,a}(t)\}$ for each minute of aggregated data on a per-edge router, per-application, and per-path basis. As the score calculator 524 calculates the performance scores, the score calculator 524 provides the performance scores to the anomaly detector 526. As illustrated, the performance scores are iteratively provided to both the longer timescale detector 530 of the anomaly detector 526 and the shorter timescale detector 540 of the anomaly detector 526. In some embodiments, as the score calculator 524 provides the performance scores continuously as they are calculated, while in other embodiments, the score calculator 524 provides sets of performance scores. The processes of the longer timescale detector 530 will be described further below by FIG. 9.

The graph generator 542 of the shorter timescale detector 540 receives the performance scores from the score calculator 524 and uses the scores to generate graphs (e.g., Gaussian distribution curves). For a particular 30 minute window, the graph generator 542 computes a sample mean fie, and a standard deviation $\tilde{\sigma}_{e,a}$. In embodiments that utilize Gaussian distribution, the sample mean $\tilde{\mu}_{e,a}$ determines the center of the distribution curve, while the standard deviation $\tilde{\sigma}_{e,a}$ determines the width of the distribution curve. Additionally, the height of any such Gaussian distribution curve is determined by $\alpha = 1/(c\sqrt{2\pi})$. Based on these calculations, the graph generator 524 generates a graph for each 30 minute window for which it has received performance scores.

Figure 6:
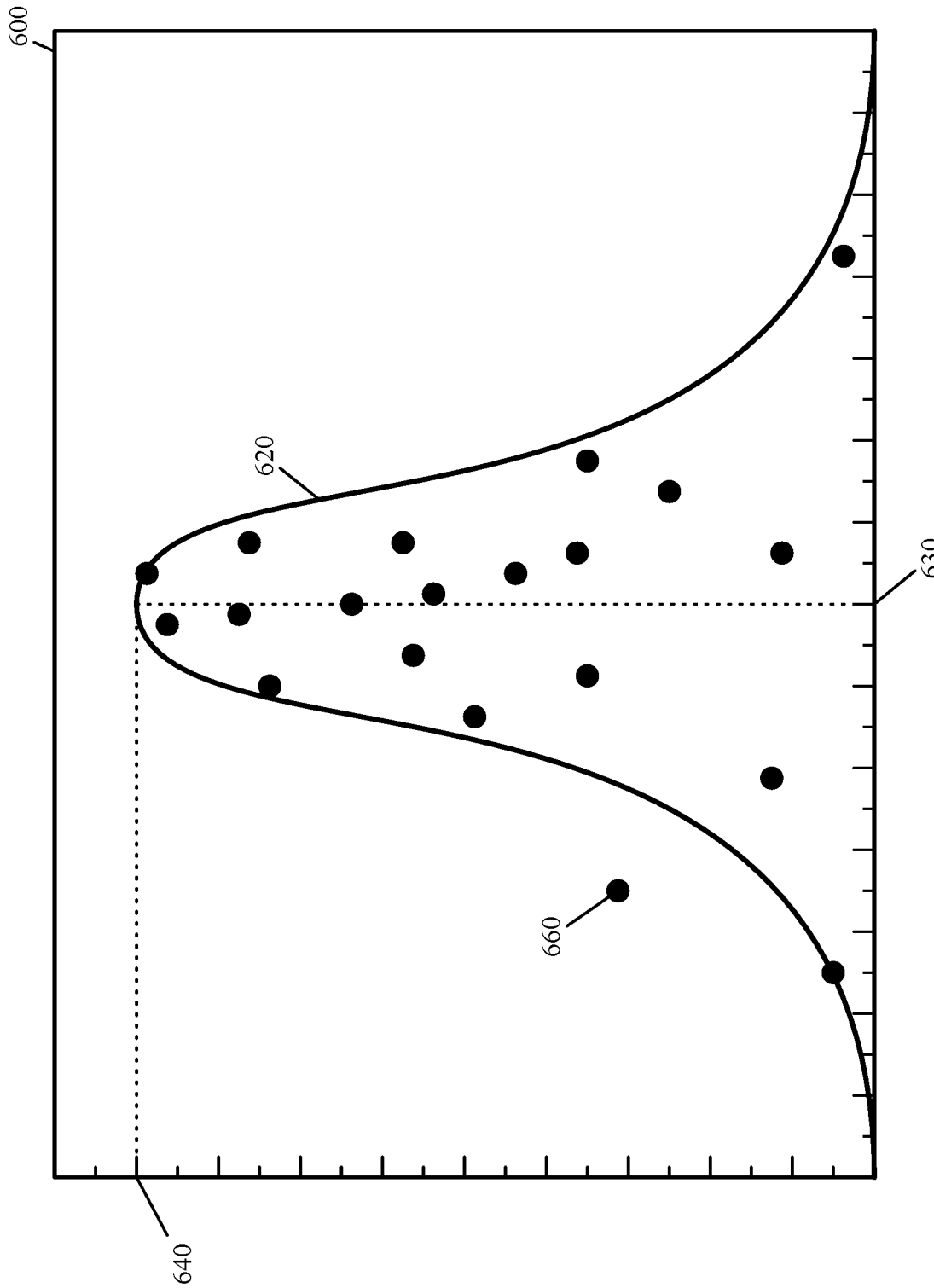
FIG. 6 illustrates a graph of some embodiments that includes an example of a Gaussian distribution curve that is generated using performance scores computed over a particular 30 minute time window.

FIG. 6 illustrates a graph 600 of some embodiments that includes an example of a Gaussian distribution curve that is generated using performance scores computed over a particular 30 minute time window. The curve 620 has a height 640, and a center 630, as shown. While the majority of the performance scores, which are represented by multiple plotted points, fall within the curve 620, one performance score 660 falls outside of the curve. In some embodiments, this performance score 660 is considered an outlier. When three consecutive outliers are detected, in some embodiment, a deviation event is generated, as will be further described below. It should be noted that both the curve 620 and the plotted performance scores in this example are meant to be exemplary and are not representative of actual generated performance scores.

Because the graph generator 542 generates graphs for various 30 minute time windows, the curves of the generated graphs vary based on the performance scores used to generate them. More specifically, the sample mean and standard deviation, which determine the center and width of a distribution curve, are dynamic parameters that change over time based on the performance scores computed and received from the score calculator 524.

Figure 7:
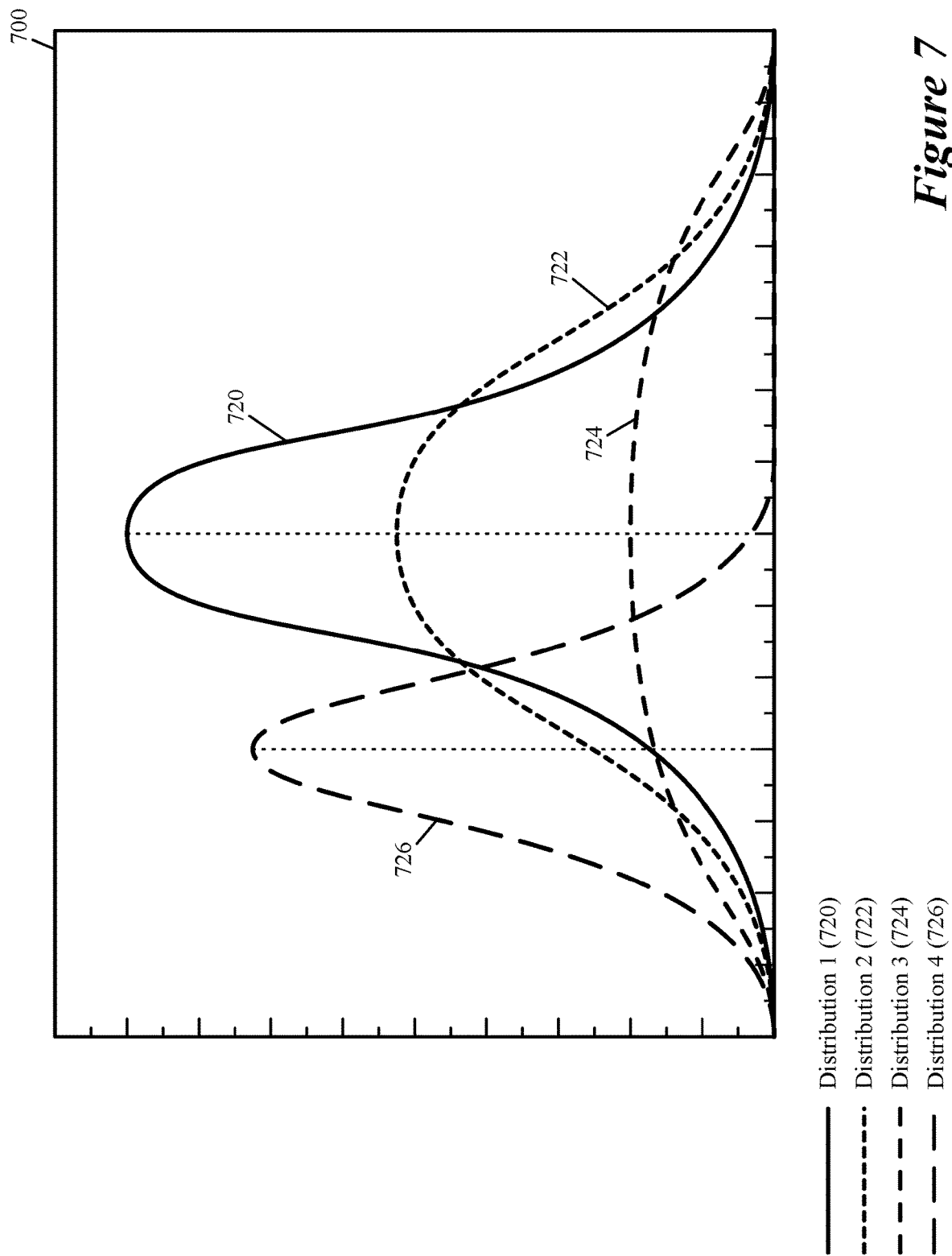
FIG. 7 illustrates an example graph of some embodiments that includes four different distribution curves.

FIG. 7 illustrates an example graph 700 of some embodiments that includes four different distribution curves 720, 722, 724, and 726. In this example, three of the curves 720-724 have the same center (i.e., sampled mean), while each curve otherwise varies in both height and width (i.e., standard deviation). As such, not only do the distributions change from window to window, but what is considered an outlier (i.e., performance scores that fall outside of any given curve) changes from window to window as well. While the examples illustrated by FIGS. 6 and 7 show distribution curves, other examples can include any type of graph, including but not limited to bar graphs, scatter plots, histograms, etc.

As the graph generator 542 generates the graphs for various time windows (e.g., 30 minute time windows), it provides the graphs to the graph analyzer 544 of the shorter timescale detector 540 for analysis. In other embodiments, the shorter timescale detector includes a storage (not shown) that the graph generator 542 adds generated graphs to, and from which the graph analyzer 544 retrieves graphs for processing. In addition receiving graphs from the graph generator 542, the graph analyzer 544 receives the performance scores from the score calculator 524 for use in analyzing the graphs. In other embodiments, the graph generator 542 provides the performance scores to the graph analyzer 544 along with the generated graphs.

In some embodiments, the graph generator 542 computes values that can be used in the generation of graphs, as well as analyzed without generating a graph. For example, in some embodiments, the graph generator 542 computes the standard deviation and the sample mean, and provides these values, along with the performance scores used to compute these values, to the graph analyzer 544 for analysis (i.e., with or without a graph or graphs).

The graph analyzer 544 analyzes the graphs to identify outliers that are indicative of performance issues, according to some embodiments. The graph analyzer 544 identifies outliers by determining, for each performance score within a given 30 minute time window, whether the performance score is a deviation event $\delta(t)$ using $|s_{e,a}(t) - \tilde{\mu}_{e,a}|/\tilde{\sigma}_{e,a} > \gamma$, where $s_{e,a}(t)$ is the performance score, $\tilde{\mu}_{e,a}$ is the computed sampled mean for the time window, $\tilde{\sigma}_{e,a}$ is the standard deviation computed for the time window, and $\gamma$ is a specified threshold value, in some embodiments. False positives are minimized, in some embodiments, by identifying consecutive outliers and classifying a set of outliers as a deviation event when that set of outliers includes at least, e.g., 3, consecutive outliers within any particular 30 minute time window.

Once the graph analyzer 544 has identified a deviation event, the graph analyzer 544 provides the deviation event to the control action system 515. The control action system 515 identifies one or more remedial actions to implement in order to mitigate or eliminate anomalous behavior that led to the deviation event. Additional details regarding the processes performed by the control action system 515, as well as potential remedial actions, will be further described below.

Figure 8:
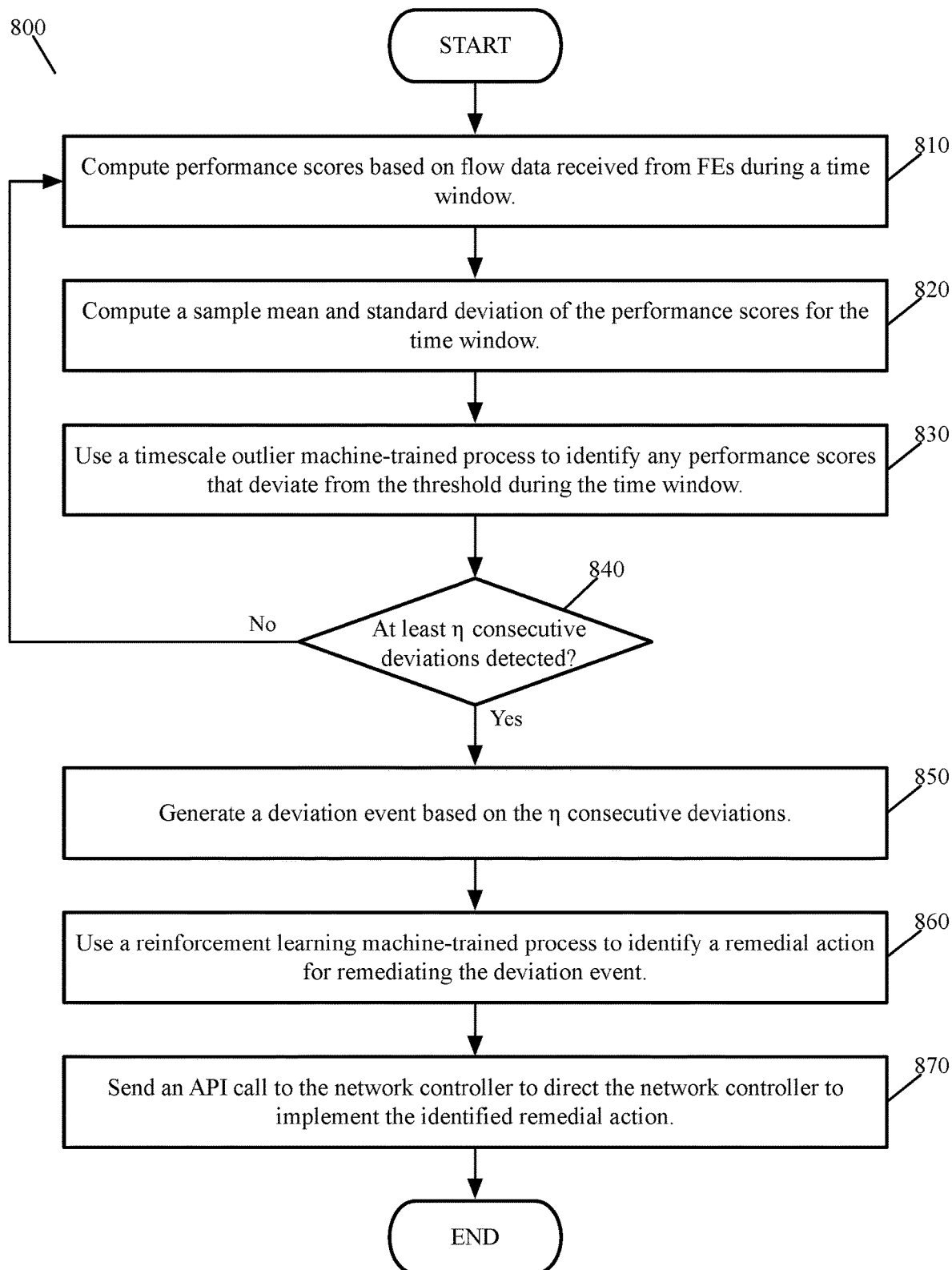
FIG. 8 illustrates a process performed in some embodiments to identify anomalies at the shorter timescale.

FIG. 8 illustrates a process 800 performed in some embodiments to identify anomalies at the shorter timescale. The process 800 is performed by an analytics system, such as the analytics system 510 described above. As such, the process 800 will be described below with references to FIG. 5. In some embodiments, the process 800 is performed iteratively such that each step is performed repeatedly as additional performance scores are received.

The process 800 starts when the analytics system computes (at 810) performance scores based on flow data received from FEs during a particular time window. In some embodiments, the analytics system computes performance scores for each FE on a per-FE basis, a per-application basis, and a per-path (i.e., per-route) basis. The particular time window, in some embodiments, is a 30 minute time window. In some embodiments, the performance scores are computed at the per-minute level such that there is a performance score computed for each minute of flow data in the 30 minute time window. For example, the score calculator 524 described above computes performance scores based on the flow data it retrieves from the storage 522 and/or that it receives directly from the aggregator 520.

The process 800 computes (at 820) a sample mean and standard deviation of the performance scores for the time window. The sample mean is used to determine the center of the distribution curve of the performance scores, while the standard deviation is used to determine the width of the distribution curve, in some embodiments. The graph generator 542, for example, uses the performance scores received from the score calculator 524 to compute a sampled mean and standard deviation for each 30 minute time window for which it has received performance scores (e.g., by computing the sampled mean and standard deviation for minutes 1-30, 2-31, 3-32, and so on).

In some embodiments, the graph generator generates a distribution graph using the computed standard deviation, sampled mean, and performance scores. As illustrated in the block diagram 500, for instance, the distribution graph generator 542 passes several graphs to the distribution graph analyzer 544. Each of these several graphs, in some embodiments, is a respective distribution curve graph generated for a respective edge-application pair such that a distribution graph is generated per-edge, per-application, per-path for multiple 30 minute windows. For example, FIG. 7 described above illustrates a graph 700 that shows multiple distribution curves of some embodiments. In some embodiments, each curve is associated with the same edge-application pair for 4 separate time windows, or with the same edge and different applications, or different edges and the same application, etc.

The process 800 uses (at 830) a timescale outlier machine-trained process to identify any performance scores that deviate from the threshold during the time window. As described above, outliers $\delta(t)$ are identified using $|s_{e,a}(t) - \tilde{\mu}_{e,a}|/\tilde{\sigma}_{e,a} > \gamma$, where $s_{e,a}(t)$ is the performance score, $\tilde{\mu}_{e,a}$ is the computed sampled mean for the time window, $\tilde{\sigma}_{e,a}$ is the standard deviation computed for the time window, and $\gamma$ is a specified threshold value, in some embodiments. That is, in some embodiments, the dynamic parameters $\tilde{\mu}_{e,a}$ and $\tilde{\sigma}_{e,a}$ are used to determine whether a given performance score exceeds the specified threshold $\gamma$.

The outlier identification is performed, in some embodiments, by the graph analyzer 544 as part of a shorter timescale detection process. The distribution graph analyzer 544, in some embodiments, analyzes the generated distribution curve graphs and determines whether any performance scores fall outside of the generated distribution curves (i.e., whether any of the performance scores are outliers with respect to the generated distribution graph). At least one performance score 660 falls outside of the curve 620 in the graph 600 described above, for example.

The process 800 determines (at 840) whether at least $\eta$ consecutive deviations have been detected. In some embodiments, to prevent or at least minimize false positives, at least $\eta$ (e.g., $\eta=3$) number of consecutive outliers are detected before a deviation event is generated. In other embodiments, a single detected outlier triggers a deviation event to be generated. In still other embodiments, the anomaly detector determines whether at least $\eta$ outliers are detected within a time window (i.e., regardless of whether the outliers are consecutive) before the outliers are considered to be a deviation event. The time window during which at least $\eta$ outliers are detected, in some embodiments, is the same as the time window for which the performance scores have been computed (e.g., 30 minutes), while in other embodiments, the time window is a smaller time window (e.g., a subset of 15 minutes) within the time window for which the performance scores have been computed. In still other embodiments, the time window during which at least $\eta$ outliers are detected can span multiple time windows (e.g., multiple 30 minute windows).

When fewer than $\eta$ outliers have been detected, the process 800 returns to compute (at 810) performance scores based on flow data (e.g., metrics) received from FEs during a time window. When at least $\eta$ consecutive deviations have been detected, the process 800 transitions to generate (at 850) a deviation event based on the $\eta$ consecutive deviations. The detection of deviations (e.g., outliers) is done by the graph analyzer 544, in some embodiments, based on data received from the graph generator 542 and, in some embodiments, data (e.g., performance scores) received from the score calculator 524. Each deviation event, in some embodiments, specifies "sampleTime" (i.e., the time of the event), "latestScore", "historicalMean", "scoreTimeSeries" (i.e., last 30 minutes of score 1 minute series), "edgeId" (i.e., the edge FE identifier), "nextHopId", and "rootCauseIndicators".

The process 800 uses (at 860) a reinforcement learning machine-trained process to identify a remedial action for remediating the deviation event. For example, once a deviation event has been generated by the graph analyzer 544, the deviation event is provided to the control action system 515, which uses the deviation event, and other data (e.g., configuration data associated with edge and/or transit nodes identified by the deviation event, performance scores, flow data, other metrics, etc.) to identify a remedial action to implement for remediating the deviation event.

After one or more remedial actions have been identified, the process 800 sends (at 870) an API call to the network controller to direct the network controller to implement the identified remedial action(s). The API call, in some embodiments, includes any configuration changes to be implemented as remedial actions, and is sent by an API poller of the control action system. Examples of API calls utilized, in some embodiments, are described above, such as the API calls illustrated by FIG. 4. Following 870, the process 800 ends.

In some embodiments, the process 800 is performed for only some of the critical edge routers, but not for all edge routers and not for transit routers (e.g., gateway routers or hub routers). In other embodiments, the process 800 is performed for every edge router, but not for the transit routers (e.g., gateway routers or hub routers). In still other embodiments, the process 800 is performed not only for some or all of the edge routers, but also for each transit router (e.g., each gateway router and each hub router). In yet other embodiments, the process 800 is performed just for transit routers (e.g., gateway routers and hub routers) but not for edge routers.

At the longer timescale, which is on the order of days, the goal of self-healing is to detect systemic issues in the application performance that require longer term network configuration changes, in some embodiments. Examples of such changes, in some embodiments, include assigning an edge to a different primary gateway for routing certain application flows. To achieve this, some embodiments use a global topology-based outlier analysis to detect systemic application issues.

In some embodiments, the global topology-based outlier analysis starts with a collection of application performance score data, $\{s_{e,a}(t)\}$, over a time window W. In this analysis, however, the time window is much larger than in the shorter timescale analysis (e.g., the last two weeks). In some embodiments, the long timescale detector 530 generates a custom topology graph for each application in a set of applications that has flows traversing through the SD-WAN (e.g., a virtual SD-WAN for each application).

The long timescale detector 530 then iteratively updates its generated topology graph as follows. Let F denote a graph representing the flow of traffic on the overlay SD-WAN topology for a specific application. Each node in the graph represents an SD-WAN node and an edge represents the flow of traffic for an application. For example, in the case of application flows routed to their destination via an SD-WAN gateway or SD-WAN hub FE, this graph is a bi-partite graph. One set of vertices of the bi-partite graph represent the SD-WAN edges in the overlay network and the other set of vertices represent the SD-WAN gateway FEs. A new graph edge is drawn between an edge, say e1, and a gateway, say $g_1$, if flows for that application originating at e1 are now routed through $g_1$ (i.e., as opposed to being routed through a different gateway $g_2$).

In some embodiments, when the initial topology graphs are generated, weights are assigned to each edge (i.e., path between two nodes) of each graph. In some embodiments, the weights are default weights. As such, after a topology graph has been updated based on the performance scores, the assigned weights are updated by mapping the application performance score timeseries to a number, according to some embodiments. The goal of this mapping function, in some embodiments, is to compute a value that represents the application performance for the corresponding edge router and gateway router combination over the respective time window. In its simplest form, the mapping function of some embodiments is the average of the performance scores $s_{e,a}(t)$ over the time window W. Another more complex mapping function of some embodiments is the average of $s_{e,a}(t)$ after filtering out low network utilization points.

In some embodiments, the topology-based outlier analysis is carried out on the above edge weighted graph F to detect whether an application issue is isolated to an edge FE, a gateway FE or to the overall application. In the first case, where an application issue is isolated to an edge FE, the edge weight connecting the edge FE to the respective gateway FE deviates significantly from other edges in F, according to some embodiments. In the second case, in some embodiments, where the application issue is due to a gateway FE, the sum weights of edges connecting to the respective gateway deviates significantly as compared to other gateway FEs. Finally, in the third case of overall application issue the edge weights across the graph deviates significantly from edge weights in other application graphs, in some embodiments.

Figure 9:
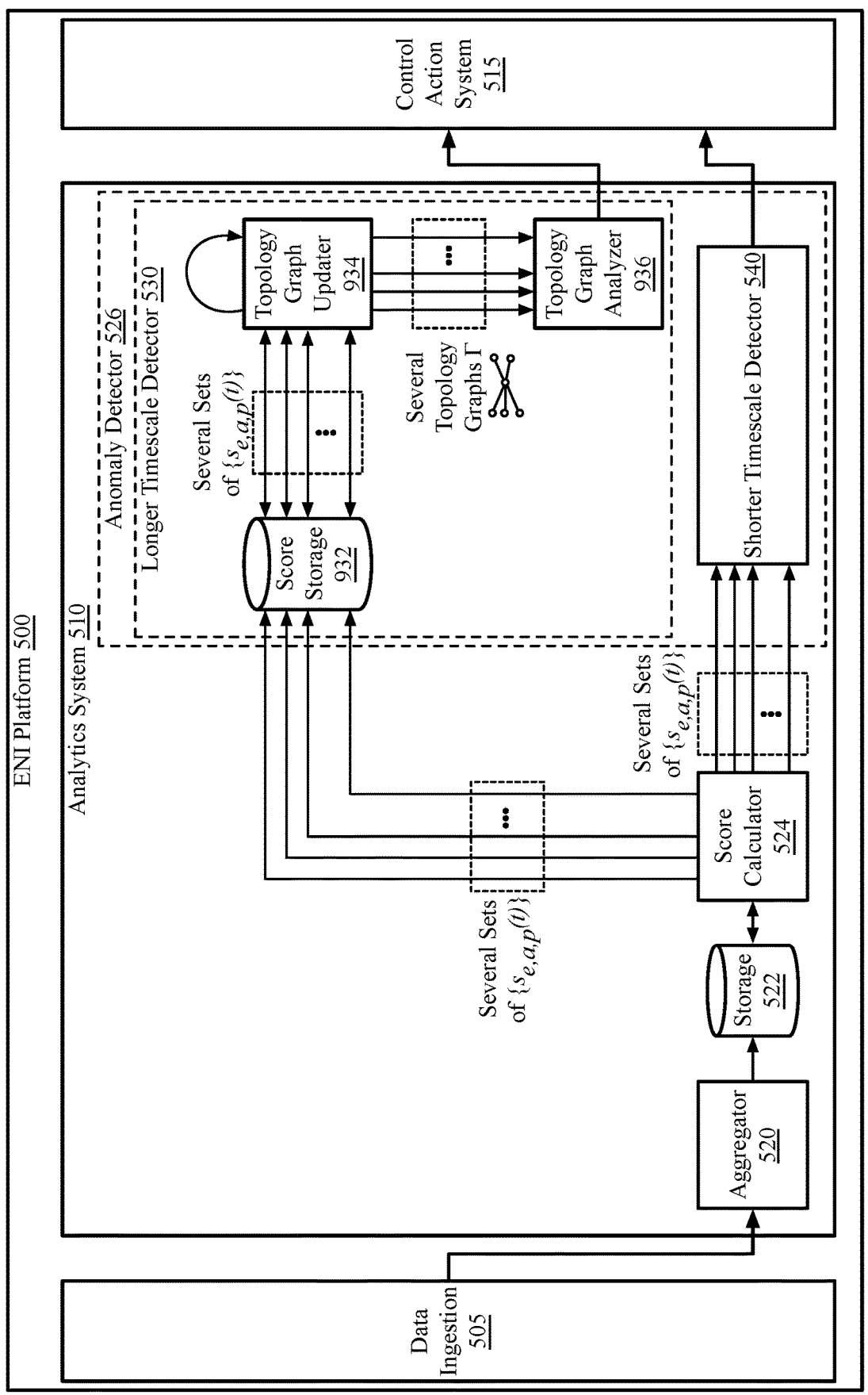
FIG. 9 conceptually illustrates another block diagram of the ENI platform of FIG. 5 with an in-depth view of the longer timescale anomaly detector of some embodiments.

FIG. 9 conceptually illustrates another block diagram of the ENI platform of FIG. 5 with an in-depth view of the longer timescale anomaly detector of some embodiments. As shown, the longer timescale detector 530 includes a score storage 932, a topology graph updater 934, and a topology graph analyzer 936. As the score calculator 524 computes performance scores from the flow data (e.g., metrics) aggregated by the aggregator 520, the score calculator 524 provides the performance scores to both the shorter timescale detector 540 and the longer timescale detector 530.

As mentioned above, the longer timescale detector 530 of some embodiments generates a custom topological graph for each particular application in a set of applications that have flows traversing through the SD-WAN. In some embodiments, the topology graph updater 934 generates the custom topology graphs for each application, while in other embodiments, the longer timescale detector 530 includes a separate topology graph generator process.

To generate a topology graph for each application, the longer timescale detector 530 in some embodiments defines one graph node for each edge or transit router (e.g., each edge, gateway, or hub router) that is used to forward one or more flows of the application through the SD-WAN. For each pair of nodes that represent a pair of routers through which one or more flows of the application traverse, the detector 530 also defines a graph edge in the graph to represent the tunnel between the pair of routers through which the application's flows traverse.

In each custom topology graph, a path between first and second edge node traverses zero or more transit nodes in the graph and one or more graph edges between these edge and/or transit nodes. This path in the graph is equivalent to a routing path from between the first and second edge routers represented by the first and second edge nodes in the graph. When the graph path traverses through one or more transit nodes, the routing path similarly traverses through one or more transit routers (e.g., hub or gateway routers). The inter-node graph edges in a graph path in some embodiments are equivalent to the tunnels between the routers in the routing paths, as mentioned above.

The long timescale detector 530 iteratively updates its generated topology graph(s) as it receives new performance scores from the score calculator 524. Specifically, as performance scores are received from the score calculator 524, the received performance scores are added to the score storage 932. When a threshold amount (e.g., n number of days- or weeks-worth) of performance scores are received for a particular key (e.g., edge router, application, route tuple), the topology graph updater 934 retrieves the collection of performance scores from the score storage 932 and uses the performance scores to update a topology graph corresponding to the particular key. Each topology graph includes nodes representing SD-WAN nodes (e.g., edge nodes and transit nodes), and edges representing traffic flows between the nodes for an application. In addition to updating the topology graphs, the topology graph updater 934 updates weights assigned to the edges of the topology graph based on performance scores for the nodes connected by the edges.

Figure 10:
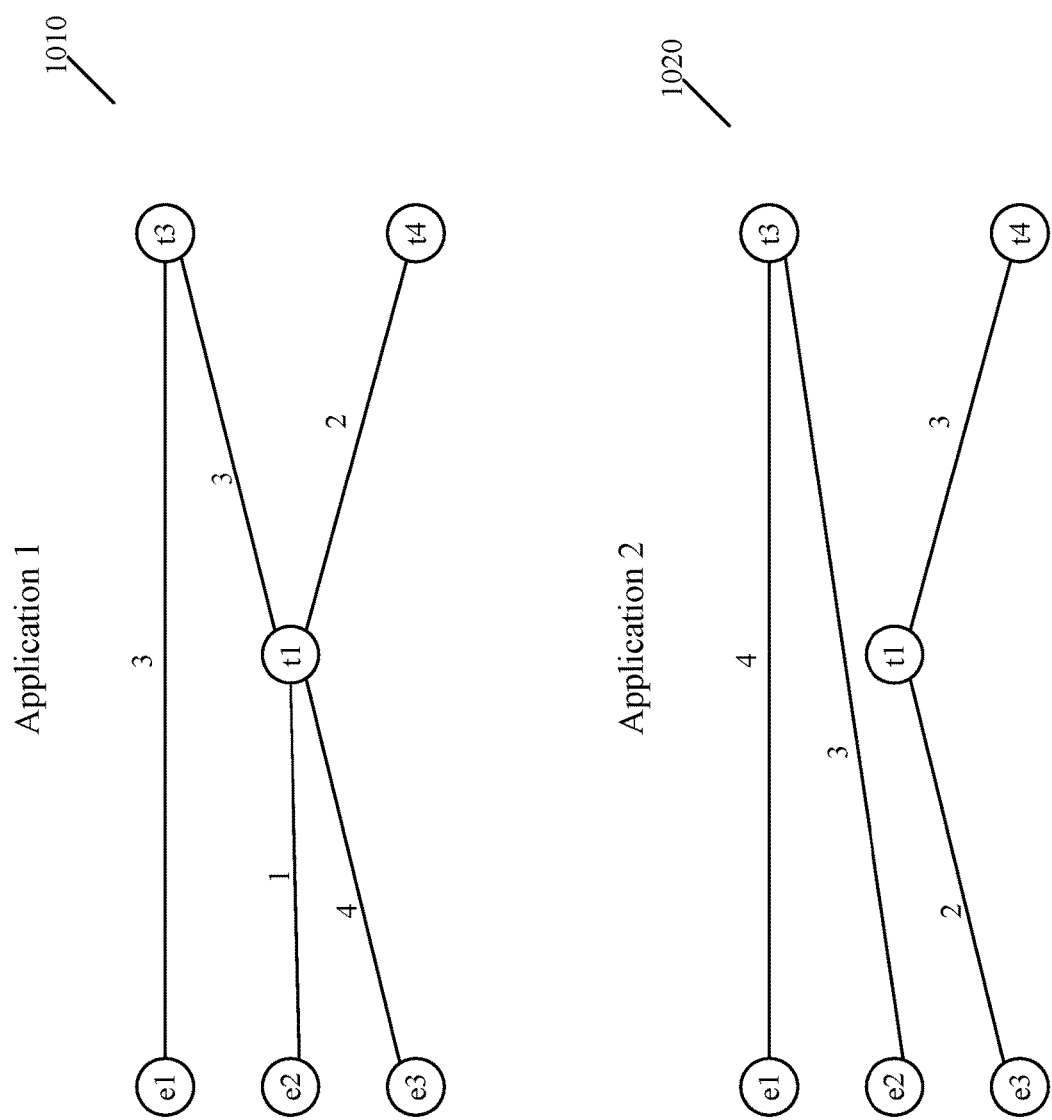
FIG. 10 illustrates simplified examples of two topology graphs of some embodiments for first and second applications.

FIG. 10 illustrates simplified examples of two topology graphs of some embodiments for first and second applications. As shown, each topology graph 1010 and 1020 includes multiple nodes, labeled with an "e" to indicate edge node, or a "t" to indicate transit node (e.g., hub node or gateway node). Additionally, each edge between two nodes includes an assigned weight. For example, the edge between edge node "e1" and transit node "t3" is assigned a weight of 3 in the application 1 topology graph 1010, while this same edge is assigned a weight of 4 in the application 2 topology graph 1020.

As the topology graph updater 934 updates the weighted topology graphs, it provides these graphs to the topology graph analyzer 936 as shown. The topology graph analyzer 936 analyzes the weighted topology graphs to identify application issues for the time window represented by the graph (e.g., a two week window), and whether these application issues are isolated to an edge FE, whether they are due to a gateway FE, or whether they are overall application issues, according to some embodiments. Once an application issue, and the cause of the issue (i.e., isolated to an edge FE, due to a gateway FE, or affects the overall application), the topology graph analyzer 936 generates an event identifying the issue and provides the event to the control action system 515 for remediation.

Figure 11:
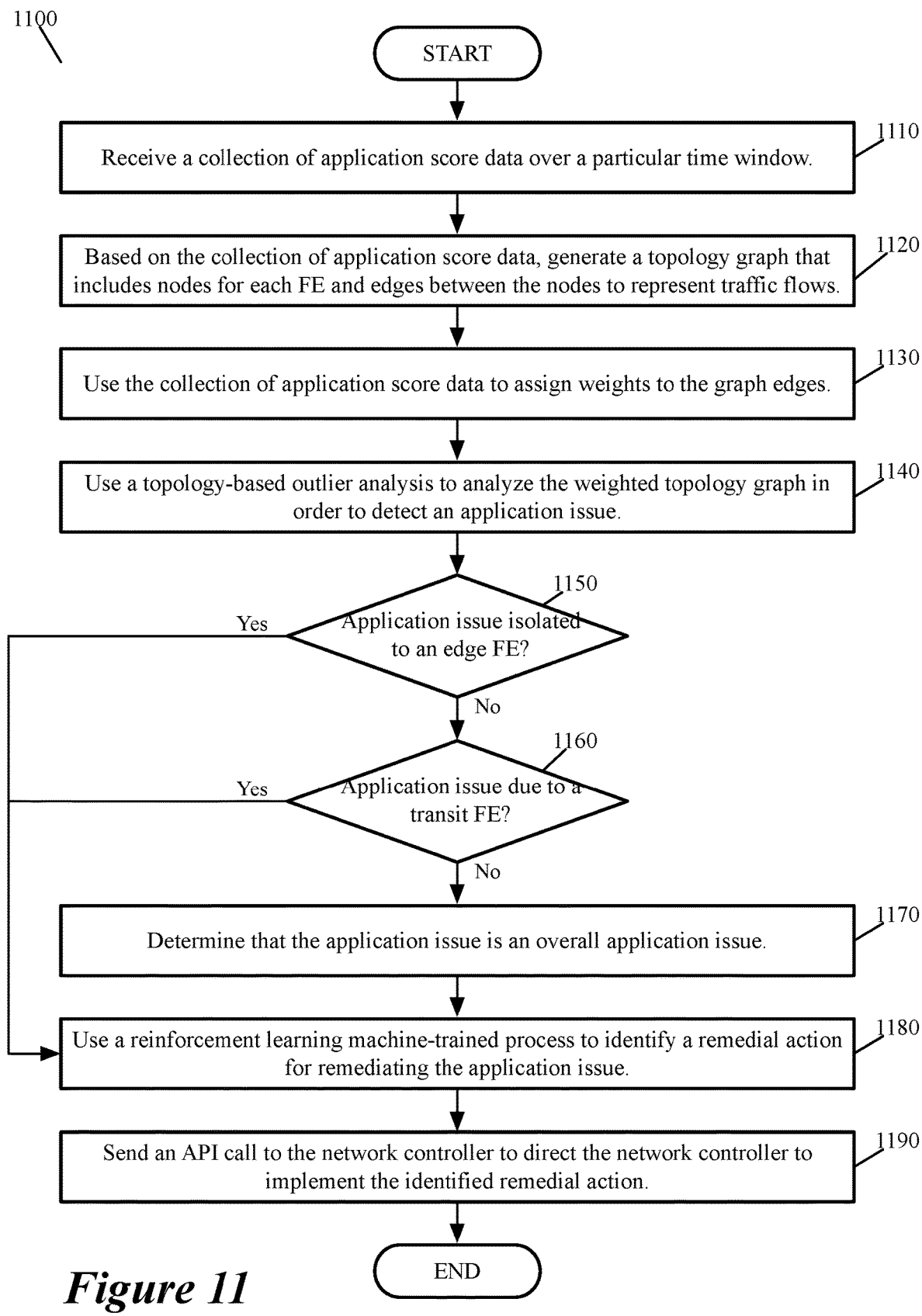
FIG. 11 conceptually illustrates a process performed in some embodiments to identify anomalies at the longer timescale.

FIG. 11 conceptually illustrates a process 1100 performed in some embodiments to identify anomalies at the longer timescale. The process 1100 is performed by an analytics system, such as the analytics 510 described above. The process 1100 will be described below with references to FIGS. 9 and 10. Like the process 800, the process 1100 is performed iteratively, in some embodiments, such that each step is performed repeatedly as additional performance scores (e.g., application score data) are received.

The process 1100 starts when the process receives (at 1110) a collection of application score data over a particular time window (e.g., a two-week time window). For instance, the topology graph updater 934 of some embodiments retrieves application score data from the score storage 932 once enough scores from the particular time window have been added to the score storage 932. As the performance scores are computed on a per-edge router, per-application, and per-route basis, the collection of application score data, in some embodiments, includes performance scores aggregated by application, such that each performance score is associated with the same application, but with different edge routers and routes.

Based on the collection of application score data, the process 1100 updates (at 1120) a topology graph that includes nodes for each FE and edges between the nodes to represent application traffic flows. That is, in some embodiments, an initial topology graph is generated based on edge routers, gateway routers, hub routers, and the paths between them, and this topology graph is then updated using the collection of application score data. For example, in some embodiments, changes to the paths and/or forwarding element configuration, such as added or removed paths and/or forwarding elements, are reflected in the performance score data and used to update the initial (or otherwise previous version of) the topology graph.

The process 1100 then uses (at 1130) the collection of application score data to assign or adjust weights to the graph edges. Each of the edges in the graphs 1010 and 1020, for instance, have assigned weights, as also described above. Each weight value, in some embodiments, can be mapped back to a corresponding performance score, or average of a set of performance scores over the time window.

In some embodiments, the weight values are generated for a range of scores over the longer time duration (e.g., a two-week duration of time), such as by using a weight calculator to produce a weight score from each performance score that has been collected for the longer time duration. The computed average of the performance scores, in some embodiments are blended averages. For instance, in some embodiments, a blended average is computed from all performance scores in the time duration (e.g., a two-week time window), while treating older scores (e.g., from week 1 of the two-week time window) with less significance than newer scores (e.g., by using another set of weight values to give more weight to the newer scores compared to older scores). Also, in some embodiments, the generated weight values are per-path (i.e., end-to-end), not per-edge (i.e., an edge between two nodes).

The process 1100 uses (at 1140) a topology-based outlier analysis to analyze the weighted topology graph in order to detect an application issue. In some embodiments, the topology-based outlier analysis is performed by comparing different topology graphs generated for different applications to determine whether any of the weights in a particular topology graph deviate significantly from other topology graphs, and/or whether the summed weights of edges connected to a particular transit node in a first topology graph deviate significantly compared to the summed weights of edges connected to the particular transit node in a second topology graph. The comparison, in some embodiments, are between topology graphs generated for different applications during the same time period (i.e., the same two week window), or between topology graphs generated for the same application during different time periods (i.e., different two week windows).

The process 1100 determines (at 1150) whether the application issue is isolated to an edge FE. In some embodiments, the application issue is determined to be isolated to an edge FE when the edge weight connecting the edge FE to a respective gateway FE deviates significantly from other edge weights in F. When the process 1100 determines that the application issue is isolated to an edge FE, the process 1100 transitions to 1180.

When the process 1100 determines that the application issue is not isolated to an edge FE, the process 1100 transitions to determine (at 1160) whether the application issue is due to a transit FE (e.g., a hub FE or gateway FE). In some embodiments, when the application issue is due to a transit FE, the sum weights of edges connecting to the respective transit FE deviates significantly as compared to other transit FEs during the same time period (i.e., same two-week window) and/or different time periods (i.e., different two-week windows). In other embodiments, when the application issue is due to a transit FE, the sum weights of edges connecting to the transit FE for the particular time period deviates significantly as compared to the sum weights of edges connecting to the transit FE for other time periods (i.e., previous two-week windows). When the process 1100 determines that the application issue is due to a transit FE, the process 1100 transitions to 1180.

When the process 1100 determines that the application issue is not due to a transit FE, the process 1100 transitions to determine (at 1170) that the application issue is an overall application issue. In some embodiments, when the application issue is an overall application issue, the edge weights across the topology graph for the particular time period (i.e., a particular two-week window) deviate significantly from edge weights in other application graphs (i.e., for other applications) for the particular time period (i.e., the particular two-week window). In other embodiments, when the application issue is an overall application issue, the edge weights across the topology graph for the particular time period (i.e., the particular two-week window) deviate significantly from edge weights in other application graphs for the same application during other particular time periods (i.e., previous two-week windows).

After the application issue, and the cause of the application issue, has been determined, the process 1100 uses (at 1180) a reinforcement learning machine-trained process to identify a remedial action for remediating the application issue. For instance, after the topology graph analyzer 936 has identified an application issue, the topology graph analyzer 936 generates an event identifying the issue and provides this event to the control action system 515 for remediation.

In some embodiments, when the application issue is isolated to an edge router, the application issue is due to a particular link used by the edge router to forward traffic for the application. In some such embodiments, a remedial action is to direct the edge router to forward traffic for the application on a different link. For example, an edge router of some embodiments is directed not to use one of three tunnels available to the edge router for outbound traffic for the application. In some other embodiments, a branch site can have more than one edge router (e.g., one edge per physical link), and when an issue is isolated to an edge router at such a site with multiple edge routers, a remedial action is to redirect traffic to a different edge device at the site.

After identifying a remedial action to implement in the SD-WAN to remediate the application issue, the process 1100 then sends (at 1190) an API call to the network controller to direct the network controller to implement the identified remedial action. Examples of such API calls are described above and illustrated by FIG. 4. Following 1190, the process 1100 ends.

In some embodiments, once the system detects that certain application flows are having an issue, the control action system takes remediation actions to resolve the issue. As described above, some embodiments focus on path-level parameters as the control knob, and, more specifically, dynamically selecting the overlay transit node to re-route affected application flows on alternate paths.

In some embodiments, depending on the network setup, there are two scenarios of route adaptation. In the first scenario, in some embodiments, application traffic at an edge cannot be sampled and partially routed on alternate paths. In the second scenario, application traffic at an edge can be sampled, in some embodiments, and a fraction of traffic can be routed on an alternate path. For example, with the assumption that there are 1000 flows for a first application at edge e1 routed through gateway $g_1$, in the case when flow sampling is allowed, a fraction of these flows (e.g., 10%) can be routed on an alternate path through gateway g* without affecting the rest of the traffic flow, according to some embodiments. The difference between sampling and non-sampling of flows, in some embodiments, manifests in terms of how alternate paths are determined for the control action.

Let $\bar{s}_g(t) = \{s_{e,a}(t)\}_g$ denote the application performance scores for edges whose application flows are routed through gateway node g. For the edge e (with flows currently routed through Gateway node g) detected as having an application performance anomaly (e.g., a sudden drop in application score due to excessive packet drops on the current route), let $\Phi_e$ denote the set of all possible gateways available for that edge. The objective of the route-adaptation control action is to determine the best alternate gateway $g \in \Phi_e$ to re-route flows for edge e and application a to alleviate the application issue, in some embodiments.

For the scenario where traffic flows cannot be sampled and routed on different alternate routes, some embodiments utilize a ranking-based approach to determine the best alternate gateway. In some embodiments, this is achieved by maintaining a real-time aggregate score of each gateway FE based on flows that are routed through them and selecting the gateway with the best instantaneous score. Let $f(\bar{s}_g(t))$ denote the real-time gateway score function, then the control action is to choose g* such that, $$g^* = \arg\max_{g \in \Phi_e} f(\bar{s}_g(t))$$

For the second case when traffic flows can be sampled and routed on alternate paths before making a control action decision, in some embodiments, the actual performance on alternate paths can be measured. This lends itself naturally to a reinforcement learning-based approach, in some embodiments, and a greedy algorithm to find the best alternate path as described below.

In some embodiments, the algorithm proceeds by sampling flows and re-routing them through an alternate gateway $g \in \Phi_e$ in a round-robin fashion. The algorithm then picks the gateway node that has the best application performance score among the sampled flows, in some embodiments. Specifically, let E denote the fraction of flows that are sampled and routed through the alternate gateway g, and let $s_g^E$ be the corresponding application performance score for the sampled flows. Then, g* is chosen such that, $$g^* = \arg\max_{g \in \Phi_e} s_g^E$$

As compared to a ranking-based approach, the greedy algorithm uses the actual performance measurement values from the sampled flows at an edge, in some embodiments. This allows the system of some embodiments to make decisions on direct path measurements from the edge to the alternate gateway node.

Figure 12:
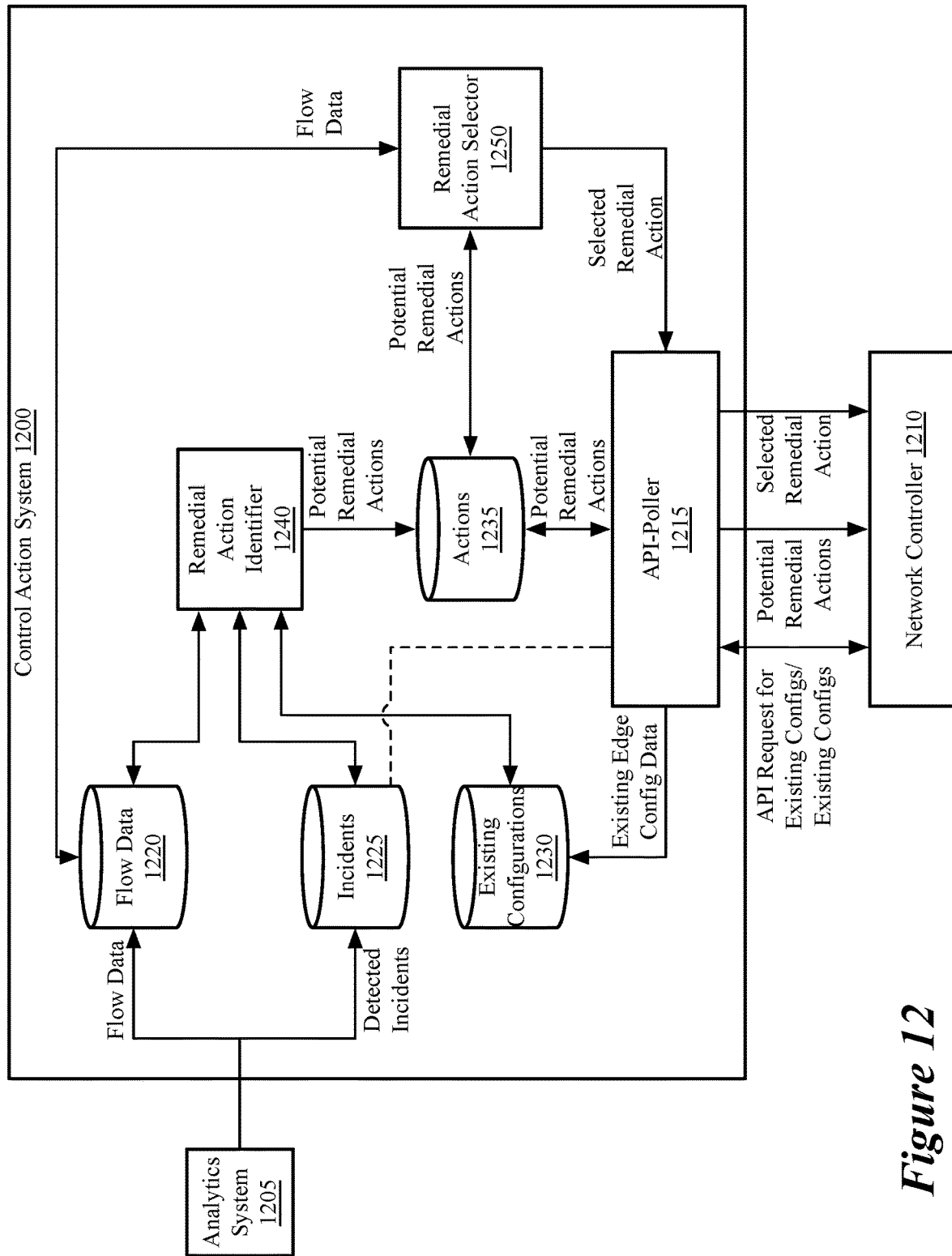
FIG. 12 conceptually illustrates a block diagram that provides a more in-depth view of the control action system of some embodiments.

FIG. 12 conceptually illustrates a block diagram that provides a more in-depth view of the control action system of some embodiments. As shown, the control action system 1200 includes a flow data storage 1220, incidents storage 1225, existing configurations storage 1230, actions storage 1235, remedial action identifier 1240, remedial action selector 1250, and an API poller 1215. The flow data storage 1220 and incidents storage 1225 are populated by the analytics system 1205, as shown.

In some embodiments, the flow data storage 1220 stores flow data (e.g., metrics) and performance scores (e.g., performance scores computed from the flow data), while in other embodiments, the control action system 1200 includes a separate storage for performance scores. The incidents storage 1225 stores incident events generated by the analytics system 1205 based on short timescale and long timescale outliers/deviations detected by the analytics system 1205. The existing configurations storage 1230 stores existing configuration data for FEs retrieved by the API poller 1215 from the network controller 1210 based on what FEs are associated with the incidents in the incidents storage 1225.

The remedial action identifier 1240 uses flow data and/or performance scores from the flow data storage 1220, incident events from the incidents storage 1225, and existing configuration data from the existing configurations storage 1230 in order to identify sets of potential remedial actions for each incident in the incident events storage 1225, in some embodiments. For example, for an incident event identifying an application issue that is due to a particular transit FE, the remedial action identifier 1240 of some embodiments identifies a set of alternate routes that do not traverse the particular transit FE for each affected edge FE-application pair. As the remedial action identifier 1240 identifies sets of potential remedial actions, the remedial action identifier 1240 adds these sets of potential remedial actions to the actions storage 1235.

The API poller 1215, of some embodiments, retrieves the sets of potential remedial actions and directs the network controller 1210 to implement the potential remedial actions for certain sampled flows for temporary time periods. As the sampled flows traverse the FEs, the FEs provide flow data to a data ingestion system as described above. The data is then processed, in some embodiments, by the analytics system 1205, and the performance scores are added to the flow data storage 1220, according to some embodiments. In other embodiments, these performance scores are stored to a separate test-performance-score storage (not shown).

The remedial action selector 1250 of some embodiments retrieves the performance scores associated with the potential remedial actions from the storage 1220 and the potential remedial actions from the actions storage 1235 in order to select the potential remedial action having the best associated performance score. The remedial action selector 1250 uses a reinforcement learning machine-trained process, in some embodiments, to select a remedial action for implementation for all affected flows. As described above, for embodiments where the remedial actions include routing flows through alternate transit FEs (e.g., hub FEs and gateway FEs), where $\in$ denotes the fraction of flows that are sampled and routed through the alternate gateway g (or other transit FE), and where $s_g^{\in}$ is the corresponding application performance score for the sampled flows, then g* is chosen such that $g^* = \arg\max_{g \in \Phi_f} s_g^{\in}$.

Once the remedial action selector 1250 has selected a remedial action, the remedial action selector 1250 provides the selected remedial action to the API poller 1215. The API poller then sends an API call that includes the remedial action (e.g., an updated configuration for an edge FE) to the network controller 1210 to autonomously direct the network controller 1210 to implement the remedial action.

Figure 13:
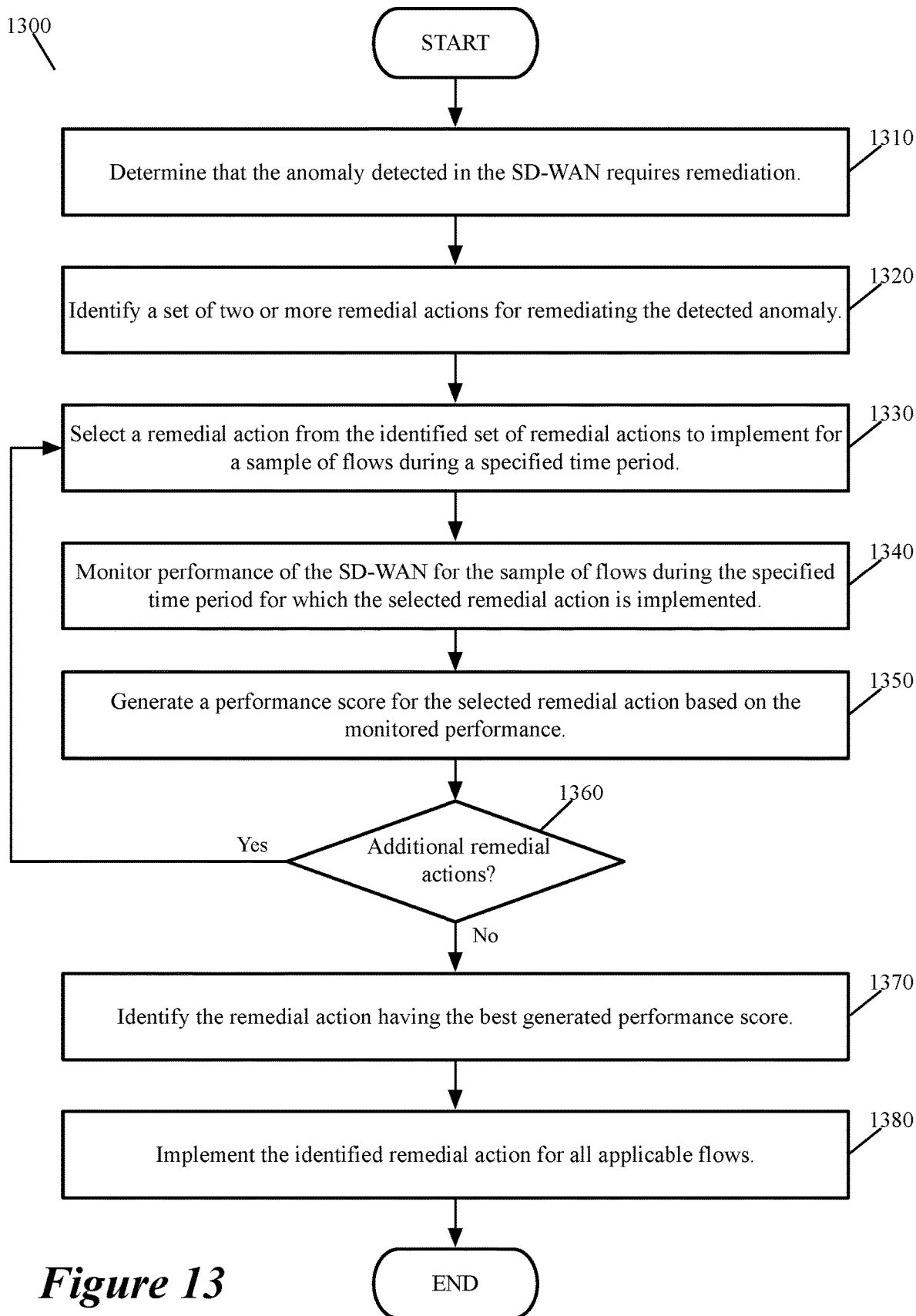
FIG. 13 conceptually illustrates a reinforcement learning process performed by the control action system of some embodiments using the greedy algorithm described above.

FIG. 13 conceptually illustrates a reinforcement learning process 1300 performed by the control action system of some embodiments using the greedy algorithm described above. The process 1300 starts when the control action system receives a detected anomaly from the anomaly detection process of the analytics system. For example, the analytics system 1205 adds a new incident event to the incidents storage 1225 of the control action system 1200.

The process 1300 determines (at 1310) that the anomaly detected in the SD-WAN requires remediation. In some embodiments, this determination is performed by the anomaly detector before generating and sending a deviation event to the control analytics system. For example, in some embodiments, η (e.g., η=3) consecutive outlying performance scores are detected before a determination is made that a particular edge FE associated with the performance scores (e.g., for the shorter timescale analysis) is exhibiting anomalous behavior that requires remediation, while fewer than η consecutive outlying performance scores would not result in such a determination.

In other embodiments, η outlying performance scores within a particular time window (e.g., at least 3 within a 30 minute time window), regardless of whether these outliers are consecutive, results in a determination that a particular edge FE associated with the performance scores (e.g., for the shorter timescale analysis) is exhibiting anomalous behavior that requires remediation. As such, in some embodiments, determining that a detected anomaly requires remediation is performed along with receiving an incident event identifying anomalous behavior that requires remediation from the analytics system 1205. Also, in some embodiments, determining that an anomaly requires remediation includes a determination that remediating the anomaly will improve performance for one or more flows that traverse the SD-WAN.

The process 1300 identifies (at 1320) a set of two or more remedial actions for remediating the detected anomaly. For example, in some embodiments, the detected anomaly is a spike in latency associated with a particular hub FE that is used as a next-hop by one or more edge FEs when forwarding application traffic to one or more applications deployed to, e.g., a cloud datacenter, and the identified remedial actions include a set of alternate routes to the application(s). These alternate routes, in some embodiments, include routes through other FEs (e.g., other hub FEs and/or gateway FEs), direct routes, etc. As described above, this is performed by the remedial action identifier 1240 of the control action system 1200, in some embodiments, using data from each of the storages 1220, 1225, and 1230.

The process 1300 selects (at 1330) a remedial action from the identified set of remedial actions to implement for a sample of flows during a specified time period. As described above, in some embodiments, the greedy algorithm used in the reinforcement learning samples flows and re-routes these flows through alternate FEs (i.e., re-routes through available alternate routes) in a round-robin fashion. As such, in some embodiments, the API poller 1215 sends each potential remedial action to the network controller 1210 individually to selectively implement the potential remedial action, while in other embodiments, the API poller 1215 sends a single API call that includes each of the potential remedial actions for implementation. The API calls, in some embodiments, also specify a time duration for which each potential remedial action should be implemented, as well as a set of one or more flows for which each potential remedial action should be implemented.

The process 1300 monitors (at 1340) performance of the SD-WAN for the sample of flows during the specified time period for which the selected remedial action is implemented. The monitoring, in some embodiments, includes collecting performance measurement values associated with the sampled flows from one or more edge FEs for which the remedial action (e.g., an alternate route from the edge FE to the application(s)) is applicable.

The process 1300 then generates (at 1350) a performance score for the selected remedial action based on the monitored performance. The collected performance measurement values, in some embodiments, are stored in the flow data storage 1220, and retrieved by the remedial action selector 1250 to generate the performance scores. In other embodiments, the performance scores are computed by the analytics system 1205 based on the performance measurement values and added to the flow data storage 1220 for retrieval by the remedial action selector. When the remedial action is an alternate route, the generated performance score, $s_g^{\in}$, is representative of application performance when using said alternate route.

The process 1300 determines (at 1360) whether there are additional remedial actions to implement. In some embodiments, each of the remedial actions are implemented simultaneously such that steps 1330-1350 are performed simultaneously for each identified remedial action using respective sampled flows that are assigned in a round robin fashion. In other embodiments, each remedial action is implemented and monitored individually, and once the specified time period for implementation and monitoring has timed out, a next remedial action is selected for implementation and monitoring. As such, when additional remedial actions have yet to be temporarily implemented, the process 1300 returns to select (at 1330) a remedial action from the identified set.

When the process 1300 determines (at 1360) that there are no additional remedial actions to temporarily implement (i.e., all available remedial actions have been implemented, monitored, and scored), the process 1300 identifies (at 1370) the remedial action having the best generated performance score. As described above, the remedial action (e.g., alternate gateway) having the best application performance score is selected by the remedial action selector 1250 such that $g^* = \arg\max_{g \in \Phi_s} s_g^{\in}$.

The process 1300 then implements (at 1380) the identified remedial action for all applicable flows. In some embodiments, the applicable flows are associated with a single application and a single edge FE, while in some other embodiments, the applicable flows are associated with two or more applications and two or more edge FEs. The API poller 1215 sends the remedial action in an API call to the network controller 1210 for autonomous implementation, in some embodiments. Following 1380, the process 1300 ends.

Figure 14:
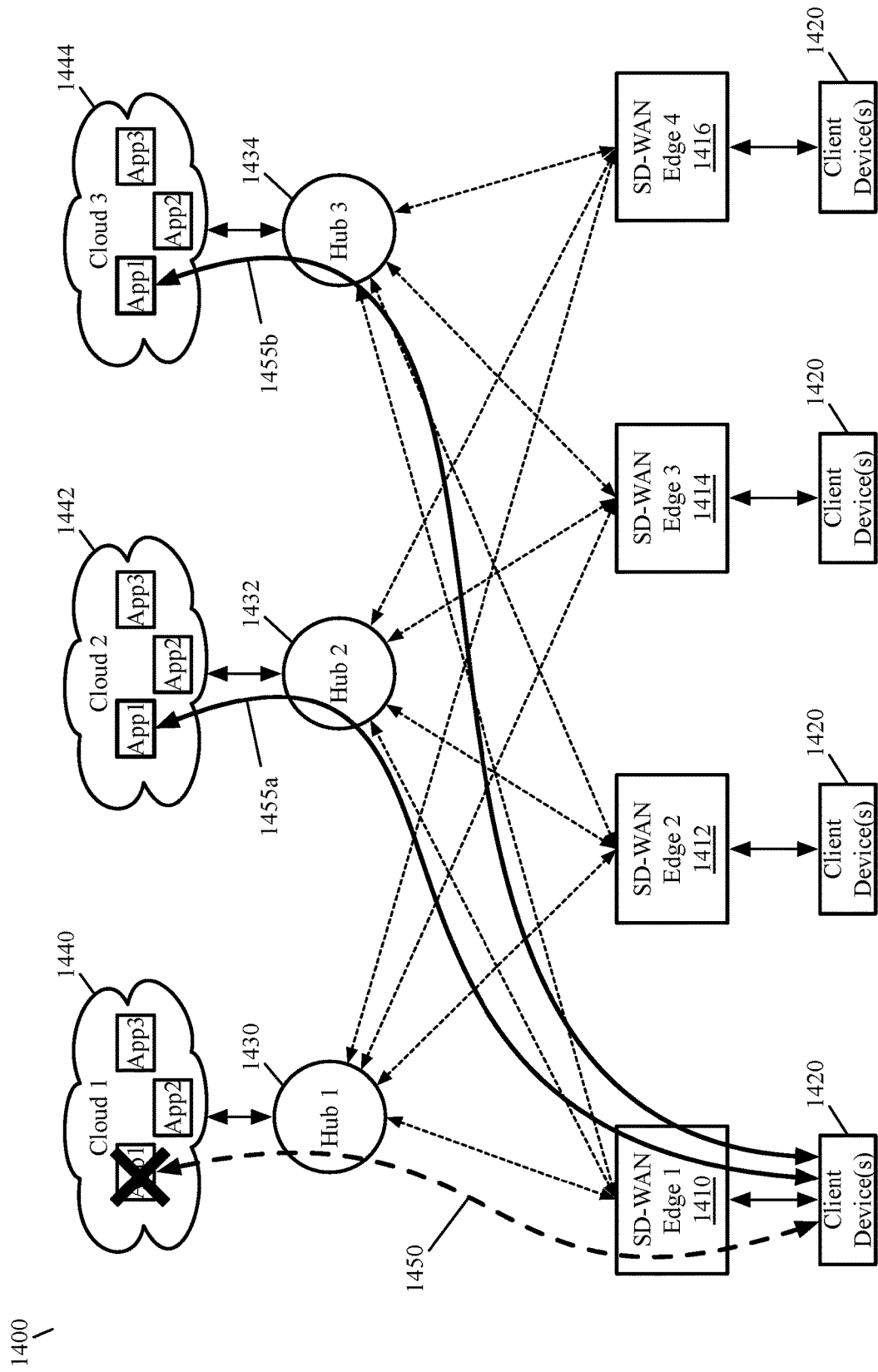
FIG. 14 conceptually illustrates an example diagram of a self-healing SD-WAN, of some embodiments, in which alternate routes are monitored for sample flows between an edge router and an application.

FIG. 14 conceptually illustrates an example diagram of a self-healing SD-WAN 1400 in which alternate routes are monitored for sample flows between an edge router and an application. As shown, the SD-WAN 1400 includes multiple SD-WAN edge FEs 1410, 1412, 1414, and 1416 that each connect one or more client devices 1420 to the SD-WAN, and multiple hub FEs 1430, 1432, and 1434 that connect the SD-WAN edge FEs 1410-1416 to multiple clouds 1440, 1442, and 1444. Each of the clouds 1440-1444 hosts each of three applications (App1, App2, App3). Additionally, the FEs in this example are in a full mesh such that each SD-WAN edge FE 1410-1416 connects to each hub FE 1430-1434.

The edge FE 1410 in this example is initially configured to use hub 1 1430 as a next-hop to reach application 1 in the cloud 1440 via the route 1450, which is dashed to indicate an anomaly with this route. The application 1 is also hosted by cloud 1442, which is reachable via the hub 2 1432, and by cloud 1444, which is reachable via the hub 3 1434. Accordingly, in some embodiments, to determine a best alternate path (i.e., as a remedial action based on the anomaly associated with the first path 1450) sampled flows are routed via alternate routes 1455a and 1455b from the edge router 1410 and application 1 in each of the clouds 1442 and 1444.

For example, assume application 1 is a web application (e.g., Microsoft 365). In order to determine which of the paths 1455a or 1455b is a better alternate route for the web application traffic, some embodiments send a first subset of these web application traffic flows (i.e., sampled flows) to the instance of the web application in the cloud 1442 via the hub FE 1432 on path 1455a, and a second subset of these web application traffic flows to the instance of the web application in the cloud 1444 via the hub FE 1434 on path 1455b, while the remaining flows for this web application will continue to be sent to the instance of the web application in the cloud 1440 via the hub 1430 on path 1450.

As these alternate routes are implemented, the edge router 1410 collects performance measurement values and provides these values to the control action system (not shown) for use in generating performance scores for each route 1455a and 1455b representing application performance for application 1 (e.g., a web application such as Microsoft 365) by each route. In some embodiments, each edge router 1410-1416 runs a process for collecting flow data as they process and forward application traffic flows to and from client devices 1420.

Once either of the routes 1455a or 1455b has been selected based on the performance scores generated for these alternate routes, all subsequent application traffic flows for the web application are sent via the selected alternate route. For example, when the path 1455a has a better performance score than path 1455b, all traffic flows for the web application are sent to the web application instance in the cloud 1442 via the hub FE 1432 on path 1455a, while paths 1450 and 1455b will not be used for application traffic for this web application.

Figure 15:
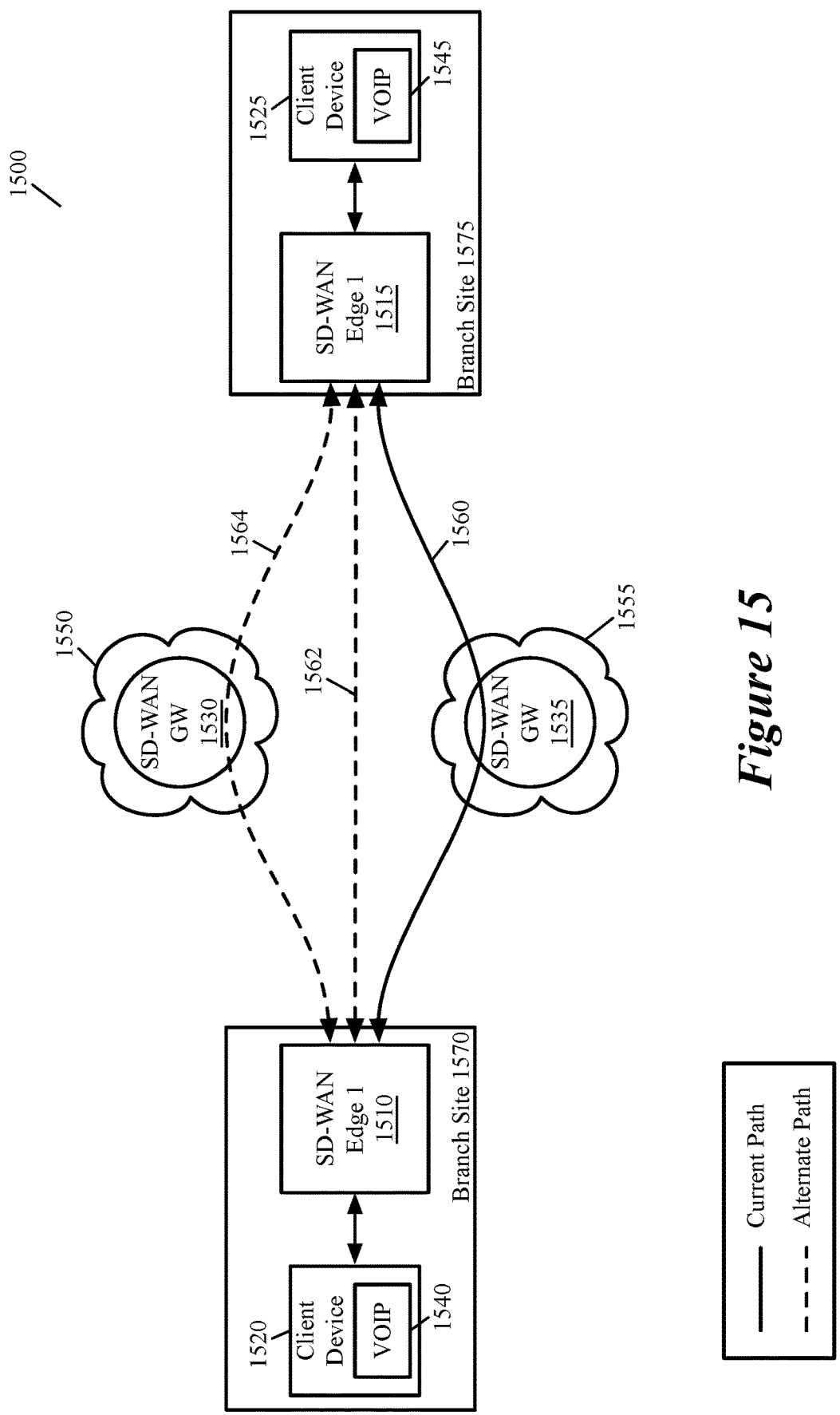
FIG. 15 conceptually illustrates another example diagram of a self-healing SD-WAN of some embodiments in which alternate routes are identified between edge devices located at different branch sites for sending VOIP traffic between client devices at the different branch sites.

In some embodiments, the flow data collected by the edge routers includes flow data associated with applications executing on devices that operate at different branch sites. For example, FIG. 15 conceptually illustrates another example diagram of a self-healing SD-WAN 1500 of some embodiments in which alternate routes are identified between edge devices located at different branch sites for sending VOIP traffic between client devices at the different branch sites. As shown, the SD-WAN 1500 includes multiple forwarding elements such as the SD-WAN edge routers 1510 and 1515 located at branch sites 1570 and 1575, and SD-WAN gateway routers 1530 and 1535 deployed to respective clouds 1550 and 1555.

The SD-WAN edge router 1510 is located at a branch site 1570 which also includes a client device 1520, while the edge router 1515 is located at a branch site 1575 which also includes a client device 1525. Each of the client devices 1520 and 1525 execute a respective VOIP (voice over IP) application instance 1540 and 1545. The SD-WAN edge routers 1510 and 1515 forward VOIP traffic flows between the client devices 1520 and 1525.

In this example, the SD-WAN edge routers 1510 and 1515 use the path 1560, which traverses the SD-WAN gateway 1535, for forwarding VOIP traffic flows. In addition to the path 1560 between the edge routers 1510 and 1515, traffic flows can also be sent using either of the alternate paths 1562 and 1564. The alternate path 1562 is a direct route between the edge routers 1510 and 1515, while the alternate path 1564 traverses the SD-WAN gateway router 1530, as shown.

Each path, in some embodiments, is defined by tunnels established between the different forwarding elements that implement the SD-WAN (e.g., edge routers, gateway routers, and hub routers). For example, the path 1560 is defined by tunnels established between the SD-WAN edge router 1510 and SD-WAN gateway router 1535, and between the SD-WAN gateway router 1535 and the SD-WAN edge router 1515. The path 1562 is defined by a direct tunnel established between the SD-WAN edge routers 1510 and 1515. Lastly, the path 1564 is defined by tunnels established between the SD-WAN edge router 1510 and SD-WAN gateway router 1530, and between the SD-WAN gateway router 1530 and the SD-WAN edge router 1515.

When an anomaly is detected with the path 1560 (e.g., due to anomalous behavior by the gateway router 1535), in some embodiments, the control action system described above identifies the alternate paths 1562 and 1564 and tests each path to determine which is the optimal path for forwarding the VOIP traffic flows. For instance, in some embodiments, the control action system directs a first subset of the VOIP traffic flows to the direct path 1562 and a second subset of the VOIP traffic flows to the path 1564 through the SD-WAN gateway router 1530, while all remaining VOIP flows continue to be sent on the path 1560. After a temporary period of time, the control action system then selects either the path 1562 or the path 1564 and directs the edge routers 1510 and 1515 (e.g., by sending an API call to a network controller that manages the edge routers) to forward all VOIP traffic flows on the selected path.

Figure 16:
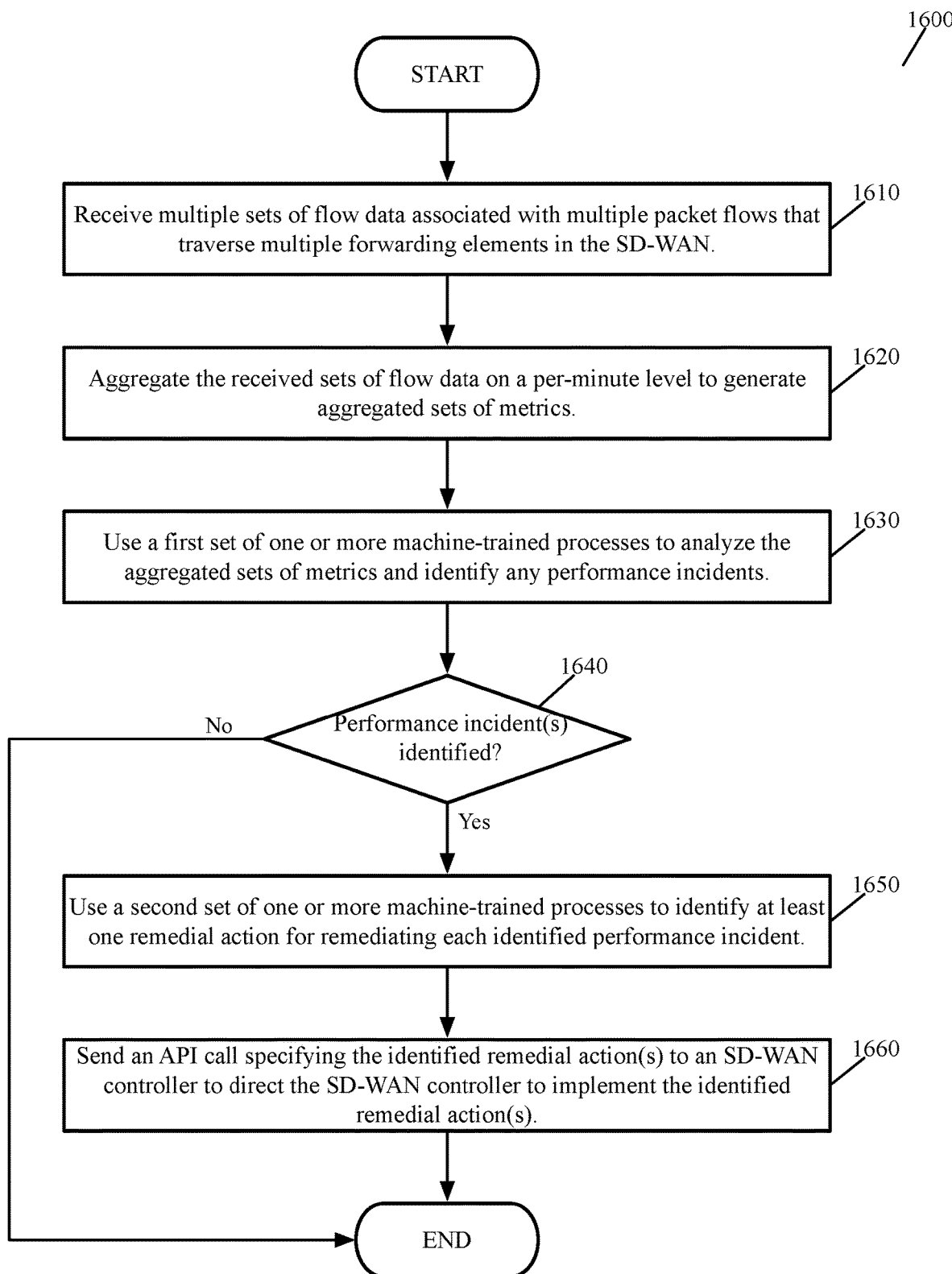
FIG. 16 conceptually illustrates a process performed in some embodiments to identify and remediate performance incidents in an SD-WAN.

FIG. 16 conceptually illustrates a process performed in some embodiments to identify and remediate performance incidents in an SD-WAN. The process 1600 is performed, in some embodiments, by a set of one or more anomaly detection and anomaly remediation processes executing on one or more host machines to monitor, detect, and auto-remediate end-user application and security issues. In some embodiments, these one or more host machines operate as part of an ENI platform (e.g., the ENI platform 170). The process 1600 will be described below with references to the self-healing SD-WAN 100.

The process 1600 starts by receiving (at 1610) multiple sets of flow data associated with multiple packet flows that traverse multiple forwarding elements in the SD-WAN. The flow data, in some embodiments, includes five-tuple data for the flow, an application identifier, protocol, flow statistics (e.g., TX bytes, RX bytes, TCP latency, and TCP retransmissions), and overlay route information (e.g., overlay route type, next hop overlay node, and destination hop overlay node). As illustrated by the SD-WAN 100, the SD-WAN edge FEs 120-124, the SD-WAN gateway FE 165, and the SD-WAN hub FE 145 all provide network data to the ENI platform 170.

The process 1600 aggregates (at 1620) the received sets of flow data on a per-minute level to generate aggregated sets of metrics. In some embodiments, as described above, the ENI platform 170 includes one or more machines that execute multiple processes, such as those illustrated by FIGS. 2, 3, 5, 9, and 12, including an ENI backend for receiving the flow data from the edge FEs, a message broker for passing converted flow data from the ENI backend to the data aggregation pipeline. For each minute of flow data received, in some embodiments, the data aggregation pipeline (or data aggregation and application score computation pipeline) aggregates flow data for that minute to generate a set of per-minute metrics.

The process 1600 uses (at 1630) a first set of one or more machine-trained processes to analyze the aggregated sets of metrics and identify any performance incidents. In some embodiments, the machine-trained processes include time-series anomaly detection processes (e.g., the sliding window Gaussian outlier detection model), global topology-based outlier detection processes, and piecewise function processes. The ENI platform processes the aggregated per-minute metrics, in some embodiments, to generate QoE scores representing performance on a per-edge, per-application, and per-overlay route level for each minute of aggregated data.

The process 1600 determines (at 1640) whether any performance incidents have been identified. In some embodiments, the QoE scores generated by the scoring pipeline of the ENI platform are not indicative of any issues in the network. As such, when no performance incidents have been identified, the process 1600 ends.

Otherwise, when at least one performance incident has been identified, the process 1600 transitions to use (at 1650) a second set of one or more machine-trained processes to identify at least one remedial action for remediating each identified performance incident. Examples of performance incidents, in some embodiments, include spikes in latency measurements increased packet drops. The remedial actions, in some embodiments, depend on network nodes (e.g., edge nodes and/or transit nodes) associated with the identified performance incident.

For instance, a remedial action of some embodiments includes changing the order of hubs for one or more edges based on determinations that (1) latency for a particular application's traffic forwarded by the edges is too high and (2) each of the one or more edges uses the same hub as a next hop. Another example of a remedial action, in some embodiments, is to instantiate a new transit node (e.g., a new gateway router or a new hub router) on the network for forwarding traffic associated with one or more applications for which anomalies have been identified.

After the remedial actions have been identified, the process 1600 sends (at 1660) an API call specifying the identified remedial action(s) to an SD-WAN controller to direct the SD-WAN controller to implement the identified remedial action(s). That is, the ENI platform of some embodiments, in coordination with the SD-WAN controller, autonomously implements remedial actions without requiring any end-user input. In some embodiments, the remedial actions are provided to the SD-WAN controller as configuration updates to, e.g., a configured hub order for a particular edge FE.

For embodiments where the remedial action is the addition of a new transit node (e.g., a new gateway router or new hub router), the SD-WAN controller implements the remedial action by instantiating and configuring a new machine to serve as the new transit node, as well as by adjusting configurations of edge routers or other transit routers that are to use the new transit node as a next-hop for forwarding traffic for one or more applications. The new transit node, in some embodiments, is instantiated in the same cloud or datacenter as an existing transit node that was associated with the anomaly that the new transit node is meant to remediate. In other embodiments, the new transit node is instantiated in a different cloud or datacenter. Also, in some embodiments, more than one new transit node is instantiated and configured to obviate the anomaly. Following 1660, the process 1600 ends.

Multiple examples of network impairments (i.e., network issues) detected in some embodiments and corresponding solutions are described below. As a first example, a set of edge routers of some embodiments are initially configured to use a particular hub FE as a primary hub FE. Upon detection of a network impairment on the particular hub WAN links causing increased latency of outgoing traffic, some embodiments implement a solution to change the hub order for each of the edge routers in the set.

As a second example, in a set of four edge routers, two edge routers are configured to use a first hub as their primary hub FE, while the other two edge routers in the set are configured to use a second hub FE as their primary hub FE. When a network impairment on WAN links of the first hub is detected and increases latency of outgoing traffic, the solution implemented in some embodiments is to change the hub order for the two edge routers configured to use the first hub FE as their primary hub FE, while the two edge routers configured to use the second hub FE as their primary hub FE can continue to use that second hub FE as primary.

In some embodiments, a third example uses the same initial configuration as the second example where two edge routers are configured to use a first hub as their primary hub FE, while the other two edge routers in the set are configured to use a second hub FE as their primary hub FE. Upon detection of a network impairment on WAN links of the first hub FE that is causing increased latency for outgoing traffic for clients connected to a first of the two edge routers configured to use the first hub FE as a primary hub FE, the solution implemented in some embodiments is to change the hub order only for the first edge router, while each other edge router continues to use their initially configured primary hub FE (i.e., the first hub FE for the second edge router in the set and the second hub FE for the other two edge routers configured to use the second hub FE as the primary hub FE).

As a fourth example of some embodiments, each of four edge routers are configured to use the same hub FE as a primary hub FE. Upon detection of a network impairment on the hub FEs WAN links, causing increased latency of outgoing traffic for a single application, some embodiments implement a solution that changes the hub order for each of the four edge routers, but only for the single application for which latency has increased. That is, in some embodiments, when traffic for only one application is affected, the hub order for the edge routers is only changed for that application, while the edge routers continue to use the first hub FE as primary for each other application.

In some embodiments, combinations of the solutions described in the above examples are implemented. As a fifth example, when latency increases due to a network impairment on WAN links of a first hub FE for which a subset of edge routers (e.g., two of four) are configured to use as a next hop for traffic for a first application, the solution, in some embodiments, is to change the hub order for only the subset of edge routers and only for traffic associated with the first application.

A sixth example, in some embodiments, involves an initial configuration where a first edge router sends traffic for a first application via a first hub FE, a second edge router sends traffic for the first application via a second hub FE, and third and fourth edge routers send traffic for the first application via a third hub FE. Upon detecting a network impairment on the first and second hub FEs 1-2 for traffic for the first application, the implemented solution, in some embodiments, starts with the self-healing network detecting a drop in performance across both the first and second hub FEs. Incidents and recommendations are then generated, in some embodiments, including new hub orders for the first and second edge routers. In some embodiments, the recommended new hub orders should not have the first or second hub FEs as the first recommended hub FEs for the first and second edge routers.

A seventh and final example, of some embodiments, begins with an initial configuration where a first edge router sends traffic for first and second applications via a first hub FE, a second edge router sends traffic for the first and second applications via a second hub FE, and third and fourth edge routers send traffic for the first and second applications via a third hub FE. When a network impairment is detected that affects the first application but not the second application, in some embodiments, the solution is to perform a validation check to determine whether a different hub order is recommended for the affected application (i.e., the first application) while the second application continues using the same hub FE.

In some embodiments, the hub order is changed manually through a UI (user interface) provided by a controller for the network. For instance, in some embodiments, after a self-healing incident is generated, the hub order is manually changed (e.g., by a network administrator) through the network controller's UI, and the remediation is applied. The remediation, in some embodiments, should not be applied and show up in a "failed" state.

In some embodiments, WAN optimizations (e.g., Dynamic Multi-Path Optimization (DMPO) and the self-healing system described above include complementary actions, as well as many differences. WAN optimizations, such as DMPO, in some embodiments, are performed from a local link-level perspective, while the self-healing system of some embodiments operates from a global topology perspective. WAN optimizations like DMPO involve network packet-level optimizations using overlay tunnel metrics, while the self-healing system involves flow/overlay route-level optimizations using end-to-end application performance metrics, according to some embodiments. Additionally, in some embodiments, WAN optimization such as DMPO solves underlay and last-mile link level issues, while the self-healing system solves issues outside optimized tunnels (e.g., VeloCloud Multipath (VCMP) tunnels) such as WAN issues upstream of a gateway/hub, datacenter network issues, and localized application issues.

In some embodiments, from a time-scale perspective, WAN optimizations like DMPO operate at the milliseconds timescale making decisions at the local link level and respond to underlay and last mile link issues caused by changes in network conditions, while the self-healing system operates at the minutes and days timescales making decisions at the global topology level. At the minutes level, the self-healing system of some embodiments responds to sudden network issues outside the optimized tunnels (e.g., VCMP tunnels). At the days level, in some embodiments, the self-healing responds to systemic inefficiencies in the network causing sustained application performance issues.

Currently, two main features of the self-healing system of some embodiments include incidents and remediations. The goal of the incidents feature, in some embodiments, is to detect and remediate a sudden and significant application performance degradation. In some embodiments, an "incident" is created when the analytics system detects a sudden drop in application performance as compared to the recent past history of 30 minutes. The incidents feature works at the minutes timescale of the self-healing system, in some embodiments.

Figure 17:
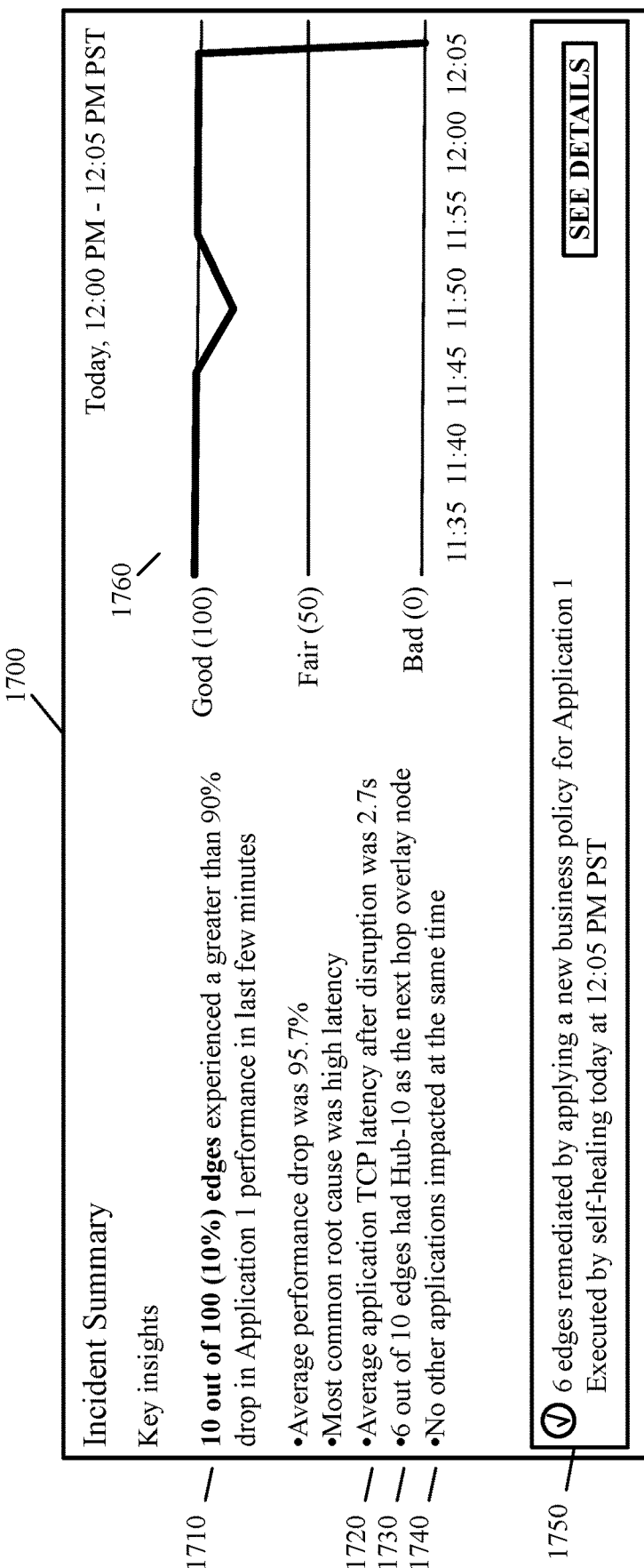
FIG. 17 illustrates the layout of an incident, in some embodiments.

FIG. 17 illustrates the layout of an incident, in some embodiments. The incident summary 1700 includes information including the impact 1710, flow statistics 1720, flow overlay route 1730, other impact 1740, remediation 1750, and a line graph depicting performance drops. The impact 1710 denotes the number of edges that have been affected by the application performance drop. In this example, 10 out of 100, or 10%, of edges experienced a greater than 90% drop in Application 1 performance in the last few minutes. Specifically, the average performance drop was 95.7% with the most common root cause being high latency, as indicated. The incident summary 1700 also includes a line graph 1760 that provides a visualization of the performance drop.

The flow statistics 1720 identifies the specific flow metrics that show a significant change in value. In this example, the average TCP latency spiked to 2.7 s following a disruption. The flow overlay route 1730 denotes the most common next hop node on the SD-WAN overlay (or Direct) among the affected edges. As shown, 6 out of the 10 affected edges had the same hub, Hub-10, as the next hop overlay node. The other impact 1740 identifies if the application issue is specific to that application, or whether it affects other applications. In this example, no other applications were impacted at the same time, as illustrated.

Lastly, remediation 1750 identifies the remediation action that is automatically applied when automatic remediation is enabled, or manually applied (e.g., by an end-user through the user interface using a cursor or other selection means). In some embodiments, if automatic remediation is not enabled, the self-healing system only provides a suggested remediation action and a UI workflow to trigger the remediation action. The remediation action can be triggered directly through the incident alert, or through an ENI application available to the end-user. In this example, the remediation has been applied automatically (i.e., without any manual trigger), and as such, the remediation 1750 indicates that the remediation was executed by the self-healing system and provides a timestamp identifying when the remediation was automatically applied. The remediation 1750 also includes an option for an end-user to see details associated with the remediation, as shown.

Regarding the recommendations feature, in some embodiments, the goal of this feature is to identify systemic issues in the network that are not transient but manifest repeatedly over time. A "recommendation" is created when the analytics system identifies an edge experiencing significantly worse application performance than other edges in the network over a longer time window (e.g., days). The recommendations feature works at the days timescale of the self-healing system, in some embodiments.

Figure 18:
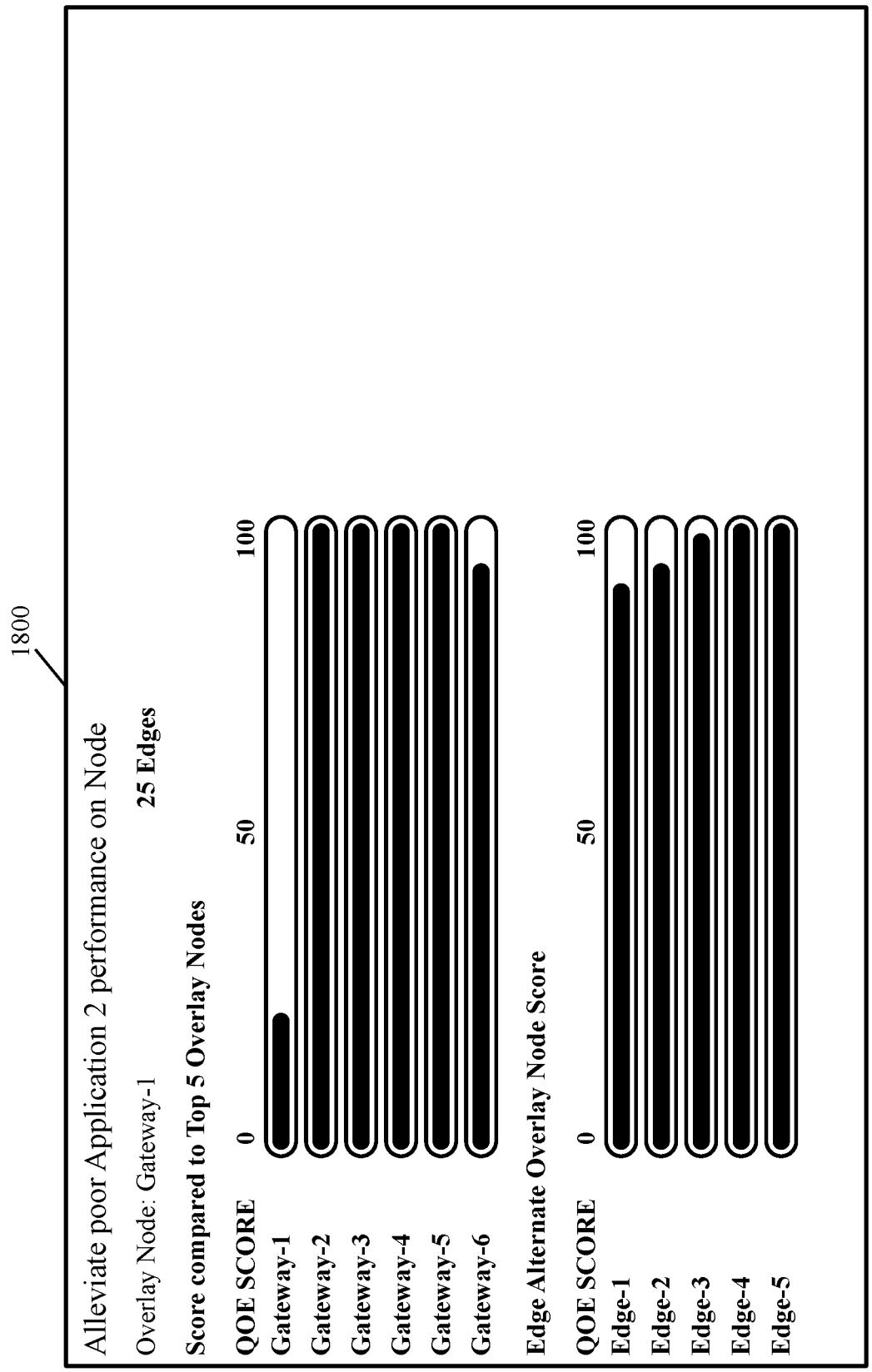
FIG. 18 illustrates an example layout of a recommendation, in some embodiments, that includes QoE (quality of experience) score comparisons for 6 gateways, as well as edge alternate overlay node QoE scores.

In some embodiments, the recommendations feature addresses a few main questions and correlates certain data. For example, the recommendations feature of some embodiments (1) addresses long-term application performance across edges, (2) identifies edges that are outliers and generally have worse performance than the average, (3) correlates application performance with important attributes (e.g., service provider, SD-WAN topology (e.g., direct versus using gateways/hubs), and next hop overlay node), and (4) identifies if the application issue is local to an edge, linked to the overlay/direct route, or is a general application issue. FIG. 18 illustrates an example layout 1800 of a recommendation, in some embodiments, that includes QoE (quality of experience) score comparisons for 6 gateways, as well as edge alternate overlay node QoE scores.

To calculate application QoE scores, in some embodiments, the AI/ML platform of some embodiments calculates scores per minute, per edge, per application, and per route (i.e., next hops and destination hops). The metrics used to calculate application performance, in some embodiments, include tx_pkts, rx_pkts, tcpRXRexmit_pkts, tcpTXRexmit_pkts, tcpLatencySum_usec, and tcpLatencySamples. First, avgTcpLatency and percentTcpPacketDrops are calculated, where avgTcpLatency=tcpLatencySum_usec/tcpLatencySamples and percentTcpPacketDrops=(tcpTxRexmit_pkts+tcpRxRexmit_pkts)/(tx_pkts+rx_pkts). Then, when total packets are above 50 (i.e., tx_pkts+rx_pkts>50), scores are calculated. Intermediate scores are calculated for avgTcpLatency using piecewise function (e.g., configuration file across all tenants thresholds). If avgTcpLatency<=40000 us, the score is 100 (i.e., benign). If 200,000 us>avgTcpLatency>40000 us, (avgTcpLatency−40000 us)/(200,000−40000)*100. If avgTcpLatency>=200,000 us, the score is 0 (i.e., bad). Next, intermediate scores for percentTcpPacketDrops are calculated using a piecewise function. If percentTcpPacketDrops 0.05, the score is 100. If 0.15>percentTcpPacketDrops>0.05, (percentTcpPacketDrops−0.05)/(0.15−0.05)*100. If percentTcpPacketDrops>=0.15, the score is 0 (i.e., bad). Lastly, the minimum (i.e., the worse) between the two intermediate scores becomes the application QoE score, in some embodiments.

In some embodiments, basic statistics computed include number of edges per company, and number of TCP applications monitored by self-healing system (i.e., those with application QoE scores). Basic application statistics computes, in some embodiments, include (1) for each edge, total bytes sent direct versus through an SD-WAN tunnel, comparison of application scores for direct versus SD-WAN tunnel traffic, with table columns that include edge, total bytes direct, total bytes thru SD-WAN tunnel, appTcpQoe avg at peak times for direct, and appTcpQoe avg at peak times for SD-WAN tunnel, (2) top 10 applications by scores and their traffic volumes, and (3) bottom 10 applications by scores and their traffic volumes.

Analysis of edges, in some embodiments, where the application performance deviates significantly from average/normal, includes correlating with the overlay route topology and providing insights connecting edges, applications, and overlay routes. Overall edge/application/overlay statistics are provided in a table, in some embodiments, that lists all outlier edge-application combinations along with overlay nextHop and performance statistics, with table columns that include application, edge, overlay next hop, traffic, application QoE score, and total poor application minutes. Analysis from the edge perspective, in some embodiments, are provided in a table listing each edge, the application and overlay next hop combination, application QoE score, and fraction (e.g., as a ratio) of poor performance time to total time. This analysis also includes the edge versus applications that have issues, and top applications with poor performance per outlier edge.

Analysis from the perspective of the overlay route, in some embodiments, includes a comparison of direct versus SD-WAN tunnel for the outlier edges/applications. A table for the overlay route perspective of some embodiments includes columns for overlay next hop, edge-application pair, application QoE score, and ratio of poor performance time to total time. Lastly, analysis from an application perspective, in some embodiments, includes a table with columns including application, edge-overlay next hop pair, application QoE score, and ratio of poor performance time to total time.

In some embodiments, alternate path insights and recommendations are provided, such as those described above for FIGS. 17-18. For each outlier edge and application, in some embodiments, insights regarding how alternate gateways perform if the application is a SaaS application routed through a gateway, and if the application is a hosted application routed through a hub, how alternate hubs perform are provided. For example, insights of some embodiments regarding performance of alternate gateways include the number of edges actively sending traffic to the alternate gateway, application QoE scores of those edges connecting to the alternate gateway, alternate gateway score(s), and other geographically close gateways and their scores. In some embodiments, insights regarding hosted applications routed through a hub include the number of edges actively sending traffic to the alternate hub and application QoE scores of those edges connecting to the alternate hub, and alternate hub score(s).

While the embodiments described above are described as performing analyses on a per-edge, per-application, per-path basis, other embodiments may perform the analyses differently, such as on a per-edge, per-application, per-physical link (e.g., 5G link vs MPLS link vs cable modem(s)), on a per-edge, per-path basis, or on a per-edge, per-physical link basis. Also, while the topology graphs described above are described as being per-application, other embodiments create one topology graph for several applications.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 19:
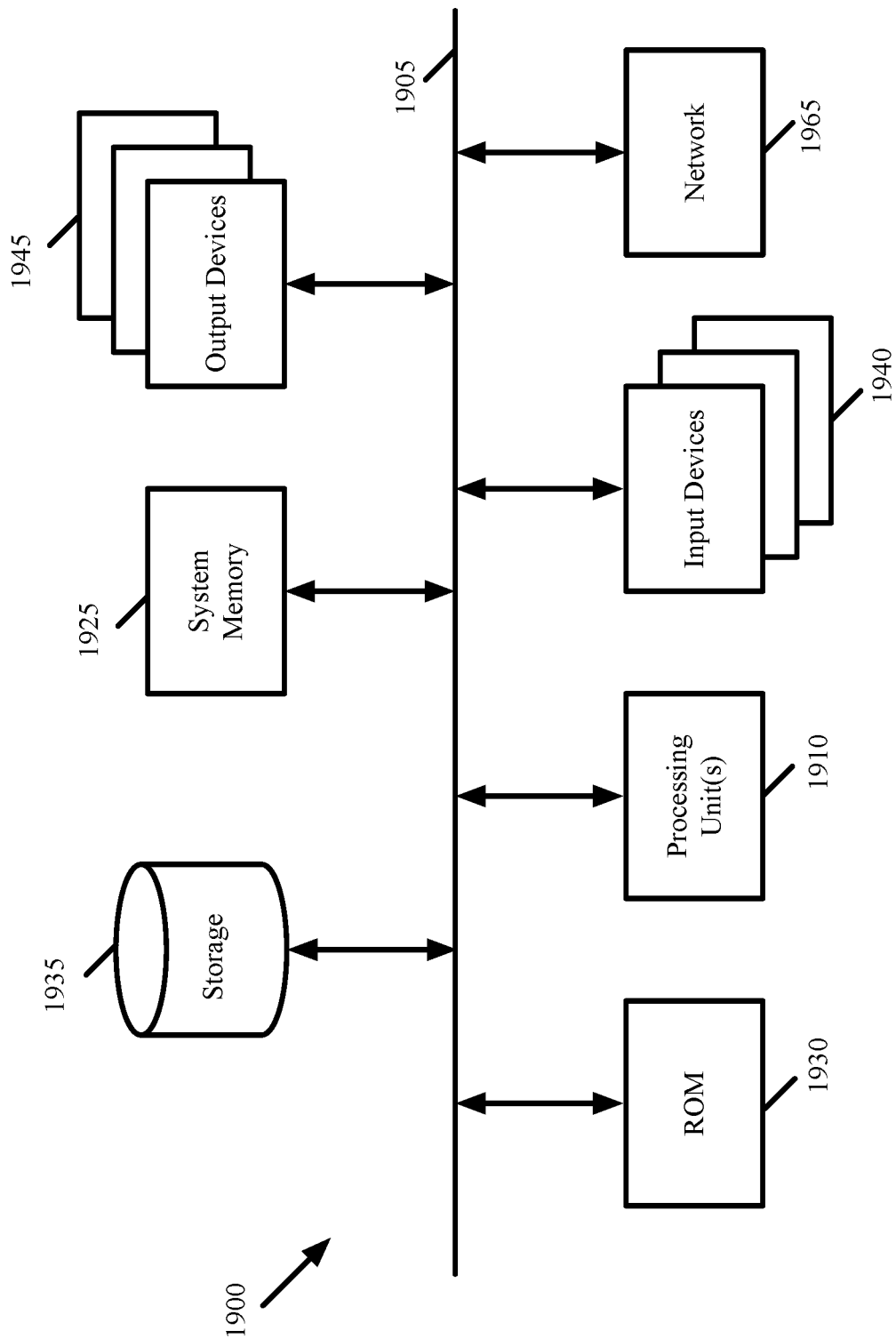
FIG. 19 conceptually illustrates a computer system with which some embodiments of the invention are implemented.

FIG. 19 conceptually illustrates a computer system 1900 with which some embodiments of the invention are implemented. The computer system 1900 can be used to implement any of the above-described hosts, controllers, gateway, and edge forwarding elements. As such, it can be used to execute any of the above described processes. This computer system 1900 includes various types of non-transitory machine-readable media and interfaces for various other types of machine-readable media. Computer system 1900 includes a bus 1905, processing unit(s) 1910, a system memory 1925, a read-only memory 1930, a permanent storage device 1935, input devices 1940, and output devices 1945.

The bus 1905 collectively represents all system, peripheral, and chipset buses that communicatively connect the numerous internal devices of the computer system 1900. For instance, the bus 1905 communicatively connects the processing unit(s) 1910 with the read-only memory 1930, the system memory 1925, and the permanent storage device 1935.

From these various memory units, the processing unit(s) 1910 retrieve instructions to execute and data to process in order to execute the processes of the invention. The processing unit(s) 1910 may be a single processor or a multi-core processor in different embodiments. The read-only-memory (ROM) 1930 stores static data and instructions that are needed by the processing unit(s) 1910 and other modules of the computer system 1900. The permanent storage device 1935, on the other hand, is a read-and-write memory device. This device 1935 is a non-volatile memory unit that stores instructions and data even when the computer system 1900 is off. Some embodiments of the invention use a mass-storage device (such as a magnetic or optical disk and its corresponding disk drive) as the permanent storage device 1935.

Other embodiments use a removable storage device (such as a floppy disk, flash drive, etc.) as the permanent storage device. Like the permanent storage device 1935, the system memory 1925 is a read-and-write memory device. However, unlike storage device 1935, the system memory 1925 is a volatile read-and-write memory, such as random access memory. The system memory 1925 stores some of the instructions and data that the processor needs at runtime. In some embodiments, the invention's processes are stored in the system memory 1925, the permanent storage device 1935, and/or the read-only memory 1930. From these various memory units, the processing unit(s) 1910 retrieve instructions to execute and data to process in order to execute the processes of some embodiments.

The bus 1905 also connects to the input and output devices 1940 and 1945. The input devices 1940 enable the user to communicate information and select commands to the computer system 1900. The input devices 1940 include alphanumeric keyboards and pointing devices (also called "cursor control devices"). The output devices 1945 display images generated by the computer system 1900. The output devices 1945 include printers and display devices, such as cathode ray tubes (CRT) or liquid crystal displays (LCD). Some embodiments include devices such as touchscreens that function as both input and output devices 1940 and 1945.

Finally, as shown in FIG. 19, bus 1905 also couples computer system 1900 to a network 1965 through a network adapter (not shown). In this manner, the computer 1900 can be a part of a network of computers (such as a local area network ("LAN"), a wide area network ("WAN"), or an Intranet), or a network of networks (such as the Internet). Any or all components of computer system 1900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of remediating anomalies in an SD-WAN (software-defined wide-area network) implemented by a plurality of forwarding elements (FEs) located at a plurality of sites connected by the SD-WAN, the method comprising: iteratively:
receiving a plurality of performance metrics that over a duration of time expresses a performance of the SD-WAN for at least one particular application associated with flows that traverse the SD-WAN during the time duration;
using the received performance metrics to update generated weight values for a topology graph that comprises (i) a plurality of nodes representing the plurality of FEs and (ii) a plurality of edges between the plurality of nodes representing paths traversed between the FEs by the flows associated with the particular application, said generated weight values associated with said paths;
using a topology-based machine-trained process to analyze the topology graph with the generated weight values in order to identify an anomaly in the topology graph that is indicative of an anomaly the SD-WAN for the particular application's traffic flows; and
for an identified anomaly, implementing a remedial action to modify the SD-WAN in order to remediate the identified anomaly.

2. The method of claim 1, wherein using the topology-based machine-trained process to analyze the topology graph with the generated weight values in order to identify an anomaly further comprises determining whether the identified anomaly (i) is isolated to a particular FE in the plurality of FEs or (ii) affects the overall application.

3. The method of claim 1, wherein the topology-based machine-trained process is a topology-based first machine-trained process, wherein identifying the remedial action comprises using a second machine-trained process for (i) identifying a set of potential remedial actions, (ii) testing the identified set of remedial actions, and (iii) based on said testing, selecting a remedial action from a set of potential remedial actions to modify the SD-WAN in order to remediate the identified anomaly.

4. The method of claim 1, wherein implementing the remedial action comprises sending an API (application programming interface) call specifying the identified remedial action to an SD-WAN network controller to direct the SD-WAN network controller to implement the remedial action.

5. The method of claim 1, wherein the plurality of FEs comprises (i) a plurality of edge FEs located at a plurality of branch sites connected by the SD-WAN, (ii) a plurality of transit FEs for connecting the plurality of edge FEs to each other and to a plurality of datacenter sites.

6. The method of claim 5, wherein the identified anomaly comprises a network impairment on a first transit FE of the plurality of transit FEs that is a next-hop FE for application traffic associated with the particular application and forwarded by a first edge FE of the plurality of edge FEs located at a first branch site of the plurality of branch sites.

7. The method of claim 6, wherein the identified remedial action comprises updating a transit FE order configuration for the first edge FE to change the next-hop transit FE for application traffic associated with the particular application and forwarded by the first edge FE from the first transit FE to a second transit FE in the plurality of transit FEs.

8. The method of claim 7, wherein:
the first transit FE is a next-hop transit FE for application traffic associated with the particular application and forwarded by a second edge FE in the plurality of edge FEs located at a second branch site in the plurality of branch sites,
the identified anomaly is associated with the first edge FE and the second edge FE, and
the identified remedial action comprises updating the transit FE order for the first edge FE and updating a transit FE order for the second edge FE.

9. The method of claim 5, wherein the particular application is a first application, wherein the identified anomaly comprises a network impairment on a first transit FE in the plurality of transit FEs that is a next-hop transit FE for application traffic (i) associated with at least the first application and a second application and (ii) forwarded by a first edge FE in the plurality of edge FEs located at a first branch site in the plurality of branch sites.

10. The method of claim 9, wherein the identified remedial action comprises updating a transit FE order configuration for the particular edge FE to change the next-hop transit FE from the first transit FE to a second transit FE for application traffic (i) associated with the first application and the second application and (ii) forwarded by the particular edge FE.

11. The method of claim 9, wherein the network impairment on the first transit FE affects application traffic associated with the first application and does not affect application traffic associated with the second application.

12. The method of claim 11, wherein the identified remedial action comprises updating a transit FE order configuration for the particular edge FE to change the next-hop transit FE from the first transit FE to a second transit FE for application traffic (i) associated with the first application and (ii) forwarded by the particular edge FE.

13. The method of claim 12, wherein after the remedial action has been applied, the particular edge FE (i) uses the second transit FE as a next hop for application traffic associated with the first application and (ii) continues to use the first transit FE as a next hop for application traffic associated with the second application.

14. The method of claim 1, wherein the set of performance metrics is a first set of performance metrics that comprise performance scores computed for the duration of time based on a second set of performance metrics collected from the plurality of FEs.

15. The method of claim 1, wherein the time window comprises two weeks.

16. The method of claim 1, wherein each path in the plurality of paths is comprised of a set of one or more links, each link connecting two FEs in the plurality of FEs via a tunnel established over the link, the method further comprising generating the topology graph by (i) defining, for each FE in the plurality of FEs, a corresponding node in the plurality of nodes and (ii) defining, for each tunnel between two FEs, a corresponding edge in the plurality of edges.

17. A non-transitory machine readable medium storing a program for execution by a set of processing units, the program for remediating anomalies in an SD-WAN (software-defined wide-area network) implemented by a plurality of forwarding elements (FEs) located at a plurality of sites connected by the SD-WAN, the program comprising sets of instructions for:

iteratively:

receiving a plurality of performance metrics that over a duration of time expresses a performance of the SD-WAN for at least one particular application associated with flows that traverse the SD-WAN during the time duration;

using the received performance metrics to update generated weight values for a topology graph that comprises (i) a plurality of nodes representing the plurality of FEs and (ii) a plurality of edges between the plurality of nodes representing paths traversed between the FEs by the flows associated with the particular application, said generated weight values associated with said paths;

using a topology-based machine-trained process to analyze the topology graph with the generated weight values in order to identify an anomaly in the topology graph that is indicative of an anomaly the SD-WAN for the particular application's traffic flows; and for an identified anomaly, implementing a remedial action to modify the SD-WAN in order to remediate the identified anomaly.

18. The non-transitory machine readable medium of claim 17, wherein the set of instructions for using the topology-based machine-trained process to analyze the topology graph with the generated weight values in order to identify an anomaly further comprises a set of instructions for determining whether the identified anomaly (i) is isolated to a particular FE in the plurality of FEs or (ii) affects the overall application.

19. The non-transitory machine readable medium of claim 17, wherein the topology-based machine-trained process is a topology-based first machine-trained process, wherein the set of instructions for identifying the remedial action comprises a set of instructions for using a second machine-trained process for (i) identifying a set of potential remedial actions, (ii) testing the identified set of remedial actions, and (iii) based on said testing, selecting a remedial action from a set of potential remedial actions to modify the SD-WAN in order to remediate the identified anomaly.

20. The non-transitory machine readable medium of claim 17, wherein the set of instructions for implementing the remedial action comprises a set of instructions for sending an API (application programming interface) call specifying the identified remedial action to an SD-WAN network controller to direct the SD-WAN network controller to implement the remedial action.

\* \* \* \* \*